United States Patent

Manly

[15] 3,676,856

[45] July 11, 1972

[54] AUTOMATIC EDITING SYSTEM AND METHOD

[72] Inventor: Ron Manly, P.O. Box 201, Hawthorne, Calif. 90250

[22] Filed: Aug. 11, 1970

[21] Appl. No.: 63,020

Related U.S. Application Data

[63] Continuation of Ser. No. 275,415, April 24, 1963.

[52] U.S. Cl. ....................340/172.5

[51] Int. Cl. ....................G06f 11/00, B41j 5/30

[58] Field of Search ....................340/172.5, 146.3, 174.1; 197/20; 235/61.12

[56] References Cited

UNITED STATES PATENTS

| | | | |
|---|---|---|---|
| 3,233,224 | 2/1966 | Foster et al. | 340/172.5 |
| 2,067,183 | 1/1937 | Green | 235/61.12 |
| 2,337,553 | 12/1943 | Hofgaard | 340/146.3 |
| 2,700,447 | 1/1955 | Blodgett | 197/20 |
| 2,934,145 | 4/1960 | Blodgett | 197/20 X |
| 2,961,644 | 11/1960 | Gardiner | 340/172.5 |
| 3,058,093 | 10/1962 | Vernon et al. | 340/146.3 |
| 3,103,580 | 9/1963 | Foreman | 340/172.5 |
| 3,113,298 | 12/1963 | Poland et al. | 340/174.1 |
| 3,172,081 | 3/1965 | Cerf | 340/146.3 |
| 3,248,705 | 4/1966 | Dammann et al | 340/172.5 |

*Primary Examiner*—Raulfe B. Zache

[57] ABSTRACT

This specification and drawings disclose how to avoid manually retyping or rekeyboarding textual material when revising or correcting the information contained in a record either while originally preparing the information or at a later date. The use of print readers or character recognition devices to accomplish this "editing" is disclosed, as well as editing using paper tape typewriters, display devices, and other means such as using editing instructions. Methods are also disclosed for automatically reformatting the information into lines after insertions, deletions, or other changes requiring shifting of the line layout of the information.

59 Claims, 20 Drawing Figures

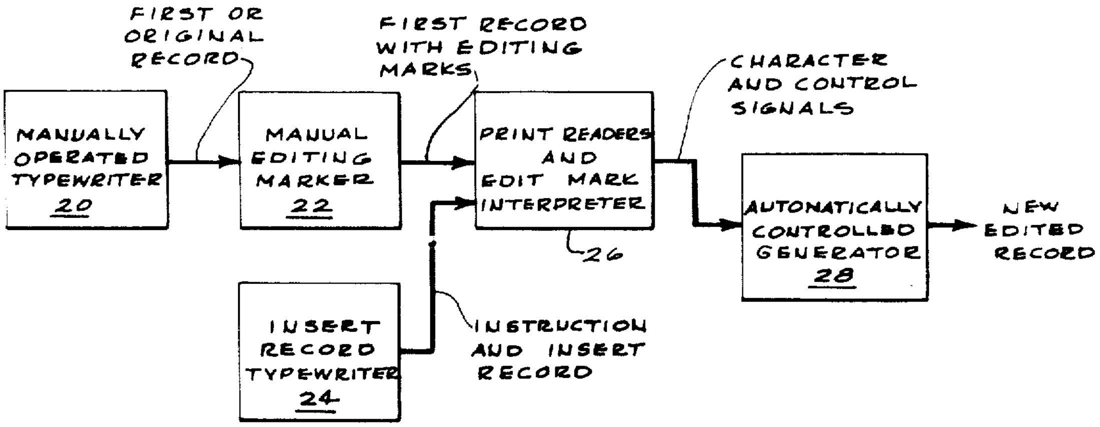
FIG. 1
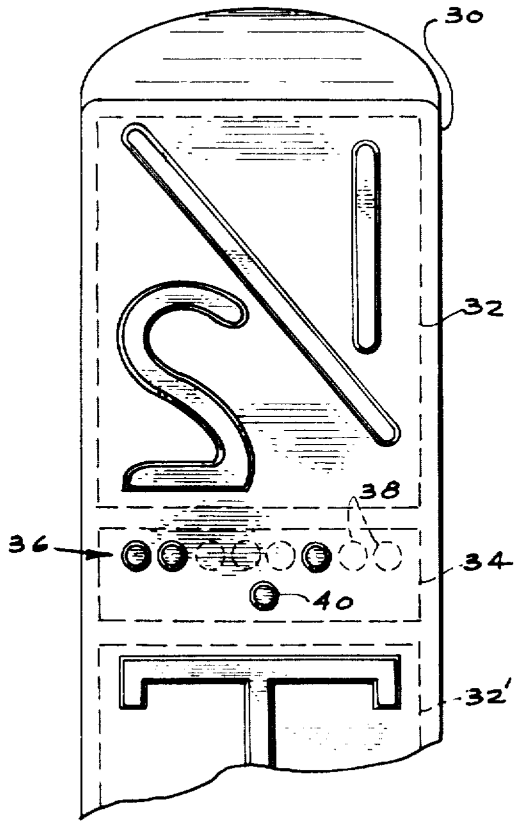
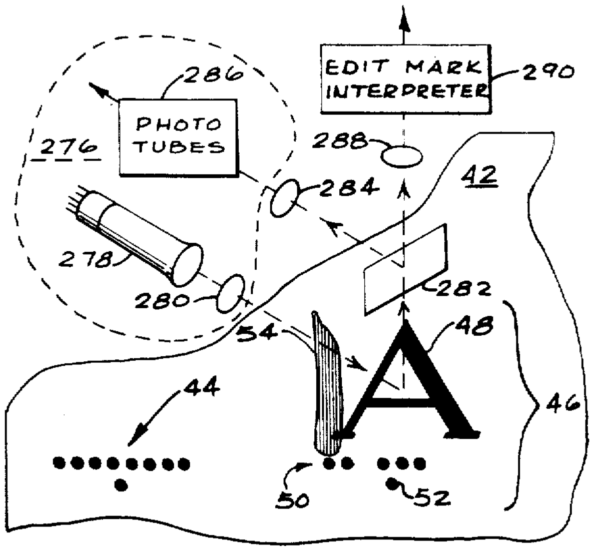
FIG. 3
FIG. 2a
RON MANLY
INVENTOR
BY
Nilsson, Robbins & Anderson
ATTORNEYS

RON MANLY
INVENTOR

BY
Nilsson, Robbins & Anderson
ATTORNEYS.

RON MANLY
INVENTOR.

BY
Nilsson, Robbins & Anderson
ATTORNEYS.

RON MANLY
INVENTOR.
BY
Nilsson, Robbins & Anderson
ATTORNEYS.

RON MANLY
INVENTOR

BY
Nilsson, Robbins & Anderson
ATTORNEYS.

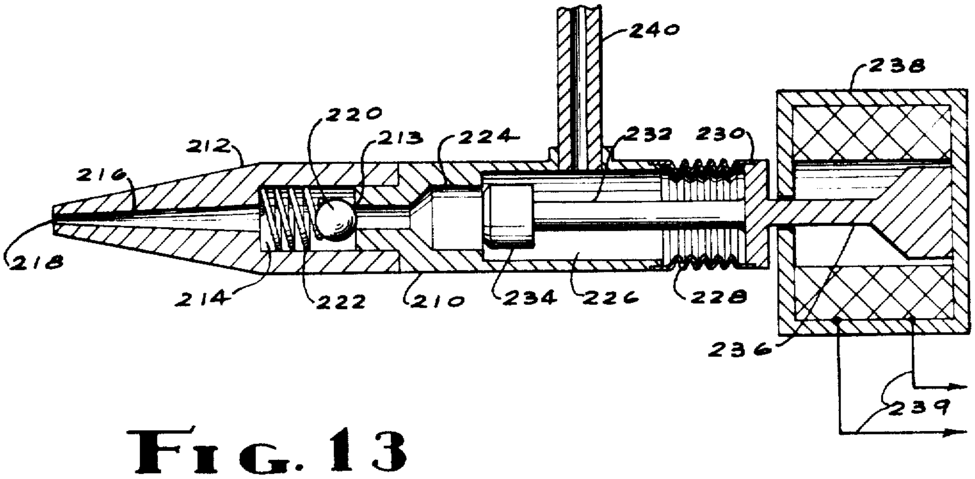
FIG. 13
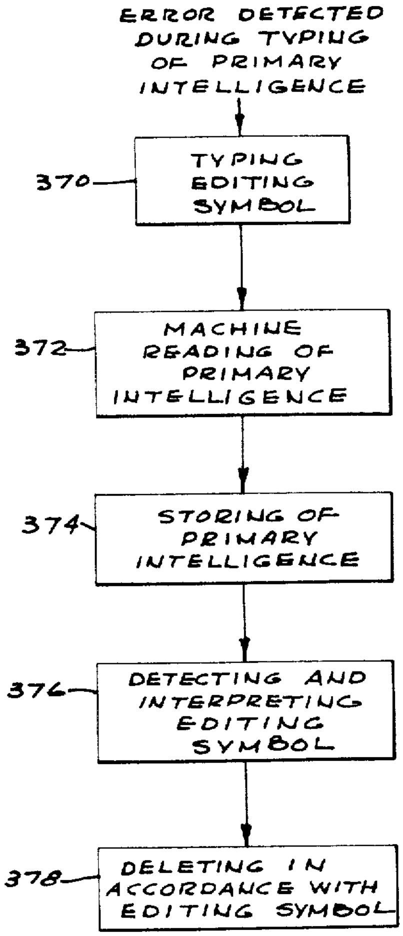
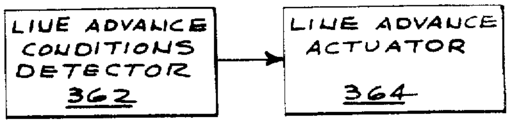
FIG. 16
FIG. 14
RON MANLY
INVENTOR
BY Nilsson, Robbins & Anderson
ATTORNEYS.

RON MANLY
INVENTOR.

BY
Nilsson, Robbins & Anderson
ATTORNEYS.

RON MANLY
INVENTOR

BY
Nilsson, Robbins & Anderson
ATTORNEYS.

AUTOMATIC EDITING SYSTEM AND METHOD

The present case is a continuation of application Ser. No. 275,415, filed Apr. 24, 1963.

This invention relates generally to the editing of documents, records, and other messages or intelligence, and more particularly to a system and method for automatically editing. The term "edit" is used throughout this specification in a broad sense and denotes any deliberate treatment to revise or change messages including, for example, such processes as correcting, inserting, excerpting, updating, correlating or integrating different recordings, change of form, change of format or medium or printing font, and others.

In previously copending application, on an automatic signal reader using color separation, now U.S. Pat. No. 3,426,324, the term edit is used in a still broader sense not limited to combinations with, or applications in the environment of editing systems per se (i.e., verbal message revising systems) as this instant application is limited. For example, in the previously copending application, the term edit signals also is used to refer to one or more species of relates intelligence that may be stored on a single record, which is referred to therein, as a record of a multi-mode storage system. Thus, the elevations, visual band reflectivities or the radar reflectivities of a geographical region may be stored on the same record having the printed characters of the names of the region; similarly the audio representation of the pronunciation of a word may be stored in a different mode relatable to the associated orthographic characters. Thus, in the instant application the term edit does not include the use of the term "edit signals" to refer to one or more of the species of related intelligence stored on a single record in a multi-mode storage system rather than an editing system (i.e., a verbal message revising system).

An important aspect of the problem of facilitating the handling and generating of semantic information is the editing or revising of typewritten or printed material and then retyping or reprinting the revised work. In a typical case, an author of, for example, a technical paper causes a first draft to be typed as from his dictation. The author then proofreads and edits the first draft with his corrections, deletions, and insertions. The first draft is then manually retyped and the author again proofreads it. This process requires the costly labor of manually retyping the edited work, and that of the author proofreading, after each retyping, and it is known from empirical observations that with each regeneration of a manuscript, both the probability of typing errors and that of proofing errors are significantly increased. Thus, in the above example, when the material is proofread for the second time, errors may be overlooked; and when the material is then retyped it must be expected that additional errors will occur unless extraordinarily stringent and costly effort is exerted to preclude them. This process is usually repeated a number of times (in many cases involving the retyping of a book there may be ten or more such retypings).

Such processing is not only directly costly but is inherently time consuming and causes indirect costs in public relations or good will, particularly, for example, when the errors are made in billing or otherwise dealing with a business customer.

Such disadvantages may be generically designated as "inefficiencies", and are manifest as such whether the record is being slightly changed or corrected in its content, format or carrier medium (e.g. weight or grade of paper), or whether generating entirely new documents on the basis of excerpts from any other records or documents.

These inefficiencies severely limit the integration and correlation of available information in business records processing and communications, or in scientific and government activities whether on an individual or a collective level. Such inefficiencies also prevent the utilization of the great potential of modern computing equipment to be applied to make recorded categorized knowledge available to increase the effective brain power of the individual.

Closely related to this general editing and synthesizing problem is the need for a versatile and economically practical system for generating and machine reading of records which are also man readable; which are human engineered for expeditious utilization of information by man; and which are not limited to the disadvantages of punched cards or tape. A particular disadvantage of the punched cards is that generally only approximately 80 characters may be included on any one card. Consequently, punched cards are not practical or suitable for aiding the man in the processing and utilization of the information contained on them when more than 80 characters are involved, which is the most frequent case.

Neither an adequately general nor otherwise satisfactory solution exists with prior art systems or approaches. Automatic print readers, although not developed as an approach directed toward the above problem, but rather as a means of input to computers, offer advantages over the punched card and paper tape because the print readers utilize man and machine readable records. However, such print readers have heretofore been extremely complex and expensive. Furthermore, and of particular importance, they are not able to work either directly or indirectly with handwritten or otherwise man-made changes in the editing of original manuscripts.

An example of another system which is useful in fields related to that of the present invention, but which is subject again to limitations of inefficiency and lack of versatility, is the punched paper tape typewriter. Such systems typically utilizes tapes which are not man readable and which may not, therefore, be man edited conveniently. Furthermore, the tapes are relatively awkward to handle conveniently (to file and retrieve as well as to thread into the system, etc). due to both the physical nature of paper tapes and the lack of synchronization with the man readable hardcopy records.

It is therefore an object of the present invention to provide a method and system for automatically editing messages and the like to provide improvements in the speed and economy of publishing documents, maintaining industrial and commercial records, keeping library and inventory records, and in literature researching as in connection with scientific, legal and scholarly research.

It is another object to provide such a system and method which are not subject to the above and to other disadvantages and limitations of the prior art.

It is another object to provide such a system which permits manual inserting and/or manual control of a machine which inserts editing marks on the original manuscript, which editing marks, along with the characters on the manuscript, are machine readable and which are then interpreted and utilized in preparing a revised manuscript based upon the changes instructed by the editing marks.

It is another object to provide such a system which automatically reads and interprets man-made editing marks and changes an original message into a new message based upon the interpretation of the editing marks.

It is another object to provide such a system and method which may automatically combine or merge different messages or data into one new message.

It is another object to provide such a system for providing fast and inexpensive access to very large files as for merging or synthesizing records or for the processing of data from the records, the physical access being performed by a man who is operating the system, or is providing access at the request of the machine.

It is another object to provide such a system which automatically regenerates the new edited or synthesized record.

It is another object to provide a versatile and general purpose generator of man-machine readable records.

It is another object to provide such a system which is useful with high speed computers such that the computer output may be man read and edited and directly fed back to the computer without the requirement to convert from a machine readable, but not man readable medium, such as magnetic tape, to a man readable printed page for editing and then manually to convert the edited work back to a machine readable medium for further computer processing.

It is another object to provide an automatic editing system which may be used as a message composer for composing and revising messages to be entered into a computer or into a communications network.

It is another object to provide a system to automatically perform editing in response to editing signals.

Briefly, in one example of the present invention there is provided a manually operated typewriter having a type font which for each character makes two impressions. One of the impressions is a more or less conventional typewritten character which is man readable; and the other is a digitally encoded set of information bits which is machine readable. Alternatively, the type font may be conventionally unitary, but readable by an appropriate character reader. In either event the impression is machine readable.

The document output of this typewriter may be designated as the original record and may be a first draft of, for example, a technical paper. The author then proofreads the original record and, with a special pen, manually makes editing marks directly onto the paper. The editing marks in this example may be of three different optically machine separable colors, and may be inserted in one of three different portions of the space allotted to a particular character, for example, above, below, or in front of the typed character. In a specific example, a vertical stroke of the editing pen in a particular color along the left hand edge of a character space may be a "start delete" edit instruction to delete what follows. A horizontal edit stroke of a different color along the top edge of the character space of a succeeding character may be an edit instruction to "stop delete". Hence, the completed instruction is to delete whatever material or blank character spaces were originally disposed between the two edit marks. The distinction between "deleting" and "removing" should be carefully noted. The latter, applied to a typewritten page, is the removal of any printing which may occur; more generally, it is the conversion of any other character into a blank character space.

In another example, a particular edit mark or more generally stated, edit signal, may be an instruction to "insert here" material which is separately generated by the original typewriter mentioned above. In addition, "delete" and "insert", as well as other instructions, may be combined as, for example, to form a "replace" instruction.

The coded set of information bits in this example are provided by a row of eight spaces disposed along the bottom edge of a character space. Each space may have an inked impression, as of a dot, which fills the space or it may be vacant of an impression. The total combination of seven of the binary bits provides unique identification of as many as 128 characters. The eighth bit may serve as a parity check.

Machine reading of the information bits is achieved with a reading head which includes a set of eight bundles of fiber optics which are geometrically arranged congruently with the eight information bits and may be positioned or juxtaposed over the pattern of bits so that each of the bundles is disposed with its end contiguously to or "looking at" a respective one of the information bits. Some of the fibers in each bundle carry illuminating energy, which may be white light, to the information bits, and others carry the reflected, illuminating energy from the information bits to a particular one of eight photoelectric detectors. Thus, the pattern of information bit impressions is transformed to a binary combination of excited or energized photoelectric detectors. The combination of electrical signals from the detectors may be resolved by a signal selection matrix which has a plurality of output terminals, a unique and individual one of which is energized depending upon the particular pattern of impressions of the information bits on the record being thusly read.

The integrated automatic editing system of this example includes two machine readers; one for reading the original record with the manually scribed editing marks or signals thereon, and the second for reading the "insert record" which includes additional material to be inserted in the final record in accordance with the editing signals. Each of the readers is coupled to an automatic final record generator, such as an electric typewriter which is operated by electrical signals from readers and particularly, but not exclusively, from the output terminals of their respective selection matrices.

Included within the reader for the original record is an edit mark reader which, in a manner to be described in the detailed portion of this specification, observes each character space and determines whether an edit mark has been placed therein and if so, which of the three colors it is and in which portion of the space it has been scribed. The edit mark reader then interprets the edit mark and instructs the machine readers alternately to provide the desired combination of signals in proper sequence to the generator of the final record.

Further details of these and other novel features and their principles of operation, as well as additional objects and advantages will become apparent and be best understood from a consideration of the following description taken in connection with the accompanying drawings which are presented by way of example only, and in which:

FIG. 1 is a block diagram of an example of an automatic editing system embodying the principles of the present invention;

FIG. 2*a* is a plan view of a type face which may be utilized to provide a man-machine readable writing in accordance with the present invention;

FIG. 2*b* is a block diagram of an ink ejector imprinting system for making readable impressions upon an appropriate medium;

FIG. 3 is a plan view of an upper left hand corner portion of a typical page of a man-machine readable first record including a character representation as provided, for example, by the manually operated typewriter of FIG. 1, also shown in FIG. 3 as an example of the adaptation of a conventional character reader to operate with an edit mark interpreter;

FIG. 13 is a sectional view of an example of an individual ink ejector jet;

FIG. 14 is a block diagram showing an example of a "delete previous section" method of editing in accordance with the principles of the present invention;

FIG. 16 is a block diagram of a more generalized embodiment of the automatic margining system of the present invention;

Referring to the particular Figures, it is stressed that the details shown are by way of example only and are presented in the cause of providing what it believed to be the most useful and readily understood description of the principles of the invention. The detailed showing is not to be taken as a limitation upon the scope of the invention which is to be measured by the appended claims forming a part of this specification.

In FIG. 1 an example of an automatic editing system is shown as including a manually operated typewriter 20 which may, in this example, be an electric typewriter or a manual typewriter having a modified type font as will be described below in connection with the description of FIG. 2*a*. A more generalized presentation of the system will be discussed in connection with a subsequent figure. The document output of the manually operated typewriter 20 may be designated as the "first or original record". The information that it was desired to record on the first record at the time of the original typing may be designated the "primary intelligence". If there were no uncorrected errors in the original typing, the first record would thus contain the primary intelligence. Human editing may be accomplished using a manual editing marker 22 after removal of the first record from the manually operated typewriter 20. The marker 22 may be a pencil, crayon, or pen capable of making edit marks in any one of three different colors; for example, cyan (blue), deep yellow, or magenta, these three colors being readily optically machine distinguishable and each being adequately man visible on white paper. In certain applications the editing marks are typed in. Still other methods of making the editing marks are obvious such as the use of impression devices such as a rubber stamp. The editing marker 22 and the process of marking will be discussed in more detail below. Thus, what may be designated as the document output of the manual editing marker 22 is, in fact, the first record with the manually scribed editing marks included directly thereon.

An insert record typewriter 24, which may be identical to the manually operated typewriter 20, provides a document output which includes man-machine readable instruction and insert records which will implement the desired editing instructions when used together with the editing signals applied by the editing marker 22. The document outputs of the manual editing marker 22 and the insert record typewriter 24 are fed to a print reader and edit mark interpreter 26 where they are alternatively read in a sequence dictated by the editing marks applied by the editing marker 22 and, to some extent, by the implicit and explicit instructions on the instruction and insert record output of the insert typewriter 24.

Figure 10:
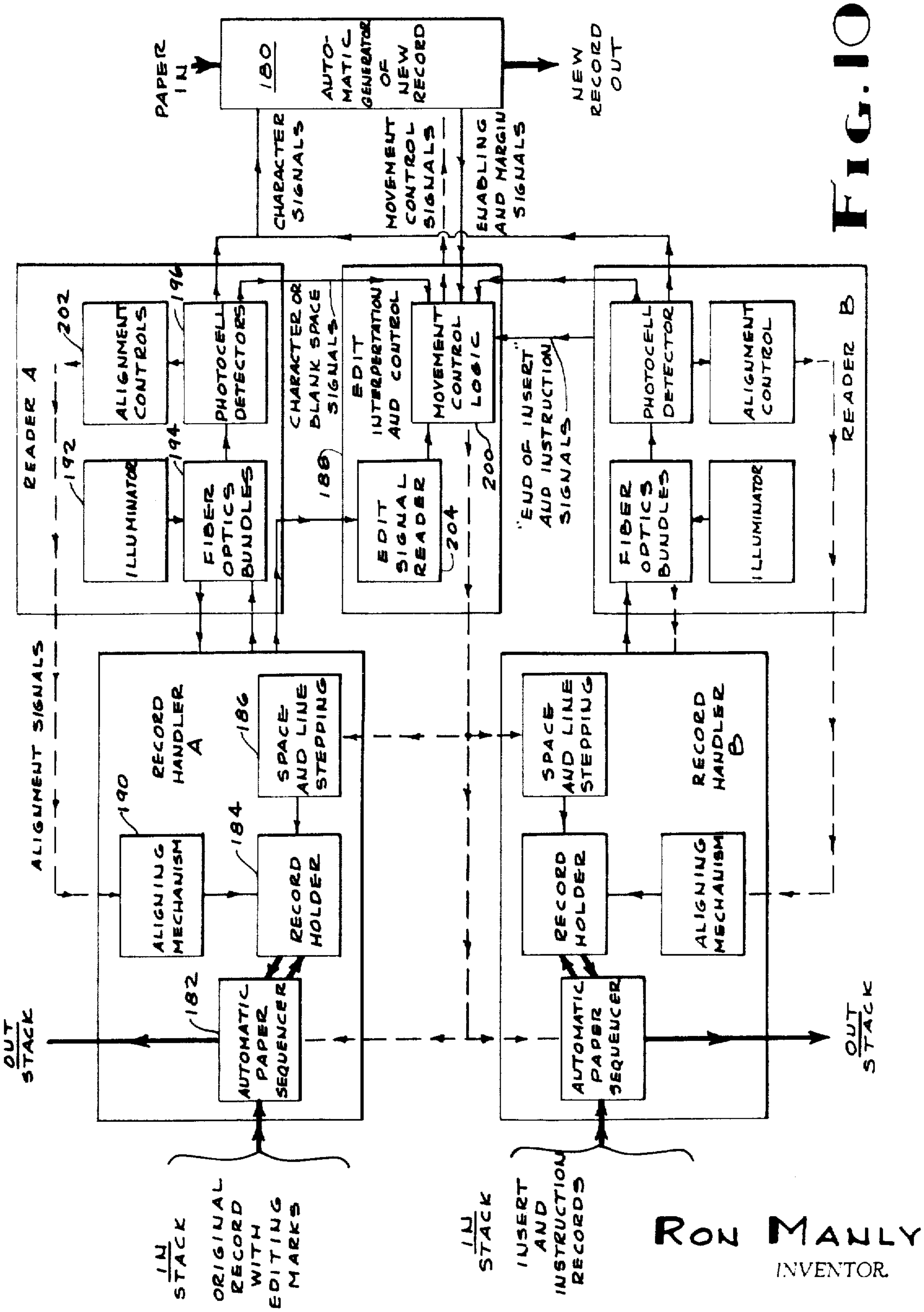
FIG. 10 is a block diagram illustrating in more detail an example of an automatic editing system constructed in accordance with the principles of the present invention.

To facilitate the understanding of the basic principles involved, an embodiment is described, here and in FIG. 10, which utilizes two print readers, one for reading the first record or records and one for reading the insert record or records. However, it should be noted that in other embodiments provisions are included which permit a single print reader to be utilized for reading both the original and insert records. These provisions are discussed later in the description of FIG. 12.

The document inputs to the print reader and edit mark interpreter 26 are normally discarded after this process because their intelligence has been communicated electrically to an automatically controlled generator 28 which, in a manner to be discussed in more detail below, automatically generates a new edited record which may be a final document in the preferred format and on the preferred choice of paper and the like. The generator 28 may be identical to the insert record typewriter 24, and/or the manually operated typewriter 20.

An example to illustrate how the editing instructions affect the operation of the print reader and edit mark interpreter 26 follows. The editing marker 22 may instruct "insert here" at which point and time the print reader which is reading the first record with the editing marks will stop reading and the print reader which is reading the instruction and insert record from the insert typewriter 24 will begin to read the appropriate material to be inserted and will continue thus to read until an "end insert" character on the insert record is interpreted as signalling the intended end of the particular insert.

Another basic and frequently used class of commands is that of the "jump" commands which, in general, command the automatic generator to move without writing. In particular, a function for which it has a unique capability is that of making many types of format changes which can be accomplished by thusly "inserting" blank character spaces with the automatic generator. For example, when modifying column spacing in a "tabular mode" of operation (as distinct from a "textual mode" in which material is arranged in paragraphs and in which automatic line ending processes are important—see later discussion of line ending), the inserting of spaces may be accomplished as follows: two "jump" command editing marks are inserted on the first record. The first editing mark is a "forward jump" command which indicates where the space or spaces are to begin. The second indicates where the spaces are to cease and may be designated, for purposes to be made clear below, a "return jump" command. When the interpreter 26 senses the "forward jump" signal, the system switches into a "-jump" mode, in which both the reader which is reading the first record and the generator 28 continue to progress space by space but with the generator moving without printing. When the "return jump" signal is reached by the reader, the system switches into a "return jump" mode, in which the generator stops while the reader back spaces. When the first "jump" mark is now reached, the system switches into the normal mode, the generator having thusly skipped a predetermined number of blank character spaces. To effect this sequence of operations, the logic is constructed so that a "-jump" command causes the system to enter: (1) a "jump" mode if the system is in the normal mode, and (2) the normal mode if it is in a "return jump" mode. Also, a return jump command: (1) is implemented to cause the system to enter a "return jump" mode if the system is in a jump mode, and (2) is ignored if the system is in the normal mode.

In those applications in which the edited intelligence or message is not used to immediately generate a new edited record (such as when entering information into a computer or temporarily storing the message), instead of inserting blank character spaces by having the generator moving but not printing, "blank character space" code signals are generated by the interpreter 26, or more generally, by a "message synthesizer".

Similar provisions are included to generate and store code signals such as "carriage return", "new page", "tab", and others used to control an automatic generator, as well as code signals for frequently used character or punctuation symbols (for which editing signals are available to insert them), such as the comma. For example, an "insert comma" editing signal causes the message synthesizer to generate and record the code for the comma (or transmit it to the automatic generator if one is being used).

The "start delete" and "end delete" commands are of course another type of jump command. It is further to be noted that a somewhat more complex sequence of jump commands may be utilized for transposing letters or words. For example, the material on the first or original record disposed between a first and second signal may be interchanged or transposed with the material between the second and a third signal. The sequence is as follows: The reader and generator forward jump from the first to the second signal without printing on the part of the generator; then the system operates in the normal mode between the second and third signals; then the reader return jumps from the third back to the first signal for normal operation of the reader between the first and second signals which material was previously skipped; then the reader jumps from the second to the third signal while the generator remains motionless thusly to "delete" that material which it had previously printed; then the system operates in its normal mode beyond the third signal mark.

Other commonly used editing instructions include commands to accomplish the following: "remove" characters (leaving blank spaces), change underlining, change capitalization, change fonts, change line separation, alter paragraph divisions, alter indentation, hyphenate or divide words, change spacing and orientation or tabulation of text as for a chart, excerpt, start new page, change margins, add superscripts or subscripts, and others.

Referring to FIG. 2*a*, a typical type face of the manually operated typewriter 20, insert typewriter 24, or generator 28 is shown in detail. That part of the type face 30 which makes a unitary impression upon the typewriter ribbon is divided into two portions, an upper man readable type portion 32 and a lower machine readable information portion 34. The man readable type portion 32 is substantially conventional in appearance and construction.

The machine readable information portions 34 in this example comprises an encoded set 36 of eight information bit positions 38 and an aligning position 40, the function of which will be discussed in detail below. The eight information bit positions 38 may be disposed anywhere within the character space; however, in this example, they are arranged substantially in a horizontal line immediately below the type portion 32 and are disposed substantially symmetrically about the vertical center line of the type face 30. In the example shown, the aligning position 40 is disposed on the vertical center line of the type face; however, it may be disposed to either side in other examples.

In a particular constructed embodiment, an example of which is shown in FIG. 2*a*, the information bit positions 38 are locations, individual ones of which may or may not have a wire projecting above the surface of the type face 30. Holes 8 mils in diameter and 30 mils deep were drilled and metal wire was inserted for predetermined ones of the bit positions 38 in a manner such that the pattern of projecting wires and vacant bit positions uniquely identifies each character. The aligning position 40 was similarly drilled and a wire inserted. Each of the projecting wires was cut off and slightly chamfered, as shown, and finished in a manner that permits it to project from the surface of the type face 30 to a distance approximately equal to the projection of the man readable type in the portion 32.

Thus, when the particular type face 30 is pressed against the typewriter ribbon and the page, two impressions are made; one corresponding to the upper man readable type portion 32 and the other corresponding to the four projecting wires in the machine readable portion 34. The impressing wires in the example of FIG. 2 are in the first, second, and sixth bit positions and the aligning position 40. The first bit position is preferably used as a parity check device, to minimize the probability of undetected error in the subsequent machine reading process. The remaining seven of the eight information bit positions 38 provide means for uniquely identifying 128 different characters or instructions which is an abundantly adequate number for most practical applications in the English language.

It should be noted that in many applications it is desirable to use a one-time carbon ribbon and, sometimes, to select the grade of paper used, to obtain adequate resolution of the printing impression so that separate bit marks may be most reliably distinguished. Also to avoid obtaining poor impressions due to clashing of keys when they are struck nearly simultaneously, some adjustments to the typewriter interlocking mechanisms are frequently desirable.

It should be noted that merely half of the type face 30 has been discussed and described. A similar pair of portions including a man readable type portion 32′ is included on the lower half of the type face 30, a portion of which is cut away in the Figure.

It should also be noted that any type of writing means may be utilized instead of the conventional typewriter that utilizes type bars. Thus, for example, some of the alternatives are a "-typewriter" which uses a type wheel, or a type ball; or a printer of the chain driven, the type bar, the type drum, or the electrostatic head type; or an optical printer; or a typesetting machine of either the "cold type" or "hot type" kind; and others.

"Printing" is used in this specification to refer to any machine means of making markings which may be man and/or machine readable. Typewriters are thus considered a printing means in this specification. The printing means need not be of a kind that mechanically makes an impression. For example, an optical or an electronic printer may print on a "photo"-sensitive medium, for example, photographic, photochromic, thermosensitive, Kalfax, and others.

Figure 2B:
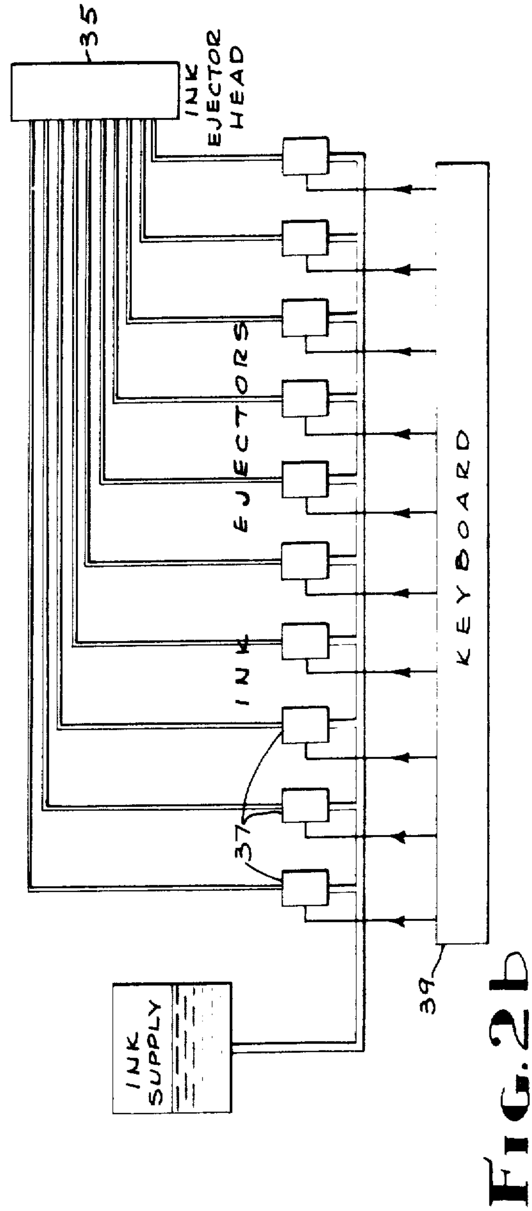

Referring to FIG. 2*b*, an alternative apparatus for creating encoded information bit impressions is illustrated. Instead of the wires or pedestals which protrude from the information bit positions 38 and impress upon the page through an inked ribbon, a set of ink ejector orifices are positioned in an ink ejector head 35 (see FIG. 13). The ink ejector head may eject small spots of ink in an encoded set such as set 36, or it may eject ink in a two dimensional matrix of spots to form the entire man-machine readable character. Whichever array is utilized in a particular example, the head 35 is juxtaposed contiguously to the surface of the paper and ejects a pattern of spots onto the character space, which pattern is unique for a particular character. The ink ejection is controlled by individual ink ejectors 37 which are in turn actuated to eject a pulse of ink from the ink supply reservoir when triggered by mechanical or electrical signals from a keyboard 39, or from a print reader, a memory device, a computer, or others.

When an ink ejector imprinting system embodiment such as shown in FIG. 2*b* is utilized for providing only the encoded, machine readable information bits, they may conveniently be impressed on the page elsewhere than immediately adjacent to or coincident with the man readable character space.

In FIG. 3 the upper left hand corner of a typical page 42 of a first record, in one class of embodiments of the invention, as generated, for example, by the manually operated typewriter 20 of FIG. 1, is shown. A portion of the first line of type is illustrated and the first two sets of impressions are shown thereon. The first impression is a registration mark 44 which, as will be discussed below, may preferably be placed a predetermined distance from the left edge of the page in the margin of the first line of print as an aid to the record handlers in aligning the page so that the machine reader and edit mark reader may be initially aligned with the print on the page to be read. Disposed to the right, as viewed in the Figure, of the registration mark 44 by a predetermined, variable distance or number of typewriter spaces, is a character impression 46 which includes a man readable character 48 and a machine readable binary character 50. The particular five inked dots in the upper row of the binary character uniquely identify the man readable character shown. The aligning position portion 52 is in this example always present.

Instead of information bit positions, which each convey one bit of information; more generally, "printed information mark positions" may be used. Printed information mark positions may contain printed information marks having one or more distinguishable states, such as one or more levels of reflectivity, and thus the presence of a particular state, or of no mark at all in a position, may convey more than one bit of information. The machine readable binary character, composed of information bit positions, may be, more generally, a machine readable printed information mark character.

Disposed along the left hand side of the character space for the man readable character 48 is a colored editing mark 54 which may more generally, i.e., more generically, be designated an editing signal. The editing marks are scribed directly onto the page 42 as by the manual editing marker 22 of FIG. 1 in any one of the number of predetermined general areas associated with the character impression 46. The areas chosen and the particular colors used for the editing mark determine the intelligence content of the editing instruction. In some applications the immediate context on the record participates in determining the content of the instruction. For example, in one application, one edit signal has a different meaning when included between words rather than between characters. It may be noted that if three different colors are used and three different positions or orientations for each mark are utilized (for example, on the left hand edge of the character space as shown, across the top of the character space, or along the bottom of the character space) the number of distinguishable commands or editing instructions is 63. If only two positions are utilized with three colors the number of distinguishable commands is fifteen. Further details of these and other aspects of the invention which have been briefly discussed in connection with these Figures will be described in more detail in connection with some of the subsequent Figures.

When the edit marks are to be applied near-by or over the machine readable impression, whether it is encoded information or the man readable impression, means is provided to preclude the machine reader from being confused by the presence of the edit mark. Such means, in one practical embodiment of the invention, is in the form of filters in the path of the light from the character impression to the print reader. The colors of the edit marks are selected to have a common portion of the spectral band which they and the filters do not absorb. The print reader filters selectively remove the spectral energy that may be in any band but this common band. Thus an edit mark near-by a printed character will result in the same spectral band being transmitted to the print reader detectors that would result if the mark were not there, because only the spectral energy in the common band reaches the detectors anyway, and none of this is absorbed by the edit marks. Such edit marks near-by the character printing may be either opaque or transparent.

If in a particular application it is desired to allow the edit marks to not only be near-by but to overlap the character printing, then it is necessary that they be transparent to at least the common band for the character recognition device, otherwise the print reader will not detect a portion of the printed character; for example an "O" might be detected as a "C" if an opaque edit mark covered the right portion of it.

This difficulty is avoided by the use of edit marks which are transparent for this common spectral band for the print reader. Such edit marks would be satisfactory for most applications. However, a further improvement is possible in this latter configuration since the edit signal reader will not detect that portion of the edit mark which overlaps the character printing because the black printing will absorb the spectral band peculiar to the color of the edit mark. This, certain applications, is circumvented by choosing the edit mark colors and the "black" ink for the character printing so that the "black" printing has relatively narrow spectral reflecting bands which match the bands peculiar to the color of each of the edit marks. Then even with the transparent edit mark overlapping the printing, the color of the edit mark would be detected because its peculiar color spectral band would be reflected off of the printing. Also the presence of the printing would be detected by the print reader because the common spectral band that is allowed to reach its detector would not be significantly affected.

An alternative example which accomplishes this last result is a system which utilizes edit marks which are transparent to a common spectral band for the print reader, and each of which is opaque to and reflects the spectral band or bands used for identifying it.

Also shown in FIG. 3 is an example of the application of the above methods to adapting a conventional character reader to operate with an edit mark interpreter. As an example of a conventional character reader the system shown in FIG. 1 of U.S. Pat. No. 2,889,535 is utilized. The pertinent portion of this conventional character reader is shown in FIG. 3 as a network 276 consisting of: a cathode ray tube 278, a lens system 280, and phototubes 286. These elements correspond to elements 70, 72, and 76 respectively of FIG. 1 of the U.S. Pat. No. 2,889,535. In FIG. 3, a spot of light on the fluorescent screen of the cathode ray tube 278, produced by the electron beam therein, is focused by the lens system 280 onto the page 42 which contains the characters to be identified. It should be noted that for conventional character readers of the type described in U.S. Pat. No. 2,889,535, the special machine readable binary character 50, the aligning position 52, and the registration mark 44 are usually not required, since such character readers are able to machine read suitably selected, relatively conventional characters such as the man readable character 48.

The light reflected from the page 42 is divided into two portions by a half-silvered mirror 282. One portion passes through a filter 284 and then to the phototubes 286 and the rest of the conventional character reader (not shown). The other portion of the reflected light divided by the half-silvered mirror 282 passes through a filter 288 and then to an edit mark interpreter 290, which is discussed below in connection with the subsequent Figures.

The filters 284 and 288 are selected, as discussed previously, to prevent edit marks from being confused as, or from masking, portions of characters and vice versa.

By using a half-silvered mirror 282, the character reader and the edit mark interpreter are made to view portions of the same character space at the same time so that any edit marks therein are properly located with respect to the character space they pertain to.

The specific location of the edit mark with respect to the intelligence read by the character reader is readily determined. The character reader of the referenced patent scans each individual character and the space between characters by a series of vertical scans each of which is displaced to the right of the preceding one. Thus, when an edit mark is detected it will occur at some time with respect to the left to right (horizontal) location of the vertical scan of a particular character space and the spaces immediately adjoining it. Thus, depending upon the location of the scan and the position in the individual scan at the time of detection of the edit mark (taking into account any processing delays) the location of the mark with respect to the particular character space is readily determined, for example, as being to the left of, above, or to the right of the character. This method of determining the location of the edit mark with respect to the intelligence read by the character reader is applicable to many different character reader embodiments, since many character readers utilize a similar scanning process. However, even in character reader embodiments not utilizing this type of scanning it has been found that one skilled in the art may readily mechanize a satisfactory method of determining the location of the edit mark.

Other means for avoiding confusion between edit marks and printed characters will become apparent to those skilled in the art from a consideration of the description below of the spectral definitions and principles utilized in the present invention. For any particular type of character reader one skilled in the art will be able readily to mechanize a number of satisfactory alternative configurations having appropriately selected: filters; optical channelling means, such as the half-silvered mirrors; edit mark colors; photodetectors; illumination sources; and the like.

Figures 4, 9:
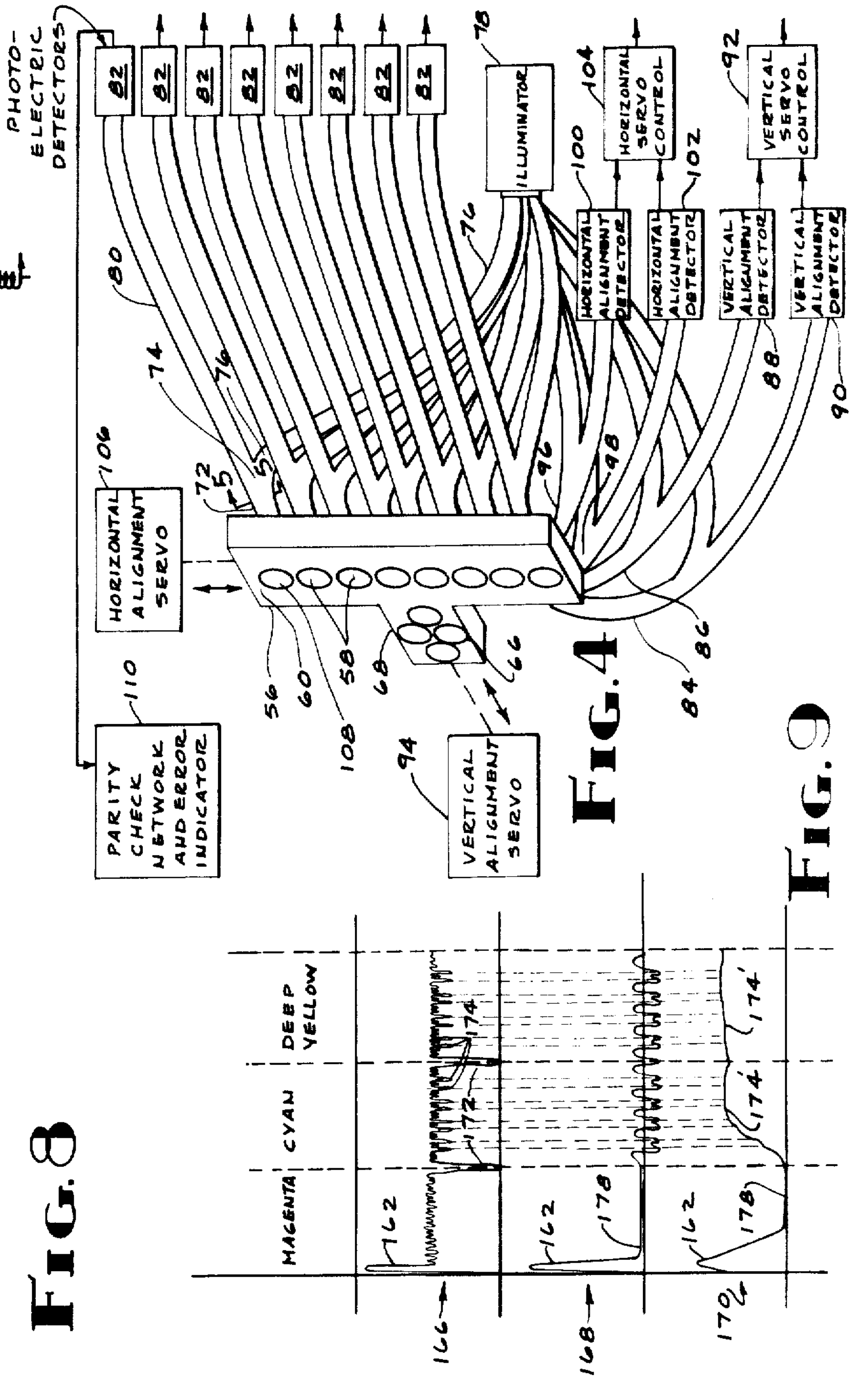
FIG. 4 is a block diagram of a portion of an automatic reader constructed in accordance with the principles of the present invention.
FIG. 9 is a set of three graphs plotting voltage on the ordinate versus time on the abscissa for purposes of describing certain features of the operation of the system of FIG. 8.
Figures 5, 6, 7:
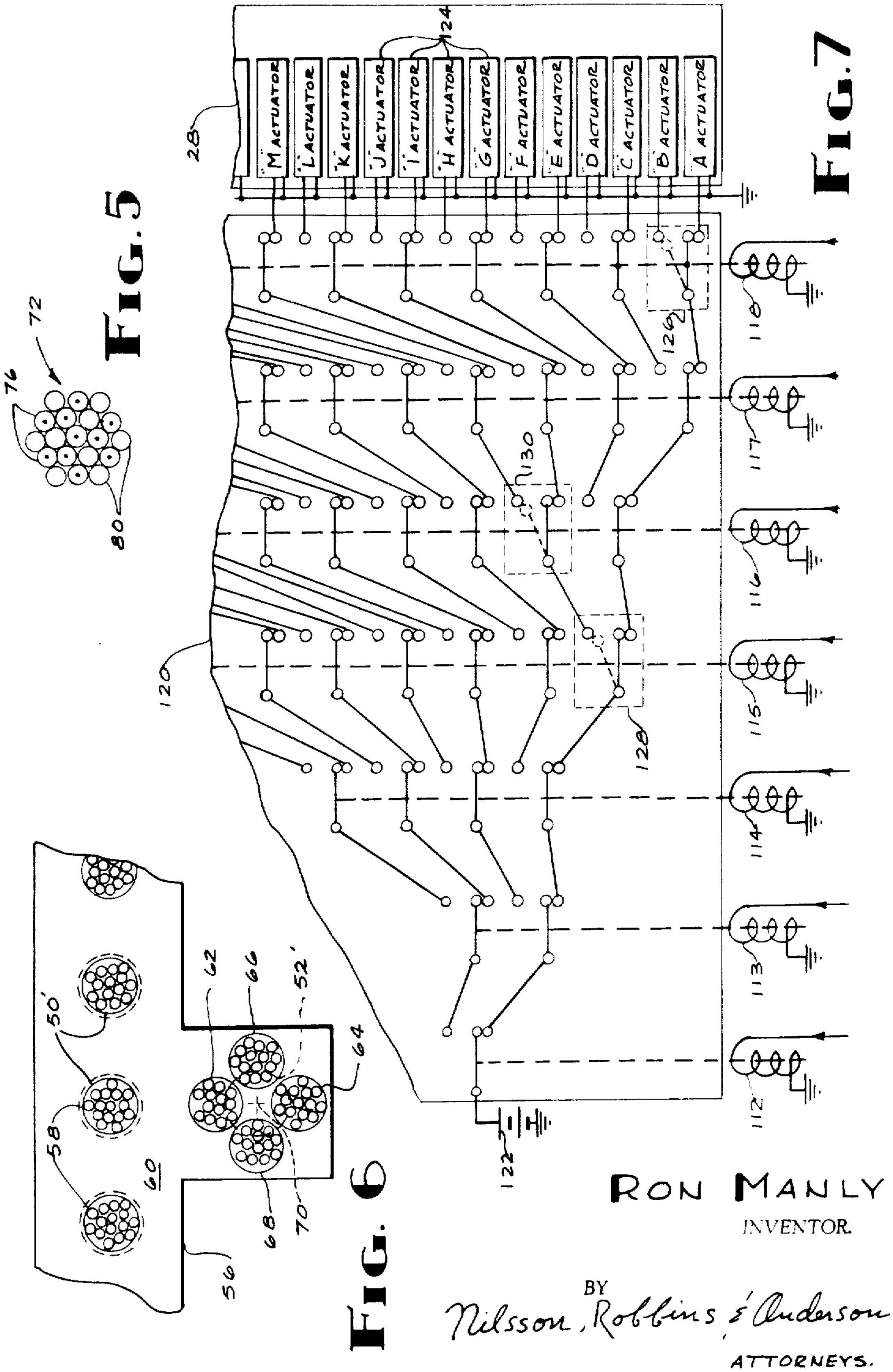
FIG. 5 is a cross-sectional view of a bundle of fiber optics illustrated in FIG. 4 and taken along the lines 5—5 thereof.
FIG. 6 is a plan view of a portion of the reading head illustrated schematically in FIG. 4.
FIG. 7 is a schematic diagram of a portion of a signal selection matrix constructed in accordance with the invention.

Referring to FIG. 4, FIG. 5 and FIG. 6, a reading head 56 is shown having a pattern of bit reading elements or fiber optics bundle ends 58 terminating near its front face 60. The pattern of bundle ends 58 is congruent with the eight information bit positions 38 of the type face 30 of FIG. 2. Disposed below, as viewed in FIG. 6, the pattern of ends 58 is a set of four alignment detecting element bundle ends 62, 64, 66, 68 which are arranged closely and substantially symmetrically on the front face 60 about a point 70 which coincides with the center of the aligning position 40 of the type face 30 of FIG. 2a. The alignment bundle ends 62, 64 are disposed in vertical alignment above and below the point 70 while the aligning bundle ends 66, 68 are disposed in horizontal alignment to either side thereof. The dotted circle 52' indicates the relationship of the alignment bundle ends 62, 64, 66, 68 to the aligning position portion 52 of the character impression 46 of FIG. 3 when the reading head 56 is positioned properly over the character to be machine read. Similarly, the dotted circles 50' indicate the relationship of the bundle ends 58 with a row of binary information bits of FIG. 3 when the reading head is properly positioned thereover.

Each of the character reading fiber optics bundles 72 extend from their ends 58 through a bundle junction 74. An illuminating portion 76 of the fibers of bundles 72 extend continuously from its end 58 to a single illuminator 78; and a detecting portion 80 extends continuously from its end 58 to a partic ,lar one of a set of eight photoelectric detectors 82. Thus, as illustrated by the sectional view of FIG. 5 taken across one of the bundles 72 between its end 58 and its junction 74, the portion 76 of the fibers carry light to the reading element bundle end 58 while the portion 80 carries any light reflected from the character impression to the detector 82. The vector head and tail nomenclature superimposed on the fiber ends of FIG. 5 indicate the direction of light transmission in each fiber. In a practical embodiment of the invention, a total of nineteen fibers are assembled in each bundle which results in a bundle diameter of 8 mils. Each of the detectors 82 may be a photoelectric device such as photodiode, photomultiplier or the like which provides an electrical output signal responsive to a light energy signal input.

The ink utilized to form the binary character 50 may be of the character to leave a light absorbing carbon residue. In such an example, the illuminator 78 may be a conventional projector of white light which strongly illuminates the illuminator ends of the bundle portions 76. In this example, the presence of an imprinted information bit at the end 58 of a particular fiber optics bundle is manifest by a relatively low level of reflected light traversing the accompanying bundle portion 80 to the respective detector 82. However, in some applications it is desirable to imprint the binary character with fluorescent ink which may be substantially invisible to the eye. In the latter example, the illuminator 78 may be of the character to illuminate the illuminating fibers with predominantly ultraviolet light in which case the presence of an imprinted information bit at the reading element end is manifest by the presence of fluorescing light energy from the fluorescent ink which is transmitted to the appropriate detector 82.

The vertical alignment element bundle ends 62, 64 are connected respectively by fiber optics bundles 84, 86 to the illuminator 78 and to a pair of vertical alignment detectors 88, 90. The electrical output of the detectors 88, 90 is impressed upon a vertical servo control 92 which, in turn, energizes a vertical alignment servo 94 for vertically positioning the reading head 56 so that the point 70 is caused to remain midway between bundle ends 62, 64. This action in turn causes the reading element bundle ends 58 to be vertically properly in line with the information bits of the binary character 50.

In a similar manner, a pair of bundles 96, 98 provide communication between the horizontal alignment element bundles ends 66, 68, the illuminator 78, and a pair of horizontal alignment detectors 100, 102. The detectors 100, 102 are in turn coupled to a horizontal servo control 104 for energizing a horizontal alignment servo 106.

It is to be noted that the horizontal space-to-space and the vertical line-to-line movements of the reading head 56 may be provided by typewriter-like spacing mechanisms in the record handlers discussed below; the alignment servos 94, 106 serve only a vernier or fine type of alignment function for the reading head 56. When the output of both vertical alignment detectors 88, 90 are equal, indicating that the point 70 is properly midway between the vertical aligning bundle ends 62, 64, the vertical servo control output is zero; and the mechanical output of the vertical servo 94 is effectively zero to cause the reading head 56 to remain where it is with respect to any vertical displacement. On the other hand, when the point 70 is closer to one of the vertical aligning elements than to the other, the outputs of the detectors 88, 90 are not equal, the output of the vertical servo control 92 is not zero, and the vertical servo control 94 is driven in a direction to equalize the vertical detector outputs. In like manner, the horizontal alignment servo 106 is driven in a direction to equalize the outputs of the horizontal alignment detectors 100, 102.

In another embodiment of the invention a pin feed mechanism and paper with pin fed holes are used (to provide coarse alignment) in conjunction with the alignment provisions described above. Also, careful attention is given to tolerance control of the typewriter mechanisms to ensure good alignment.

One of the bit reading element bundle ends 58 serves as a parity check bit reader 108, and the output terminal of its respective detector 82 is coupled only to a parity check network 110. The output terminals of all the other detectors 82 are connected to the network 110 as well as to other circuitry to be described below. The probability of an undetected error in the machine reading of a binary character 50 is greatly reduced by requiring a parity check with each character reading. An example of a practical parity check technique is to require an impression of the parity bit whenever the total number of other impressed character bits is an even number. This is equivalent to requiring that the total number of information bits always be odd. In this or a similar manner, any single error in the information bits of a binary character will be indicated.

In FIG. 7 an example of an electrical signal selection matrix is illustrated for actuating the character printing mechanism of the automatically controlled generator 28 (see FIG. 1), which in this example is a typewriter, in response to the electrical output signals of the detectors 82 of FIG. 4 which are in turn stimulated or excited through the bit reading elements of the reading head 56. Each of the detectors 82, except the one associated with parity check bit reader 108, of FIG. 4 is coupled through a suitable amplifier (not shown) to a respective one of a set of seven relays 112–118 of FIG. 7.

A selection matrix 120 is illustrated which, in effect, connects a source of power 122 to a particular one of a set of electric typewriter key actuator solenoids 124 which is mechanically coupled to the typewriter 28. The selection matrix may alternatively utilize a mechanical selection mechanism or a diode matrix selection network instead of a relay switching matrix and solenoids.

The particular one of the solenoids energized by the source 122 is determined by the combination of relays 112–118 which is energized by the detectors 82. For example, if none of the relays 112–118 is energized (and: (1) an alignment "-balance" has been reached, with the two vertical alignment detectors 88 and 90 of FIG. 4 balanced, and the two horizontal alignment detectors 100 and 102 of FIG. 4 balanced, each balance being within an appropriate signal level range, and (2) an impressed parity check information bit has been detected, : i.e., the character space is not blank), the solenoid 124 designated "A" solenoid on the drawing will be connected to the source 122 and activated; and such is the shown state of the matrix 120 in the Figure. If, however, the relay 118 is energized, the switching element 126 (as well as all of those undesignated switch elements aligned above it in the Figure) will be reversed and the source 122 will be connected to the "B" actuator. If, in another example of the matrix operation, the relays 115 and 116 are energized and no others, the switch elements 128 and 130 are caused to be reversed from their state shown on the Figure; and as a result the source 122 is connected to the "M" actuator.

Although the switch elements and activation means have been designated here as "relays", and although relays are generally preferred for mechanizing such a selection logic network, the switching devices could as well be mechanized by or include electronic, semiconductor, thin-film, or other devices.

Figure 8:
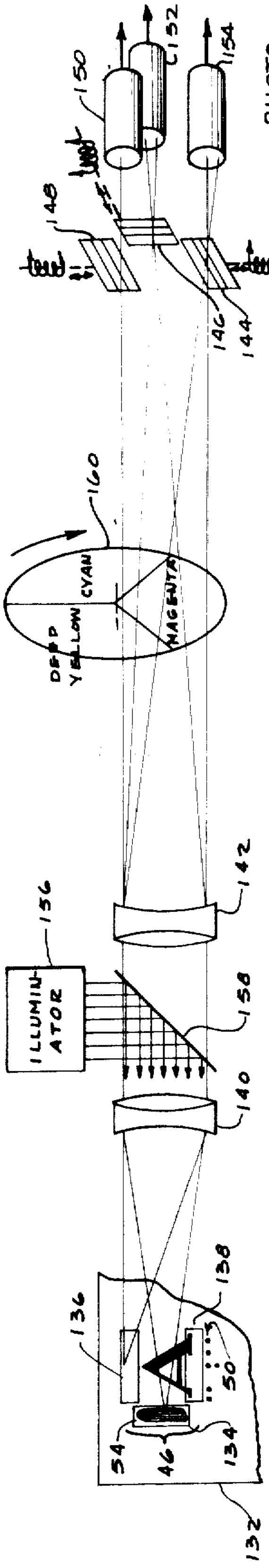
FIG. 8 is a schematic view of an automatic edit mark reader constructed in accordance with the principles of the invention.

Referring to FIG. 8, an embodiment of the sensing element system of the manually scribed editing marks is illustrated. The entire system of the example shown in FIG. 1 of the present invention is controlled primarily by signals which command, permit, or inhibit the movement of the automatic generator 28, the print readers, and their respective record handlers. Many of these control signals are generated and distributed in response to the sensing and interpretation of the editing marks, such as the editing mark 54 of FIG. 3. The same man-machine readable character impression 46 with a similar editing mark 54 is shown on a page 132 in FIG. 8. Again, for the sake of carrying further the same example, the mark 54 is magenta in color and is vertically scribed generally within a matrix space 134 which is a vertically elongated space along the left hand edge of the character space. Second and third matrix spaces 136, 138 are shown disposed as horizontally elongated spaces respectively above and below the character space. The third space 138, when utilized, as when more than 15 distinguishable commands are required, may alternatively be placed along the right hand edge of the character space.

Points on the page 132 are imaged by a pair of achromatic lens combinations 140, 142 onto an image plane containing three slit shutters 144, 146, 148. In particular, points within the matrix space 134 are focused on the slit opening of the slit shutter 146 while points within the spaces 136, 138 are focused upon the slit openings of the slit shutters 144, 148 respectively. Positioned behind each of the shutters is one of three photoelectric detectors 150, 152, 154 oriented and positioned to receive the light from, as shown, a respective one of the matrix spaces through an associated slit shutter. The direction of the length of the slit in each of the shutters is parallel with the direction of elongation of its respective matrix space.

The slit shutters are each oscillated by a driving coil, at a sonic frequency, in the image plane and in a direction perpendicular to the length of its slit. Thus, the image of a matrix space, such as the space 134, is scanned across its width by the slit shutter 146 at the sonic frequency. The light from the space 134 is received by the detector 152; and the contrast with the surrounding surface of the edit mark 54 will cause an alternating current modulation of the electrical output signal from the detector 152.

It may be seen that the oscillating slit shutters make it possible to achieve a more reliable signal and a larger effective signal level than would be obtainable without the narrow slit or without oscillation. Without the shutters the contrast difference due to the presence of an editing mark would be reduced by the ratio of the area of the mark to the total area of the position whose illumination was being sensed. By the use of the slit shutters, the signal is effectively enhanced because the area sensed at any one time is small and thus the ratio mentioned above has much less reduction effect.

To utilize non-oscillating slit shutters would assure that only a small area was being observed but the probability of error would be higher because the area observed might not include any or all of the editing mark. As pointed out above, horizontally scanning slit shutters with vertical slits are provided for distinguishing vertical or near vertical strokes from horizontal ones. Thus, in case a mark made in the position above or below the character should happen to overlap into the space 134 before the character, it will not be recognized. Similarly, vertically scanning slit shutters with horizontal slits are provided for discriminating horizontal strokes as when sensing marks in the position above or below the character.

The matrix spaces on the page 132 may be illuminated substantially evenly by a light source 156. The light output of the source 156 may in general be white light, although in some applications it may be preferable to provide a more selected spectrum. A partial mirror 158 is disposed between the lens combinations 140, 142 and is oriented to direct a portion of the output beam from the source 156 toward the matrix spaces on the page 132. The partial mirror permits an appreciable portion of the light reflected from the page to be transmitted on toward the detectors 150, 152, 154.

The system of FIG. 8, as thus far described, is capable of detecting an editing mark within one of the matrix spaces and is further capable of determining in which of the matrix spaces the mark exists depending upon which one of the three detectors 150, 152, 154 has an electrical output signal with a characteristic alternating current modulation. It remains to describe those portions of the system and their operation which provide the additional function of distinguishing the color of the editing mark.

In this connection, a rotating filter disc 160 is disposed in front of the slit shutters. The disc rotates about an axis substantially parallel to the axis of the lens system and has in this example a diameter such that the light passing from the page 132 to the three detectors at any instant is impressed upon a minor sector of the circular disc.

The filter disc 160 comprises three angularly equal sectors each of which is a different wave length transmissive filter. In the example being discussed, the disc is divided into three filters each of which transmits primarily one of the three colors of ink for the manual editing mark 22 of FIG. 1, namely, magenta, cyan and deep yellow. The disc is caused to rotate at an angular velocity such that its period of revolution is approximately equal to or somewhat less than the time provided for reading the binary character 50. Thus, during that portion of the cycle when a detector is reading an editing mark of the same color as the interposed filter sector, the alternating current or modulation component of the electrical output of the particular detector will be substantially diminished and will normally be equal to zero.

In the example shown wherein a magenta editing mark is scribed in the matrix space 134, the electrical output of the detector 152 during 1 full cycle of the filter disc 160 is illustrated in FIG. 9. The three graphs shown, plotting signal amplitude, have a common time base having a length equal to one cycle of the rotating disc 160 and divided equally between the times when the detector 152 sees respectively the magenta, cyan and the yellow sectors of the disc. At the beginning of the magenta sector in each cycle, a synchronization pulse 162 is provided by conventional means and is illustrated on each of the graphs 166, 168, 170. The signal output of the detector 152 is shown in the graph 166. During the first or magenta portion of the cycle, the detector 152 may see a light intensity coming from the matrix space 134 but has substantially no modulation due to the scanning back and forth across the image of the magenta mark 54 because the reflected magenta light is the same color as the light transmitted from the surrounding area through the magenta sector of the filter disc 160. A signal dip 172 occurs between each of the color portions of the time base of the graphs due to a narrow opaque boundary between the color segments.

When the editing mark 54 is viewed by the detector 152 through each of the other filter sections, as during the cyan or yellow portions of the cycle, a modulation component 174 is detected due to the contrast between the magenta mark and the surrounding area as seen through the non-magenta filter sectors. When no editing mark is present in the matrix space being observed, such as space 136 by the detector 154, the modulation current output signal of that detector is zero for the entire cycle. The graph 168 illustrates the results of amplifying (with an appropriate alternating current amplifier, chosen to enhance or emphasize the modulation frequencies), signals represented by the graph 166. The absence of a modulating current component during the magenta portion of the cycle is manifest as a "zero pulse" 178.

The graph 170 represents the results of rectifying and integrating the signal represented by the graph 168. The zero pulse 178 remains zero and the pulses 174' represent the rectified and integrated signal corresponding originally to the modulating current component 174.

Thus the position in time with respect to the synchronization pulse 162 of the pulses 178 and 174' are determined by the existence and the particular color of the editing mark which exists in the character space 46; and the particular matrix space in which it is placed determines which of the three detectors 150, 152, 154 will detect it. These discrete signals are then impressed upon a logic network, the electrical output signals of which comprise the input signals to the movement control logic network for controlling the print readers and the automatic typewriter 28. Again, the three matrix positions shown and the three-colored filter system provide a total of 63 directly distinguishable command signals if a maximum of one colored mark is allowed in each of the three matrix positions at one time.

It should be noted that the form of the color filter as a rotating disc is merely one example, and obviously other and more compact systems may be provided to achieve the indicated synchronous filtering.

Referring to FIG. 10, an over-all block diagram of a major portion of an embodiment of the invention is illustrated for demonstrating a number of relationships and interactions between the various components of a particular example of the invention. A record handler A receives the original records with manually scribed editing marks thereon from an "in stack", processes them until they have been read by a reader A and regenerated by an automatic generator 180, and then places them in an "out stack" or a disposal bin.

An automatic paper sequencer 182 takes the desired sheet or page from the "in stack" and places it in a record holder 184. Connected to the record holder 184 is a space and line stepping mechanism 186 which advances the sheet, space-by-space and line-by-line, past the reading elements such as those shown in FIG. 4 and FIG. 8. The operations of the automatic paper sequencer 182 and the space and line stepping mechanism 186 are performed in accordance with signals from the edit mark interpretation and control network 188. The spacing and stepping mechanism is analagous to and may be structurally similar to the carriage actuating mechanisms for an electric typewriter.

An aligning mechanism 190 is also connected to the record holder 184 for initially aligning the reading head and/or the sheet in the holder 184 in accordance with an initial registration signal on the page, such as the registration mark 44 of FIG. 3; and for continuously aligning a reading element, such as the reading head 56 of FIG. 4 with the binary character 50, while the reading head is advanced space-by-space along a line of text being read on the page. This vernier-like control, based on signals from the four alignment reading elements of the reading head 56, corrects for the slight variance in the spacing and stepping mechanisms and vertical mispositioning of characters of both the reader and the original generator of the record. Coarse alignment control to correct for any skewing motion of the paper, after the initial registration, and any other cumulative misalignments, is achieved in some embodiments in accordance with prior art techniques.

The reader A includes an illuminator 192 and its associated illuminating fiber optics included in the fiber optics bundles 194. The bundles 194 also include the sensing fiber optics which extend to the reading element, such as a reading head 56 which is associated with the record holder 184. Each of the bundles 194 is terminated at a photocell detector 196 as discussed in detail in connection with FIG. 4. The electrical outputs of the detectors 196 are coupled to the automatic generator 180 as character signals, and to a movement control logic network 200 in the interpretation and control network 188 as signals indicating that there is a character present or that a blank character space is present, information which is determinative of, for example, whether a character has been read or whether a line or a page is ending. More specifically, if no signals above an appropriate threshold are detected from a character space by the alignment photocell detectors this indicates the occurrence of a blank character space. Similarly, when the alignment photocell detectors are appropriately balanced this indicates the presence of a character signal (and that the reading head is aligned properly so that the correct binary code for the character present is being outputted by the information bit photocell detectors). When this information is transmitted to the movement control logic 200, if no edit signals are present, a movement control signal is sent to the generator 180 permitting it to type the appropriate character in response to the binary coded character signals from the photocell detectors 196.

The particular alignment signal detectors are also coupled through alignment controls 202 to the aligning mechanism 190 of the record handler.

A second record handler B and a reader B may comprise structure substantially identical to that of the record handler A and reader A, respectively, except that included structurally with the reader A is an edit signal reader 204 such as the example thereof shown in FIG. 8. The edit signal reader 204 is coupled to the movement control logic network 200 and supplies thereto signals determining which of the readers is to be reading at any instant of time and whether the automatic generator 180 is to be advancing and printing. For example, the reader A generally reads the original record and the automatic generator 180 regenerates exactly what the reader A sees on the original record. Thus, both the reader A and the generator 180 may be moving from character space to character space in unison. When, however, an edit mark commands "delete the following", the reader A continues to read and advances along the text while the generator 180 remains stationary. When the "end of delete" mark is reached by the reader A, both machines will again operate in unison.

In another example, the reader A and the generator 180 may be operating in unison until an edit mark is read giving an "insert here" command. Then the reader A stops while the reader B and the generator 180 operate in unison to insert the additional material read from the insert record. When an "end of insert" mark is read by the reader B, it is stopped and the reader A resumes "dictating" to the generator 180. In addition, other instruction signals may be placed on the insert record and be machine read by the reader B.

It should be noted that when deleting and inserting, a systematic procedure is desirable to avoid the inadvertent omission of a blank character space between words or the inadvertent inclusion of an extra blank character space. One procedure that has proved satisfactory is as follows: (1) when deleting a word always delete from the beginning of the word to the beginning of the next word (i.e., include the blank character space between words in the deletion), (2) if the word to be deleted is at the end of a line or a paragraph, delete up to the beginning of the first word on the next line, (3) when typing for the insertion of a word or a punctuation mark, etc., always include: any punctuation after the word, the blank character space, and any spacing such as a paragraph tab, that may be required at the beginning of the next word: thus, if "will" is to be deleted, the deletion should be "*will-*" (where "*" stands for an editing mark or symbol indicating "start delete" or "end delete", and "-" indicates a blank character space); if "shall" is to be inserted, the insertion should be "shall" (where "≠" indicates an "end of insert" editing symbol that is typed on the insert record, as a step in the typing of the insertion).

In addition to the previously indicated cooperation of the automatic generator 180 with the readers A and B, and with the movement control logic network 200, the generator 180 supplies to the network 200 "feedback" signals such as enabling pulses to indicate, for example, that the preceding character has been printed and that the generator is able and ready to print another, or to indicate, as does a margin warning bell, the proximity to a "margin stop position", or the like.

An important function of the control logic network 200 (or more generally a message synthesizer) for handling textual material is that of automatically ending each line within a "right hand margin", or in other words, formatting intelligence symbols into page format, either for printing, or for storage, or the like. One or a combination of several methods of performing this function may be utilized. One method is to just arbitrarily divide whatever word may currently be being typed when the margin is reached. This method has the disadvantage of usually dividing words in an "improper" manner. A second method is to utilize logic to approximate the rules for dividing words. For example, a very simple rule would be to divide between double consonants. More elaborate rules could more appropriately restrict the application of this rule. This method provides a better result than the first method but it requires considerable logic and still results in many words being improperly divided. A third method is the use of an auxiliary memory which indicates how words (or words longer than, for example, six or eight letters) may be divided. If a large enough memory such as the photoscopic disk being used for machine translation from Russian to English is available, this method would be very desirable. However, for many applications the memory requirements are too expensive. A fourth method requires a human operator to enter a "discretionary" hyphen with the inputting of all words longer than some length such as six or eight letters. When a word with a discretionary hyphen in it is printed out of the system, the hyphen is ignored unless the word needs to be divided. This method provides good results but is limited in practicability because of the expense and inconvenience of entering the discretionary hyphens. A fifth method, and one which finds the widest applicability because of its simplicity, yet quite good results, is a novel system designated "automatic margining system".

A feature of this system, and method, is that words are very rarely divided at the end of the line. Only when a very long word, of for example 13 letters or more, would otherwise extend into the margin, is the word divided. In all other cases the line is ended at the end of a word near the margin. This results in a margin that is as good or better than the average typist makes, and yet it is more readable than margins with divided words. Briefly, this process is implemented by automatically converting a blank character space signal (e.g., a signal indicating the space between words) into a line advance signal (e.g., a carriage return signal on typewriters), whenever a blank character space occurs within a preset number of characters of a right hand "margin stop position". The presently preferred number for most applications is usually about 11 characters.

A somewhat more sophisticated automatic margining process also automatically starts a new line whenever a hyphen occurs within the preset distance of the margin stop position. Some of the further improvements which may be included for certain applications are: appropriately handling a second blank character space signal encountered at the end of sentences if two are used at the end of sentences; checking whether a very long word which has "hit" the margin stop position is completed now or will be after the next space position, and if so, carriage returning, or printing the next letter on the same line and then carriage returning, rather than arbitrarily hyphenating or word dividing immediately after the margin stop position; and combining automatic margining with some of the other methods previously described for the dividing of longer words.

Automatic margining may also be readily mechanized on any typewriter having a power-assist carriage or typing point return mechanism.

Although a variety of alternative logic procedures may be used to handle the ending of lines, paragraphs, etc., one example of a configuration and method utilizing the automatic margining capability has the following characteristics:

1. Only one blank character space is permitted to be inserted between sentences. The purpose of this is to avoid the added complexity of determining how many blank character spaces should be inserted after a period which occurs on the original record within the preset line advance distance from the margin stop position. The problem arises because a period may signify the end of a sentence, an abbreviation, a decimal, and an ellipsis.

2. The start of all paragraphs is to be indented. The purpose of this is to simplify the detection of the beginning (and thus also the end of) paragraphs.

3. The original record to be read by the reader may be prepared using automatic margining or conventional manual procedures (except as noted below).

4. A separate "word-divide" symbol is used instead of a hyphen to indicate that a word has been divided to end a line. A centered period is used as a word-divide symbol. Alternatively, a symbol appearing the same as the hyphen to the man (but machine distinquishable) may be used. The purpose of this is to avoid the problem of distinguishing whether a hyphen occurring at the end of a line on the original record, but which is being retyped in another part of a line, is part of a word or was just used to divide a word. (Word-divide symbols originate only from (1manual editing, (2) manual typing, and (3) automatic operations at the margin stop position — discussed below).

5. Automatic margining will automatically convert into a carriage return signal, a blank character space signal occurring within a preset distance from the margin stop position.

6. Automatic margining will automatically cause a carriage return after a hyphen or a "word-divide" is typed within the preset distance from the margin stop position.

7. Automatic margining will automatically type a word-divide, and then cause a carriage return, if a discretionary hyphen is detected within a preset distance from the margin stop position.

8. Beyond the margin stop position, if a line has not yet been automatically ended, a word-divide symbol is automatically printed, provided the next symbol is not a blank character space, a carriage return, or a hyphen. If it is a blank character space, it will be converted into a carriage return by the automatic margining. If it is a hyphen, it will be typed and the automatic margining will cause a carriage return to follow it. Thus, a word-divide is not needed in any of these three cases.

9. If on the original record a word-divide occurs beyond the margin stop position, it is neglected with respect to operations on the new line of the new record. (it is assumed that this word-divide was put in automatically and thus may not be a "-proper" one.)

10. If on the original record a word-divide occurs anywhere else in the preset line advance region, it is assumed to be a legitimate location to break the line, and is used if the corresponding point on the new line of the new record is in the preset line advance region. (Such word-divides were manually entered and thus are "proper" ones).

11. Word-divides may be manually inserted or deleted by manual edit marks or edit signals. The purpose of this is to allow manual correction of "improper" word-divides (which occur very rarely).

12. If the reader detects a paragraph indentation (by not detecting a letter until the paragraph tab position, after a carriage return), this indicates the existence of a new paragraph. A carriage return signal followed by a paragraph tab signal will be provided to the generator (or the equivalent).

13. When the generator begins a new line any blank character spaces (except a paragraph tab) are inhibited until after a character occurs. This prevents blank character spaces at the end of a short line at the end of a paragraph (on the original record) from causing blank character spaces to be put at the beginning of a line, before the beginning of the paragraph is detected on the original record. If the paragraph indentation is detected after the generator has carriage returned but before a character is printed on the new line, only a paragraph tab signal is provided to the generator (in order to avoid causing an erroneous second carriage return).

14. If no characters are detected for more than three lines it is assumed to be the end of the page.

The method of handling carriage return signals in those configurations which explicitly store carriage return signals on the record read by the reader, should be noted. When the reader reads a carriage return signal this is only used to return the reader to the next line of the record being read; the signal does not affect the ending of a line on a record being regenerated (if one is being regenerated) or on a message being synthesized. Line endings on the message being synthesized are determined by (1) the position of the typing or formatting point on the line of the new message, or (2) the detection of the beginning of a paragraph on the record being read by the reader. However, in connection with the detection of a new paragraph on the record being read, the occurrence of a carriage return, just before the detection of a paragraph indentation, is utilized.

A more generalized editing system in accordance with the present invention may be described as consisting of a message change receiver coupled to a message element handler. The function of the message change receiver is to receive the desired changes to a message. For example, in FIG. 10, the message change receiver consists of the provisions for handling the insert and instruction records (i.e., the IN stack, the record handler B, and the reader B) and the provisions for handling the edit signals (i.e., the edit signal reader 204 and associated edit interpretation network 188). The message element handler consists of the provisions for handling the original records and for combining or modifying the message elements of the original records with any insert message elements provided to it, in accordance with the edit commands supplied to it.

As indicated above, it is particularly advantageous in some applications to print the encoded binary character 46 and the alignment position portion 52 in fluorescent ink in order to avoid or preclude any confusion to a human reader due to the presence of the "superfluous" dots below each character. In other words, to make the dots invisible is to minimize the departure from the conventional as regards the appearance to a human reader of the man-machine readable record. This in turn gives rise to a more efficient and versatile utilization of the principles of the invention.

A further, but no less important advantage, of the fluorescent ink is that in some applications it simplifies the alignment and initial registration of the page in the record holder 184. For example, the fluorescent impression of the encoded bar provides an error-proof mechanism for distinguishing the binary character and alignment mark from the man readable character impression, because the latter does not fluoresce and is not otherwise visible to the photoelectric detectors when illuminated only by ultra-violet light.

When fluorescent ink is utilized, a longitudinal strip of the ribbon in the generator of the record to be machine read is impregnated or otherwise carries the fluorescent ink while the remainder of the ribbon may carry conventional ink. A simple servo, not shown, may be provided on the originating typewriter to control the lateral alignment of the ribbon to assure that all the encoded bar and it only is imprinted with the fluorescent ink. Alternatively, fluorescent ink may be used in the ink ejector imprinting system embodiment, described earlier.

It is to be noted that although the records output of the automatic generator 180 of FIG. 10 or the manually operated typewriter 28 of FIG. 1 has been designated as "final" record, it may be merely an intermediate record or a portion of a periodically processed business or library record. It may be inserted into either of the readers of FIG. 10 for further processing. In addition, it may in many cases be useful to utilize the output of the manually operated typewriter as the "-final" record in its manmachine readable form. It may be utilized as such for current distribution or stored for later integration as, in some cases, an insert record with other documents or records to compile or synthesize a new final record.

Figure 11:
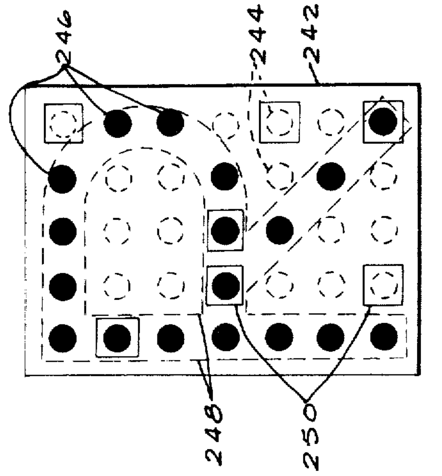
FIG. 11 is a representation of a man-machine readable character impression which is an alternative to the example of FIG. 3.

It is stressed that the encoded machine readable information bits may be placed anywhere within a space related to the character space; and referring to FIG. 11, a novel man-machine readable character impression is illustrated in which the encoded information bits are included as a portion of the man readable character. The character space 242 includes a 5 by 7 space matrix, of distinguishable spaces 244 any of which may be selectively inked or otherwise darkened, or marked by other printing processes such as electrostatically on sensitized paper, or made by any means which permits the particular distinguishable spaces 244 to be distinguished adequately to form a man readable character. The marked spaces 246 may be darkened by a type font comprising short wires such as described in connection with FIG. 2a, by an ink ejector imprinting system as shown in FIG. 2b, or by a type face which has a conventionally raised type but which conforms discretely to a unique set of marked spaces 246 of the 5 × 7 matrix. The example chosen illustrates with dashed lines 248 a letter "R" which "covers" portions of the character space 242 to include the marked spaces 246 and no others.

With all the marked spaces 246 darkened, the character is easily man readable as an "R"; and, in this example, 18 of the distinguishable spaces 244 are utilized. However, the same character is actually fully machine-distinguishable from all others of a set of 46 characters by the marking or non-marking in seven spaces 250, which are distinguished in the figure by an imaginary square about each of the spaces 250.

Each of the 46 characters in the set is uniquely machine identifiable by its binary pattern of marked and unmarked spaces 250. These seven spaces 250 are equivalent to a 7-bit version of the machine readable binary character 50 of FIG. 3.

The remainder of the distinguishable spaces 244 are not used for machine reading. The number 7, above, may be decreased (down to the theoretical minimum of 6 for distinguishing a number of characters between 33 and 64) depending upon how much distortion of the man readable character is tolerable in a particular application. The number 7 may be increased to provide redundant information for parity checking, error correction, and the like.

The appropriate reading head, for purposes of brevity, is not specifically shown but is basically similar to the reading head 56 of FIG. 4; the major difference being that the reading head for the character impression of FIG. 11 is a two dimensional array for detecting the presence of the particular identifying spaces 250.

Throughout this specification particular examples and illustrations have been chosen to describe in the simplest possible manner the operation of the system of the invention. As indicated above, such examples are not included for purposes of defining the scope of the invention. In like manner, a more generalized embodiment of the invention is shown in FIG. 12 to provide the reader with a broader conception of the usefulness and applicability of the invention; however, it is reiterated that the scope of the invention is to be measured by the claims and not by any of the illustrated examples.

Figure 12:
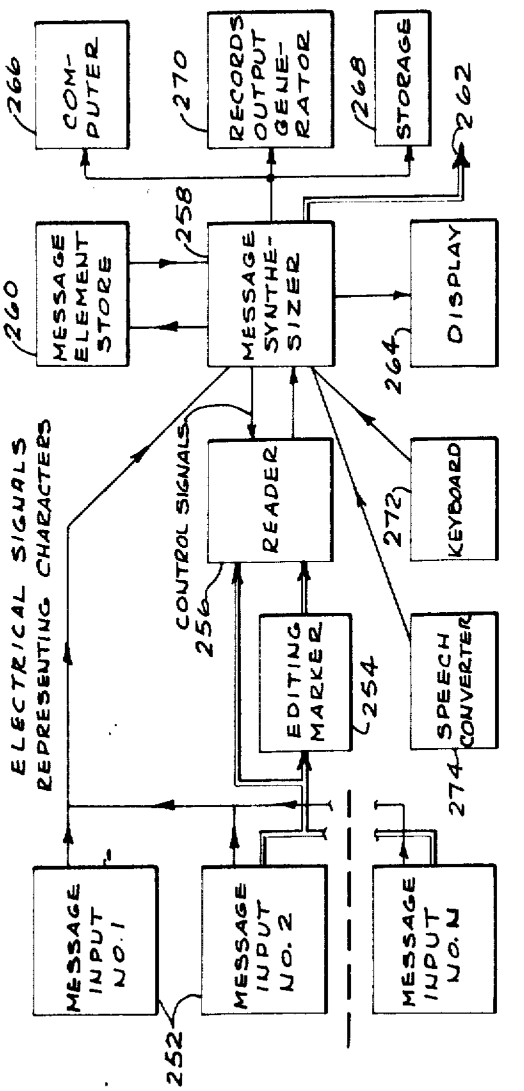
FIG. 12 is a somewhat more generalized block diagram of the system of the invention.

In FIG. 12, a plurality of message inputs 252 is illustrated. These may each represent sources of messages including record stores or memories, typewriters, computer input typewriters, computer entry devices, printers, counting devices, instruments, speech input devices, stenographs, stenotypes, pencils, pens, and other sources of messages to be merged or correlated or revised. For example, one of the inputs may provide addresses of business customers available by access number and another input may provide form letters, sales slips, credit cards, or billing or order blanks; and another input may provide additional standardized information to be integrated with others. Still other inputs may provide a calendar data automatically from a special electronic clock, the identity of the writer such as from a memory previously specified by the choice of a multiposition switch, a signal from a page counter device, and others. Frequently at least one of the message inputs is a manually controlled generator of records. Any of the message inputs 252 may have communication channels associated with them.

The form of the information of the messages may be of two main types — (1) symbolic, and (2) speech. The symbols may be alphanumeric symbols, phonetic symbols, shorthand symbols, or other symbols. The symbols may have been typed, printed, handwritten, or the like. They may be recorded or they may be represented by electrical or other signals. The term "speech" is used here to include direct speech inputs (which will frequently be recorded at least temporarily in the machine either before or after some speech recognition processing); recordings of "raw" speech (usually after converting the speech into electrical signals — since this first step is common to almost all handling of speech), such as on tapes, disks, belts, sheets, and the like, and which may be magnetically, mechanically, photographically, or otherwise recorded; and direct inputs or recordings of "partially processed speech", such as from a speech frequency spectrum band analyzer. Speech inputs processed into phonetic symbol representations are considered to be of the symbolic form mentioned above.

Symbolic records from the message inputs 252 may be edited as desired by an editing marker 254, any desired inserts may be produced by a manually controlled generator, message input 252, or made by edit marking other available records. For symbolic records, the editing marker 254 may be of the character previously described or it may be a machine for mechanically applying editing and instruction signals. For example, the "author" or "editor" may enter or position the input record (which may be either the original or the insert record) into such a machine, which may be used primarily for editing, or which may be the same machine or a machine similar to the one used to generate the input record. If the same or a similar machine is used, this mode of editing may be designated a "reentry" editing mode. In the reentry editing mode, special realignment provisions, such as pin feed provisions in the machine and on the records, are often utilized. When the input record is positioned in the machine, the "author" or editor may type or print onto the input record certain machine readable edit signals such as an instruction to the reader to "step up" and read the applied interlineation or insert. In other words the interlineation or insert is applied on the same record with the material to which it is to be merged. Upon reaching the end of the insert, which may be indicated by an "end insert" edit signal, or by the occurrence of two character space signals in a row, the reader automatically "-steps down" and moves backwards until it detects the edit signal which instructed it to step up and read the applied interlineation. Upon encountering this edit signal, the reader will revert back to the normal forward reading process starting with the space to the right of this edit signal. In addition, a machine printed character such as "X" may serve as a "-delete" instruction signal when it is superimposed over any other character or space, the bit code for "X" or some other deletion signal having been appropriately chosen to make this operation practicable.

The typed or printed edit instruction signals may consist solely of a machine readable character impression such as the registration mark 44 of FIG. 3. Alternatively, it may consist of a special symbol, similar to a man readable character but having associated with it a machine readable character, such as the man readable character 48 and the machine readable binary character 50 of FIG. 3. Still another alternative is that the typed edit instruction signals may be special man readable symbols which are also machine readable by an appropriate reading machine either in the same manner as the machine reads characters from the conventional symbol set, or by any of the processes described in this specification, or by any other conventional process.

It should be noted that when the phrase "man readable" is used to describe a record (or symbol), this means that the record (or symbol) is man readable and may or may not be machine readable. Similarly, when the phrase "machine readable" is used to describe a record (or symbol) this means that the record (or symbol) is machine readable and may or may not be man readable.

It should also be carefully noted that if a record (or symbol) is not man readable this does not mean the symbols on the record (or the symbol) are invisible or not decipherable by a man. It only means that the records are not in the customary symbolic form used by man. Similarly, if a record (or a symbol) is not machine readable this does not mean a machine could not be used to read the symbols on the record (or the symbol). It only means that the symbols are not machine readable by the particular machine in the embodiment under discussion, or by the particular class of machines under discussion.

It should be noted that it is not necessary to record the edit marks on the man readable record but rather they can be recorded on a transparent page placed over the man readable record, or on a page using a pantograph to locate the edit marks spatially correct with respect to the man readable record. In another embodiment of the invention, editing signals are not explicitly located spatially but rather their coordinates are recorded in digital form. It is apparent to anyone skilled in the art that this can be mechanized in a variety of ways including digital and analog recordings of the desired editing location, various types of pointers or positioning indicators, direct electrical signalling to a message synthesizer (discussed below) instead of recording on hardcopy, or the like. For example, the record to be edited may be placed in a holder so that it has a fixed relationship to a pointer which is positioned by the operator to indicate the location of desired editing changes. Pickoff potentiometers may be provided on the linkages of the pointer to produce signals proportionate to the X and Y coordinates of the location of the desired editing change. This location is recorded, on what may be designated an "edit location and edit instruction record", with other edit symbols indicating the type of change required — whether an "insertion", the "start of a deletion", etc.

Also the above method of indicating editing location may be used with configurations that enter records on which the primary intelligence is only machine readable, as well as those that enter records into the reader that are man and machine readable. In some embodiments only the locations where an editing operation is to occur are signalled by the editing marks provided by the methods described above and earlier; the further editing instructions being provided by a separate edit instruction record. In some applications the edit instructions are presented on the same record as inserts are, such a record being designated as an "insert and instruction record".

As discussed previously, edit marks may be near-by or even overlap the primary intelligence characters without confusing either the reading of the primary intelligence or of the edit marks. Similarly, inserts may be recorded superimposed upon the primary intelligence without confusing the reading of either the primary intelligence or the inserted intelligence.

The editing marker 254 may utilize speec recordings as edit signals and/or to provide insert information in a similar manner to the use of symbolic edit signals and inserts as previously described.

An important novel aspect of the invention is that speech from the message inputs 252 may also be edited by the editing marker 252. As indicated previously, speech inputs may be either direct inputs or speech recordings in one form or another. For direct inputs it is usually more convenient to at least temporarily record the speech to facilitate manual editing by allowing playback of the speech recordings as may be desired and to permit more accurate indicating of the location in the speech message where it is desired to make an editing change. For simplicity of discussion it will be assumed that any direct input of speech is first recorded as part of the functions of a message input device, and thus speech recordings will be the only type of speech input into the editing marker 254, and also to a reader (discussed below).

It should be noted that to facilitate the editing of speech it is desirable in some embodiments to leave space, analagous to margins and double spacing on ordinary orthographic records, to permit later insertions to be added on the same record.

Desired editing signals applied to speech recordings may be either speech recordings or other signal recordings. They may be superimposed on the original speech recording, or they may be synchronized records. Desired inserts to speech recordings may be either in the form of speech recordings or in symbolic form. The inserts may be recorded either on separate records or superimposed on the same record but recorded in such a manner as to be separable from the primary intelligence.

Of course, since the normal forms of speech recordings are not directly man readable, it is necessary to utilize a speech-recording reader in the editing marker 254. However, in some embodiments this can be made unnecessary by utilizing speech recording that are in the form called "visible speech". If visible speech is used, most of the editing procedures that may be used when editing symbolic records can then be used for editing visible speech recordings because the location of the insertion, deletion, or change point can be easily marked on the visible speech recording.

It should be noted that an important application of the invention is in the editing of incorrect or incomplete results of manual transcribing or machine recognition of speech, handwriting, or of poor quality printed characters. Similarly, another important application is in the editing of rough natural language translations, such as Russian to English, that have been translated by machine.

Yet another similar important application may be designated an "ambiguity interrogator" for man-machine communication. This system and method is applied in a situation such as the following. The operator enters into a machine, such as a computer, a message, such as a request or some factual information. The machine attempts to interpret the message. If the machine finds some portion of the message ambiguous it requests through the "ambiguity interrogator" that the operator clarify the ambiguity.

The symbolic and speech records from the message inputs 252 and/or from the editing marker 254 are fed to a reader 256 which reads the records and, in appropriate cases, the editing signals associated with them. The reader 256 may include one or more duplicate or specialized readers. An example of a particular type of plurality of readers was shown previously in FIG. 1 where two print readers and one edit mark reader were included. However, as indicated in the discussion below other types of specialized readers may be included.

The reader 256 may be of the kind described in previous examples. It may include a character recognition device of any type such as one that compares a character pattern with a fixed pre-established pattern either directly over two dimensions or by first scan-converting the image into a one dimensional signal pattern, or by determining certain properties of the image by a selected set of scans, or it may be a self-adapting machine such as the Perceptron which learns to recognize characters upon the basis of their basic optical properties.

The reader 256 may include an edit signal sensor or detector of the type described in the discussion of FIGS. 1, 8, 9 and 10; or more generally it may include an automatic signal reader which separates two or more species of signals (which may be designated a "signal species separating means" or a "-signal species separator") or two or more channels of information. The edit signals may be separated from the primary intelligence upon the basis of their "character" or "physical character" which includes the particular location on the record, the specific phenomena used to record each signal, and the "physical aspects" of the signals (the term "physical aspects" includes differences in magnitudes or values of amplitude of signals, modulation, specularity characteristics, frequency spectrum, and the like), or by virtue of their different intensities, due to the difference in reflectivity between the dull black ink of the character impression and the relatively glossy editing marks, or by their density or modulations generated or impressed by the editing implement, or upon the "physical character" of the particular signals recorded, for example, the character identification information may be impressed on the records medium in the form of conductive ink while the editing command information may be in the form of a magnetic ink impression.

It should be noted that the edit or other signal patterns utilized in certain embodiments of the invention consists of conventional editor's marks such as carets (e.g., for inserts), or other handwritten signal patterns. In such embodiments the signal pattern recognizer consists of a sophisticated character recognition reader capable of recognizing handwritten characters or other symbols.

Some of the message inputs 252 may be manually controlled generators which have, in addition to the conventional symbol set for generating the primary intelligence of the messages, edit signal symbols for indicating desired modifications to the primary intelligence and to errors made in generating the primary intelligence symbols. This process of indicating desired editing during the manually controlled generation is referred to as "on-line editing". In some of such embodiments, on-line edited records are routed directly to the reader 256 without being first routed to the editing marker 254 when no further editing is desired at the time. However, when it is desired to further edit on-line edited records after they have been removed from the generator but before the generating of a "clean" record in accordance with the on-line editing symbols, such records are routed to the editing marker 254 (prior to implementing the on-line editing).

It should be noted that the phrase "off-line editing" is used herein to refer to editing which is neither "on-line editing" nor "real-time editing" (real-time editing is discussed later). Off-line editing refers to editing done after the completion of the original generation of the message and prior to the start of the regeneration of the message as edited.

An example of off-line editing is making colored edit marks on a man-machine readable record.

For speech recordings received from the message inputs 252 or the editing marker 254, the reader 256 includes a speech converter to recognize the speech sound patterns either as dyads, phonemes, syllables, words, or special edit signals and to supply electrical signals indicating their identity.

For stenographic, stenotype, or other phonetic or special alphanumeric code records, the reader 256 has the capability for supplying electrical signals indicating their identity. This may involve, for example, capability for reading punched or printed paper tape stenotype signals or for recognizing special printed or handwritten characters.

The primary intelligence (i.e., other than the edit signals and edit instructions) on the symbolic records entering the reader 256 may be in a man and machine readable form such as shown in FIG. 3, a man readable form specially constructed to be machine readable (such as shown in FIG. 11), a more or less conventional man readable form (on which a character recognition device of any appropriate type is used, such as discussed above), or only a machine readable form (for example, a conventional punched tape, punched card, magnetic tape, or the like). The machine readable form may be entered alone, or it may be part of a "dual form" consisting of a machine readable record and a separate man readable record but with the man readable record containing machine readable edit signals thereon. A more generalized example of the dual form utilizes a machine readable record supplemented by edit location, or edit location and edit instruction records, as discussed below.

In such a more generalized example of this dual form, the separate record containing the edit signals need not be the man readable record, since the edit mark reader which reads this type of record makes no use of the man readable symbols on the record. Thus, an edit location record, such as a transparent page or a page that had the edit marks recorded in an appropriate place, as by a pantograph, as discussed earlier, may provide the edit location signals in this example. This edit location record may be supplemented by a record containing further editing instructions indicating what kind of editing is to be effected at the locations designated. Alternatively, the further editing instructions may be included on the edit location record, in which case the record may be designated an "edit location and edit instruction record".

In the dual form mentioned above, the machine readable record provides the primary intelligence to the machine reader. Only the edit signals on the man readable record are machine detectable. In this configuration a character recognition device is not needed. In one embodiment a paper tape typewriter was constructed in which there is a one-to-one correspondence between the locations where codes may be punched on the paper tape and the locations on the hardcopy where symbols may be printed.

The one-to-one correspondence permits the man to enter the edit signal marks on the man readable (but not machine readable) primary intelligence record in exactly the same manner as described earlier in the discussion of FIG. 1 (where the primary intelligence record was both man and machine readable). Also it permits the machine to determine the exact locations in the machine readable primary intelligence (as, in the above embodiment, from the paper tape) corresponding to the man and machine readable edit signal locations on the man readable primary intelligence (as from the hardcopy) just as though the man readable primary intelligence were being machine read from the same record as the edit signals rather than from a separate but one-to-one synchronized record.

The above embodiment with one-to-one correspondence also has the capability for on-line editing such as by overprinting a "delete" symbol on the hardcopy while simultaneously overpunching a "delete3" code on the primary intelligence code on the paper tape corresponding to the character being deleted. This is accomplished by moving the paper tape in synchronization with the hardcopy when the hardcopy is "-backspaced" or "forward spaced" so that the corresponding codes must thus always be in synchronization since there is a one-to-one correspondence between the spaces on the hardcopy and those on the paper tape.

An alternative embodiment utilizing the dual form has a paper tape typewriter which produces a paper tape and a hardcopy not having a one-to-one correspondence but in which any location on the hardcopy (and thus the location of an editing mark on the hardcopy) can be related by simple logic to the corresponding location on the paper tape.

In this embodiment there may be multiple "character space locations" on the hardcopy corresponding to a single location on the paper tape. Thus, a "tab" operation at the beginning of a line to start a new paragraph would have several spaces on the hardcopy but just one code — the code symb for "tab" — on the paper tape. However, when a "tab" signal is read by the reader 256 when machine reading the paper tape, a simple logic network provision determines that the hardcopy must be sequenced to the next tab position — the position corresponding to the indentation used for paragraphs —, the tab positions having been previously set into the edit signal reader of the hardcopy man readable record to correspond to the tab location on the typewriter carriage. Any edit signals detected in these spaces (between the left margin and the first character of the paragraph) will then be properly related to the appropriate location in the primary intelligence on the machine readable record(e.g., between the "tab" code and the code for the first character of the paragraph).

Also this embodiment has the capability for on-line editing such as by overprinting a "delete" symbol on the hardcopy while simultaneously overpunching a "delete" code on the primary intelligence code on the paper tape corresponding to the character being deleted. This is accomplished by automatically moving the paper tape and the hardcopy each the proper number of spaces as the operator presses a "-backspace" control to return to the location where, for example, a character is to be "deleted"; and, as the operator presses a "space" or "forward" control, to sequence forward to the proper character space to resume typing. This is accomplished by moving the hardcopy backward and forward the appropriate number of spaces depending upon the particular codes recorded on the machine readable record, when the operator presses a "backspace" or "forward" control. Accordingly, this embodiment is designated a "readback" configuration.

In a modified version of this embodiment, on-line editing is accomplished by overprinting the characters on the hardcopy but not by overpunching on the paper tape. The paper tape is not reversed when the carriage of the hardcopy is backspaced to overprint a character. Rather, all movements of the carriage and operations of the typewriter are recorded as explicit codes on the paper tape. In this embodiment more complex logic in the message synthesizer computes the appropriate location in the primary intelligence which corresponds to any on-line editing signals or to editing signals detected on the hardcopy. Accordingly, this embodiment is designated a "one-directional" configuration.

When only on-line editing has been performed in any of the three "dual record" embodiments described above, only the machine readable record need be entered into the reader 256 because with only on-line editing there are no edit marks to be detected from the man readable record.

It should be noted that although punched paper tape is the type of machine readable record used in several of the preceding embodiments described, other machine readable record media such as punched cards, paper or mylar tape with electrostatic or other recordings thereon, magnetic tape, magnetic cards, or other such media can be used.

The output of the reader 256 is in the form of electrical signals which are routed to a message synthesizer 258 which interprets the editing signals and implements them by generating a message element train by excerpting, revising, and integrating the intelligence from the input message elements. It should be noted that the phrase "editing a message at a message element location arbitrarily selectable subsequent to the original generation of said message" is used to refer to the capability — after the message has been originally generated rather than during the original generating process — to make an editing change at any message element location in the message, such as, for example deleting or removing only a single character in the middle of a word which is in the middle of a line without having to rekeyboard the whole line or the whole paragraph or the whole message and without being restricted to changes at only specific locations in the message such as at the end of paragraphs. Similarly, when the location of a message element at which an editing change is to be made is being specified, it will be specified to the specific location of the message element (e.g., the particular location at a specific element space in the middle of a line). Thus, in general, in this specification the phrase "edit location" refers to the exact message element location. — The message synthesizer may be of the character of the movement control logic 200 shown in FIG. 10, or it may have more complex logical capabilities and also have associated with it a message element store 260.

Although there may be one or more separate readers in the reader 256 for the handling of insertions in a manner similar to that described in the discussions of FIG. 1 and of FIG. 10, the message element store 260 also may be used for storing message elements which are to be used as inserts on later records. This avoids the need for one or more separate readers for handling insert records, since the inserts can be put on separate records and entered into a reader before the original records to which the inserts pertain. Alternatively, the inserts may be typed on the record to which they pertain; for example, as an interlineation or in one of its margins such as in its top or left margin. Typed editing symbols may be used to identify the beginning and end of the insert and, when necessary, to give it an identification number. For example, if two inserts are required on a particular record, the first might have a "start of insert 'number one'" editing signal before it, and the second a "start of insert 'number two'" editing signal before it. At the appropriate locations in the primary intelligence where the inserts are to be inserted, there would be "enter insert 'number one' here" and "enter insert 'number two' here" editing signals. If the inserts appear on the record in the same order as do the locations to which they pertain, then it is often not necessary to identify each insert.

Another major alternative method that avoids the need for a separate reader for handling insertions is the moving back and forth of the record with the original intelligence on it, and of the insert record or records, as required to implement the insert instructions. In this alternative, to be able to handle situations in which more than one insertion is desired on the original record, or more than one insert on an insert record, provision is required to find the correct insert and to return to the correct point to resume reading after completion of inserting.

One method of accomplishing this is to identify each insertion and insert point as described in the example above and to provide logical capability to sequence through the appropriate steps, i.e., (1) upon detecting an edit signal "enter insert 'number *i*' here", the original record is sequenced to an advanced station position, which we will refer to as the OUT position ("OUT" and "IN" below, are used in the same sense as in FIG. 10.), (2) the insert record is then moved into the reading position from the IN position, (3) the insert is then searched "looking" for an edit character or mark indicating "-start of 'insert number *i*'", (4) upon detection of this character or mark, the insert is read until an "end of insert" character or mark is detected, (5) next, the insert record is sequenced back to the IN position, (6) the original record is then sequenced back from the OUT position to the reading position, (7) the record is then scanned rapidly until the edit signal "enter insert 'number i' here" is detected, (8) the reader now reverts to its normal state and commences reading the next character after this edit signal.

If there is another insert signal on the record, e.g., "enter insert 'number *j*' here", the same procedure is followed except that insert *j* is found and the reader returns to the "enter insert 'number j' here" before proceeding.

In this back and forward embodiment, the insert may be conveniently stored as an interlineation, or in the margin of the original record (for example, the right or bottom margin), or a paragraph or two below the desired insert point (e.g., when shortly afterward the writer decides that an insert is necessary), as well as on a separate insert record. Depending upon the mode of operation of the system, and the particular editing command, the reader may search for the appropriate insert (1) only on the rest of the original record, (2) only on the insert record, or (3) on both the rest of the page and the insert record. Of course, if desired, the system could be modified to cause it to search over the whole original record, to permit insertions to be entered in the top margin, for example.

In addition to (or with limitations, instead of) the use of: a separate reader, a memory, or a back and forth movement and logic capability: insert handling capability may be provided by interlineation starting at the point of insertion together with relatively simple logic. Here, the original record has been printed with sufficient space (e.g., such as is provided by "-double spacing"), between the lines to interlineat new lines. This permits the interlineation of the desired message elements to be inserted. The interlineation is begun immediately above the point where the insertion is desired. Double spacing or triple spacing, etc. may be referred to generally as "multiple spacing." The phrase "multiple spaced region" may be used to refer to the blank lines between the normal lines of printing. Thus, interlinear inserts may be recorded in the multiple spaced region.

The limitation of this process of interlineation is that if two inserts are desired close together there occasionally is not enough space to interlineat the first insert in the space between the inserts.

In addition to these alternatives, as indicated earlier, the inserts may also be superimposed over the primary intelligence on the original record in such a manner as to be separable from the primary intelligence. The result is similar to that of interlineation, in that there may not be enough space available when two insertions are required nearby each other. Also this alternative requires the use of a separation process.

Also, if separate records and different reading processes are used for edit signals and primary intelligence, the inserts may also be included on the record with the edit signals.

Of course, it is apparent that in certain applications it may be desirable to include a combination of the above alternatives.

It should be noted that an especially valuable form of inserting utilizes excerpts from a record as inserts. This may be done in a number of ways. An example is the use of the following series of edit commands: "start delete here", "end delete here and begin excerpt as insert 'number *i*'"; and "end insert here".

Often in the configurations which have the insert record after the original record, it is desirable to start an insert record with a "this is an insert record" edit signal. By the use of logic which ignores inserts and insert records if there is no unfulfilled request for an insert, a page is prevented from being read through a second time (after it has already been utilized as an insert).

When a particular requirement for integrating, excerpting, or otherwise processing occurs often, either in succession or at different times, the use of standard insert and instruction messages is often desirable; for example a form letter which requires the date to be obtained from one source, the address from another, one or more standard paragraphs from one or more other sources, and perhaps other standard elements. For such applications an insert and instruction message which has been prepared for this task on a hardcopy record may be entered into the system first. It is stored in the message element store 260, and the message synthesizer 258 performs the required operations in accordance with the insert and instruction record.

In some applications, several insert and instruction messages and/or memories may be utilized to perform more complex operations in the same manner as subroutines and other complex programs are used in computers.

The message synthesizer 258 may include logic networks which may, in turn, include an edit signal pattern analyzer or recognizer which interprets the edit signal patterns by converting them into edit commands. More generally, a logic network may include signal pattern analysis means which interprets the signal patterns by converting them into commands which may be implemented directly, or may be stored as for record purposes, and/or for later implementation.

It should also be noted that the signal pattern recognizer is not restricted as to type. The type utilized in a particular example may be one whose principle of operation is based upon analyzing: positions of dots or of straight lines; symbols made up of dots, or of straight or curved lines; pluralities of discrete differences, such as colors or the level or magnitude of a physical aspect of the signal; or the like.

It should be noted here that the terms "interprets" or "interpretation" includes pattern analysis, and more generally the conversion of editing signals to editing commands or instructions. Also, a pattern is defined here as correlated information of more than one bit, i.e., more than one yes-no decision. Thus a specific edit signal in a specific location of a matrix of possible locations is a pattern.

In those embodiments where the character reader detects both ordinary characters and edit signal characters, the message synthesizer 258 may contain a means of testing the electrical signal for each symbol to determine whether it is a conventional or an edit signal character.

Although shown separately in FIG. 12, the message synthesizer 258 may contain the message element store 260.

It should be noted that the message synthesizer may delete, insert, and replace message elements by physically handling the medium of the message using techniques such as those used to handle type slugs in typesetting machines. Such an embodiment is indicated by a physical medium message element train 262 being outputted from the message synthesizer 258.

Some of the message inputs 252 may be of the character to produce electrical signals in addition to or instead of hardcopy records, and such electrical signals may be routed directly to the message synthesizer 258. The message synthesizer may temporarily store them in the message element store 260 and subsequently modify them as desired in accordance with any electrical edit signals received from the source of the message or others of the message inputs 252, from the reader 256, from a keyboard device, or from a speech converter (discussed below).

For information on dyads, phonemes, syllables, words, or special edit signals (in the form of speech) received from the reader 256, the message synthesizer 258 includes provisions for translating their identity as supplied by the reader 256, into conventionally spelled (or approximations to the conventional spelling of) alphanumeric symbol representations of linguistic units, and into symbolic edit signals. These alphanumeric symbol representations are in the same type of electrical symbol coded form as that received from character recognition devices of the reader 256 (or they are all translated into a comr .on standard electrical symbol coded form).

For stenographic, stenotype, or other phonetic or special alphanumeric code records that may be received from the reader 256, the message synthesizer 258 is designed to have the capability of translating such codes.

When desired, to aid the choice of editing to be requested and the ease of indicating the editing desired, a display 264 is used. The display presents for manual inspection the present contents of the message temporarily stored in the message element store 260 by the message synthesizer 258. This is especially useful for reviewing the edited message to check that it is satisfactory before causing it to be routed out of the message synthesizer and to a computer, or wherever it is desired to route it. In many applications the display 264 is utilized in cooperation with the keyboard discussed below. The display 264 may also include an orthograph to speec converter for presenting verbal records in a form resembling human speech.

The message element train from the message synthesizer 258 may be routed over communication lines or directly to a computer 266, to storage 268, or to a records output generator 270. The generator 270 produces new edited records in accordance with any message element trains routed to it.

The records output generator 270 may be an electrically operated typewriter as described above or it may be an electrothermal or electrostatic printer which prints on sensitized paper when a voltage or a hot wire is applied thereto. The generator 270 may be any writing device which prints in response to electrical signals, other examples being an electro-optical printer or an electrically operated typesetting system.

There may be a number of automatically controlled generators in the records output generator 270. For example, a separate generator (or a separate storage 268) can be used for files, each on particular subjects. In such cases editing signals indicating to which file a given message element should be sent may be included. For example, these may consist of "start excerpt here", "end excerpt here", and "send to file number 5" edit signals. The records output generator 270 may also include an orthograph to speech converter for presenting verbal records in a form resembling human speech.

A keyboard 272 or similar control means may be used in some modes of operation to enter electrical signals directly into the message synthesizer 258 without producing any intermediate hardcopy records. These electrical signals may represent editing signals or primary or insert intelligence. Such modes of operation may be designated as "real time editing". Message inputs 252 which are manually controlled generators and which can provide electrical signals to the message synthesizer can also be used for this purpose.

In one embodiment of the invention, the keyboard 272 is used to enter edit signals to the message synthesizer 258 to control the starting and stopping of the one or more readers which may be included in the reader 256. This is used, for example, to stop the reader at a point where it is desired to make an insert or a deletion. If an insert is desired it may then be entered directly using a conventional symbol set incorporated on the keyboard. When the insert is complete, an appropriate edit signal key is actuated to cause the reader to continue reading. If a deletion is desired, a delete edit signal is actuated when the reader reaches the appropriate location on the record being inputted. This edit signal causes the reader to continue moving as though it were reading but with no output signal. Alternatively, in another embodiment this edit signal causes the message synthesizer 258 to disregard the primary intelligence signals from the reader and to not make any new operations until the end of the deletion. An end delete signal key is actuated on the keyboard when the reader reaches the desired end of the deletion. This restores the system to the normal reading condition.

For these embodiments in which the keyboard controls the reader 256, the reader is designed to allow the operator to easily observe the location of the particular character being read. Also a special slow reading mode and a single character step reading mode are included to assist the operator in selecting the exact location of any desired editing changes.

In another embodiment of the invention, appropriate editing signal keys on the keyboard 272 can be utilized in connection with the display 264 to indicate the location (in the message stored in the message element store 260) where editing changes are to be made. Thus, for example, the editing signal keys or other controls causing a marker or pointer to move forward and backward indicate the location, and other editing signal keys indicate the type of editing desired. Such edit signal keys or other controls may also be designated as a "manual control means." Alternatively, coordinates of the editing locations may be indicated either by analog or digital methods, such as those described earlier. This use of the display 264 can, of course, be combined with the keyboard control of the reader 256, which was described above.

In some of these embodiments an editing marker 254 is not used since all required editing signals may be able to be entered through the keyboard 272. In other embodiments the use of the editing marker 254, especially for indicating desired excerpts from a record, cooperates with the use of the keyboard 272, in either of the real time modes described above. Thus, for example, "start excerpt here", "stop here", and "end excerpt here" edit signal marks can be applied to a record prior to entering it into the reader 256. This will cause a first part of a desired message to be excerpted (the "stop here" causing the reader 256 to stop). At that point the keyboard 272 can be utilized to insert or otherwise edit the first part of the excerpt, and then an edit signal can be inputted from the keyboard to cause the reader to resume operation, and thus complete the excerpting. Of course, whole excerpts as indicated by editing marks can also be automatically entered this way. Recorded inserts to recorded inserts can be utilized in cooperation with the keyboard 272 as well as in non-real time modes of operation having capabilities to handle them, e.g., those which use a message element store 260 to store the inserts, and which have appropriate logic procedures.

For entering insertions, editing signals, or primary intelligence, a speech converter 274 may be used to convert directly from speech sounds to binary coded digital electrical signal representations of alphanumeric and editing signal characters, without producing any intermediate hardcopies. The speech converter 274 may be used in conjunction with or instead of the keyboard 272, performing similar functions as described above. For real time editing of speech records or recordings, similar procedures to those describe above and earlier may be utilized.

It is stressed that the keyboard and/or speech converter which may be generically designated as "manual control means" may provide the primary intelligence as well as edit signals and inserts. Of course, "manual control means" may refer to just a portion of a keyboard used for editing functions, also one portion of a keyboard may be a manual control means for inputting a message and the same or another portion of the same keyboard may be a second manual control means for indicating editing changes to be made to a message.

Thus, in some "real time editing" systems applications no reader 256, editing marker 254, or message input 252 need be used.

It should be noted that an input-output typewriter, commonly used with computers, in some embodiments serves: as a message input 252 source of records inputs and of electrical signal inputs, as a display 264, as a keyboard 272, and as a records output generator 270.

It also should be noted that the records output generator 270 may serve as a message input 252 source of symbolic records. Also recordings of the speech output from the records output generator 270 may also serve as a message input 252.

It should also be noted that the invention may be utilized with graphic handling processes to automatically incorporate, in accordance with editing signals, line drawings, photographs, and other art work into the text of messages being synthesized.

It s'.ouid also be noted that portions of the system may be multiplexed allowing time sharing and other simultaneous operation of the system by a number of users.

Referring to FIG. 13 an example one of the ink ejectors 37 of FIG. 2b is illustrated in a longitudinal sectional view. The ejector comprises a barrel or body portion 210 which may be threaded or pressed into a forward, nozzle portion 212. In the construction shown, the forward end of the barrel portion 210 has a reduced inner diameter and defines a check valve seat 213 which is disposed toward an interior cylindrical chamber 214 in the nozzle portion 212. The forward end of the chamber 214 communicates with a reduced diameter axial passage 216 which terminates in a nozzle orifice 218. A check valve ball 220 is disposed within the chamber 214 and is urged rearwardly against the check valve seat 213 by a spring 222. The reduced inner diameter portion of the forward end of the barrel portion 210 opens rearwardly into a metering cylinder 224 which in turn opens rearwardly into an enlarged diameter portion 226. Sealed to the rear of the portion 226 is a spring bellows 228 which is sealed at its rear extremity by a bulkhead 230. Affixed, as by welding or soldering, for example, to the bulkhead 230 is a plunger shaft 232 which extends axially into the barrel 210 and is terminated by a metering plunger 234. The diameter of the plunger 234 is approximately equal to that of the metering cylinder 224. The forward end of the plunger 234 is normally disposed axially near the rear extremity of the cylinder 224. The opposite end of the shaft 232 is coupled to the armature 236 of a driver solenoid 238 which is adapted to be energized through a pair of leads 239 coupled to the keyboard (see FIG. 2*b*) or other source of electrical signals and a power supply, not shown.

An ink supply line 240 communicates between an ink reservoir, not shown, and the interior of the barrel 210 at its enlarged diameter portion 226.

When the coil of the solenoid 238 is energized, as by an electric current through the leads 239, the armature 236 is driven to the left, as seen in the figure, thereby compressing the spring bellows 228 and forcing the metering plunger 234 into the metering cylinder 224. The resulting pressure in the ink within the metering cylinder causes the check valve ball 220 to be displaced from the valve seat 213 and to cause a predetermined amount of ink to flow through the nozzle 212 and out the orifice 218. The velocity of the metering plunger 234 is determined by the geometrical parameters of and the electrical current flowing through the driver solenoid 238 and is chosen to provide a substantially collimated spray of ink onto the predetermined spot location on the paper being imprinted. It is to be noted that because of the larger effective diameter of the bulkhead 230 with respect to that of the metering plunger 234, ink is forced back into the servoir through the ink line 240 when the solenoid is energized. This action reverse flushes the lines and agitates the reservoir to prevent line clogging. The ejector orifices are arranged in a predetermined pattern and are thusly adapted to comprise an ink ejector imprinting system to imprint an encoded, or, when desired, a man readable impression. The ink ejectors may be constructed to be sufficiently small to permit an array of eight orifices across the width of a typical typewriter space. In a practical example, the ejectors each had overall dimensions of approximately 1 centimeter by 1½ millimeters.

As discussed above, the ink utilized for the machine readable impressions may be fluorescent and invisible to a human reader in which event the encoded impression may be superimposed over the man readable character without hindering or confusing either reading operation. Thus, because of the greater available area, the spots may be made much larger. It may be noted that when the ink ejectors are embodied in the invention, they need not be disposed on the type but may be removed therefrom and may even be adapted to place the encoded impression on a portion of the page remote from but spaced related to its associated man readable impression. This embodiment, further, permits the edit mark interpreter and the automatic print reader to look at, effectively, the same character at the same time without the requirement that both machines be focused on the same physical space at the same time.

In addition the resolution of the ejected ink impressions is exceedingly high, and tiny impression spots are made without risk of damaging the paper or inking ribbon, which can occur when a small impact impression means is utilized. Further, the ink ejected at high velocities penetrates deeply into the fibers of the paper, without lateral spreading, and thus makes forgery very difficult.

A novel method of on-line editing, and one with wide applicability, makes use of more complex logit to carry out more complex editing commands which involve the modification of previously stored message elements. Note that the editing system configuration described in connection with FIG. 1 does not store any of the message elements — and thus is a less complex system. An editing system operating in conjunction with a general purpose computer, or an editing system which has other capabilities sufficient to allow the modification of previously stored message elements, such as, one or more characters, words,lines, paragraphs, or other blocks of message elements, all of which may be generically designated as "section", may be utilized, as described below.

This novel method uses editing symbols which indicate that the last character, word, sentence, line, paragraph, or some other message element section is to be deleted. One of the important advantages, over the prior art, of using such editing symbols is that this new method does not require the typist to backspace and delete the error by one of the methods taught by the prior art (such as, erasing, printing a delete strikeover, and the like). In this invention, the typist need only hit a selected delete key, such as one designated the "delete last character key". (Later machine steps of the method result in the rror being deleted.) A typist generally learns to actuate a selected delete key without any hesitation in his typing rhythm. Thus, a considerable amount of time is saved. This novel method finds important applications in editing systems of many kinds, and particularly in the preparation of data for entry into a computer or communications network. Almost any conventional computer into which data is entered can be programmed to utilize this novel method. This method is applicable, for example, to input record generating devices of many types, such as paper tape typewriters, keypunches for punched cards, magnetic tape typewriters, and others.

FIG. 14 shows the steps involved. As indicated, the method is applied to edit an error made during the manual typing of a record. After an error has been detected, the first step 370 of the method is that of manually typing the appropriate editing symbol (which may, as pointed out below, consist of one or more typed edit "characters") depending upon whether the last character, word, sentence, etc., is to be deleted. For example, a "delete last character" editing symbol is typed, if a typist inadvertently types an incorrect character and detects the error before typing another character. If however, another character is typed before detecting the error, a "delete last two characters" editing symbol, which may consist of two "- delete last character" editing symbols, is typed. If errors are detected somewhat later, a "delete last word" editing symbol is used. This commands the deletion of all characters starting with the last character typed and going back until a blank character space occurs. Thus, if the editing symbol appears immediately after one or more letters of a word, all of the letters will be omitted. If the editing symbol appears after one or more blank character spaces, the previous word will be deleted. A similar procedure applies to editing symbols commanding the deletion of the last line, last paragraph, etc.,; i.e., if the editing symbol occurs in the middle of the section to be deleted, the rest of the section back through its beginning is deleted; if it occurs after the completion of a section, the whole previous section will be deleted. After typing the correct primary intelligence for the section deleted, the rest of the record is typed (as well as the editing signals for any further errors which may occur). However, for simplicity of description, i. is assumed that only one error occurs in the typing of the record. Also to aid in distinguishing the steps of the novel method from the steps of the manual typing process to which it is applied, it may be helpful to separate the typing of the correct primary intelligence for the section deleted, and the typing of the rest of the record, from the above steps of the novel method. It should be noted that the term error is used here to refer to one or more incorrect characters (which may be incorrect due to the omission of one or more characters, or due to the replacement of the character or characters which would have been correct). Also " typing" is used here to refer to any manual keyboarding operation which produces a record.

The next step 372 of the method is that of machine reading of the primary intelligence (and the error in the primary intelligence). The machine reading may of course be done in different ways depending upon the application. For example, the primary intelligence may be recorded on a man and machine readable record, and the record may be read by an appropriate print reader. In another example the primary intelligence may be simultaneously recorded on a man readable record and on a machine readable record. The machine readable record may be a punched paper tape, a printed paper tape, magnetic tape, punched cards and others. In examples where separate man readable and machine readable records are generated, the form of the man readable impression may be chosen primarily on the basis of facilitating the recognition of the symbol by the man and his ease of reading of messages with the symbol on it. For example, a conventional editor's delete symbol might be used for the "delete last character". When a print reader is used, the choise of editing symbols is also influenced by the capabilities of the particular reader.

The next step 374 in the method is that of storing the primary intelligence (and the error in the primary intelligence). Any conventional computer type memory which permits direct or indirect deletion (discussed below) of message elements may be used. The message element store 260 shown previously in FIG. 12 may be used.

The next step 376 is that of detecting and interpreting the editing symbol. The detecting of the editing symbol may be accomplished by testing or examining each symbol. The editing symbol as well as the primary intelligence symbol may be stored first prior to testing to detect the editing symbol. Alternatively, each symbol may be tested as it is outputted from the machine reading step, with the symbol being stored if it is not detected as being an editing symbol. Since, the primary intelligence occurs first, it will be all stored first, then the editing symbol will be detected and interpreted.

The next step 378 is the deletion of the message element section previous to the editing symbol in accordance with the editing symbol. If the editing symbol also had been stored, it too must be deleted from the stored symbols.

There are two main approaches that may be used to effect the deletion of the desired message element section. One of them is to directly delete (i.e., "remove" and "close up" the other message elements so that there are no blank message elements) the section from the stored intelligence. The other is to "remove" each of the message elements to be deleted (leaving an empty store) or to convert them to a "deleted" state symbol. The empty store or the "deleted" state symbol would then result in a deletion in a later stage in the handling of the message, such as, in the outputting of the information from the store it is now in: to another store, to a generator, or to any of the other outputs as indicated in the discussion of FIG. 12.

These approaches to deletion of stored message elements are useful in some embodiments of the message synthesizer 258 discussed in connection with FIG. 12.

Another novel method of on-line editing, similar to the "-delete previous section" method described above, may be referred to as an "insert before previous section" method. This method is applied to the process of manual typing of a record. After the need for an insertion has been detected, the first step of the method is the manual typing of the appropriate editing symbol depending upon whether the insertion is to be made before the last character, word, sentence, line, paragraph, or the like. It should be noted that this method finds the most usefulness of application when the sections are longest. Considerations similar to those discussed earlier in connection with the use of "delete last section" editing symbols, also apply here.

The above first step is followed by the steps of: typing the insert; typing an end of insert symbol; machine reading the primary intelligence; storing the primary intelligence; detecting and interpreting the editing symbol; machine reading the insert; storing the insert; detecting and interpreting the end of insert symbol; "opening up" the primary intelligence; and inserting the insert.

The step of "opening up" the primary intelligence refers to the handling of the primary intelligence in a way that permits the insert to be inserted into the appropriate place in the message element train. This may be accomplished in one or more of several different ways. One way is to move the primary intelligence into storage elements which are displaced by *n* character spaces, where *n* is the number of character spaces in the insert (assuming that the insert is stored in a separate memory). This shifting can be done by a shift register memory in which each stored message element is space by space shifted from its present location to its new location through all of the in between character spaces in the shift register memory. Alternatively, the shifting may be accomplished by moving each stored message element directly from its present location to its new location.

Another way of opening up the primary intelligence is to set up branching links as follows: (1) at the point in the primary intelligence where the insert is to be inserted, storing the address of the beginning of the insert, (to accomplish this in some embodiments it is necessary to move the primary intelligence from immediately beyond the point where the insertion is to be made, up to the beginning of the insert storage location. Sufficient space is left either in front of the insert to make this practicable, or this movement of the primary intelligence is effected prior to reading and storing the insert, i.e., immediately after interpreting the insertion editing symbol.), (2) at the end of the insert, storing the address of the point in the primary intelligence which is to follow the insert, and (3) immediately before the insert, storing the address of the location immediately following the insert. (This assumes that the insert is stored in the same memory as the primary intelligence and immediately after it.) The sequence of operations are then (1) reading the primary intelligence up to the location where the insert is to be inserted, (2) jumping to the storage location where the insert is stored, (3) reading the insert, (4) jumping to the storage location where the point in the primary intelligence immediately following the insert is stored, (5) reading the rest of the primary intelligence up to the storage location where the insert has been stored, and (6) jumping to the storage location immediately following the storage location of the insert.

A third method is to move the intelligence which is after the point where the insert is to be inserted, to storage locations subsequent to those in which the insert is stored. In this latter way, the last step, that of inserting the insert, may be considered as being accomplished by the indirect method of "closing up" the message element train. "Closing up" may be effected during the process of outputting the message from the store (to another store, or to print-out, or the like).

A more inclusive novel method of on-line editing encompassing both of the methods described earlier consists of the following steps (which are applied after the need for an editing change to material already typed is detected): typing of the appropriate editing symbols; typing an insert if desired; typing an end of insert symbol if any insert is typed; machine reading of the primary intelligence; storing of the primary intelligence; detecting and interpreting of the editing symbol; deleting in accordance with the editing command, if commanded; mach.ne reading the insert, storing the insert, and detecting the end of insert signal; opening-up the primary intelligence; and inserting the insert.

This sequence may be modified in some embodiments which only remove, instead of delete, immediately after the receipt of a deletion instruction. In such embodiments the last step may be the closing up of the message element train; thus completing the insertion and/or the deletion.

The choise of a desired editing instruction from a wide variety of potential editing instructions can be facilitated by allowing the editing instruction to be made up of two or three editing symbols. For example, the operator may have the choise of (1) insert, delete, center, capitalize, underline, paragraph, and others, (2) the last, the current, the one before last, and others, and (3) character, word, sentence, line, and the like. Thus, a particular selection of three editing symbols might be those of "paragraph", "the one before last", and "sentence": which would mean start a new paragraph at the beginning of the sentence before the last one.

Figure 15:
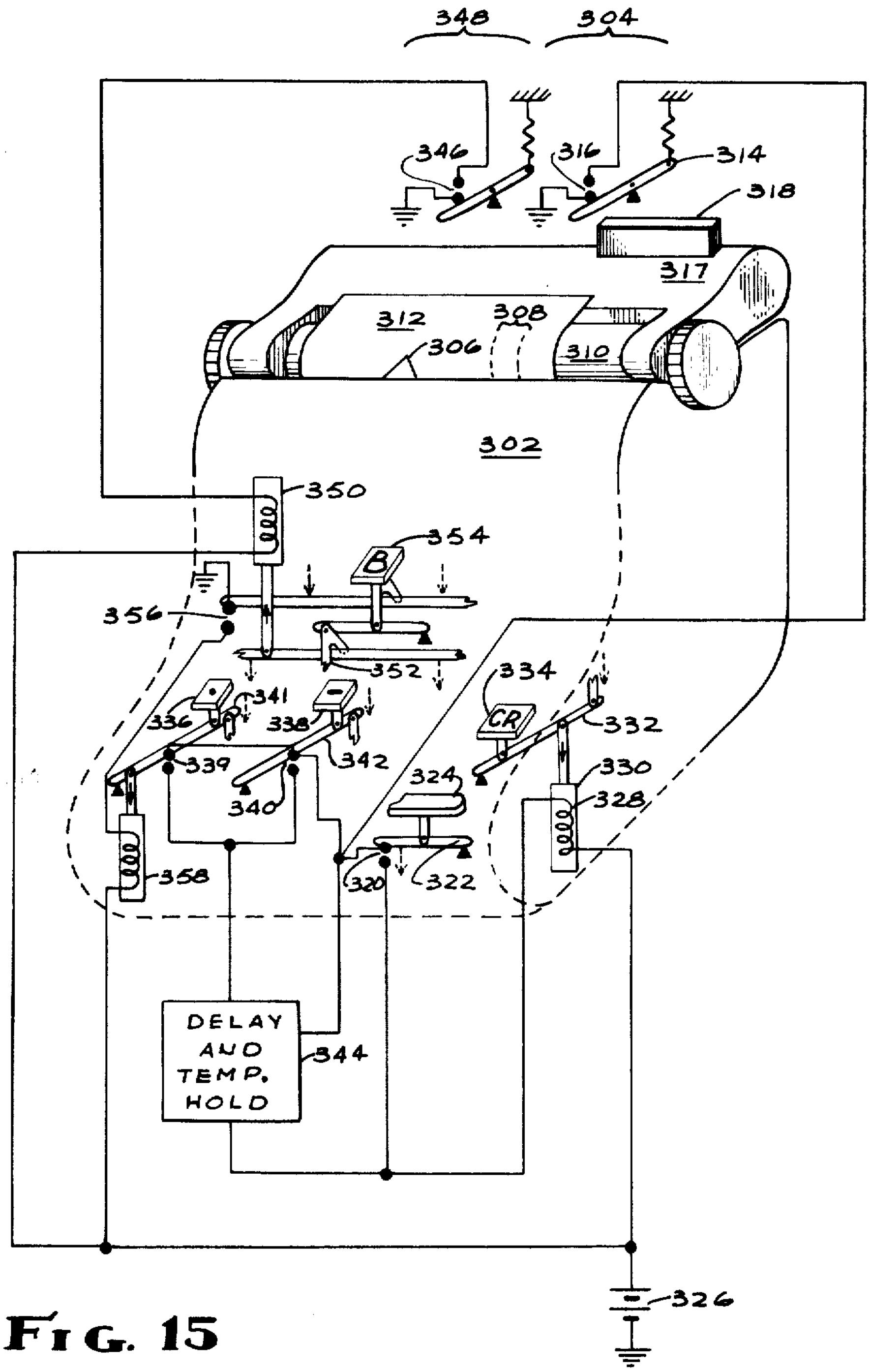
FIG. 15 is a schematic diagram of an embodiment of an automatic margining system in combination with a typewriter, constructed in accordance with the principles of the present invention.

FIG. 15 is presented for the purpose of describing in more detail the novel automatic margining system and method mentioned briefly in the discussion of FIG. 10. FIG. 15 shows an embodiment of an automatic margining system in combination with a typewriter 302. In this embodiment, the automatic margining function is performed for both manual and automatic operation of the typewriter 302.

A margin proximity detector 304 on the typewriter 302 is provided for indirectly detecting the presence of a "typing point" 306 in an "automatic line advance region" 308. A "typing point", such as point 306, is the location on the current line of a platen, such as platen 310, (or the location on the current line of a page, such as page 312, inserted in the typewriter) that a type face will hit at a particular time if the next message element is a character and it is typed at that particular time. More generally, a "printing point" is the location on a line where character will be printed at a particular time. Still more generally, a "formatting point" is a point on a line that either is a printing point or is being considered as a potential dividing point for starting a new line. Similarly, "a reading point" is the location on a record where a recorded message element will be read at the particular time. Also "page formatting" refers to dividing a message element train into lines as in a "page format" on a hardcopy record (or on a display).

An "automatic line advance region", such as region 308, is the preestablished region in which it is the function of an automatic margining system to automatically convert a blank character space signal into a carriage return signal (or the equivalent on a non-carriage printer).

The margin proximity detector 304 (on the typewriter 302) consists of a spring mounted lever 314 which normally is in a position with switch contacts 316 open. MOvement of a typewriter carriage 317 to the left sufficiently to cause the typing point 306 to cross the left boundary of the automatic line advance region 308 will cause a detector actuating cam 318 to move the lever 314 of the margin proximity detector 304 into the closed position of the switch contacts 316. Movement of the carriage 317 in the opposite direction (as in a carriage return or in backspacing) back across the left boundary will trip the lever 314 to the open position of the switch contacts 316. While the location of the preestablished line advance region 308 is relative to the carriage 317, it is also a region on the page 312; the specific location of the region depending upon the location of the left edge of the page 312 in the platen 310 of the typewriter.

A space bar microswitch 320 attached to a space bar lever 322 closes when a space bar 324 is actuated or when the space lever 322 is moved due to automatic typing signals, in a manner not shown here, such as those discussed in connection with FIG. 7. If the switch contacts 316 of the margin proximity detector 304 are closed when the microswitch 320 closes, a circuit is completed causing a power source 326 to energize windings 328 on a carriage return solenoid 330. The solenoid 330 actuates a carriage return linkage 332, also used in the manual activating of a carriage return by a carriage return key 334. This results in the platen 310 advancing one line and the carriage 317 returning to the left margin. This carriage return resets the lever 314 of the detector 304, opening the switch contacts 316. Thus, further space bar actuations will not cause the carriage return solenoid 330 to be energized until the detector 304 has its switch contacts 316 closed again.

Manual actuation of a word-divide key 336 or a hyphen key 338 causes a word-divide microswitch 339 or a hyphen microswitch 340, respectively, to close. The same results will occur due to automatic actuation of a word-divide linkage 341 or a hyphen linkage 342 by mechanisms such as discussed in FIG. 7. If the typing point 306 is in the automatic line advance region 308, a circuit will then be completed through the switch contacts 316 of the margin proximity detector 304, energizing a delay and temporary hold 344. The delay permits the particular type bar actuated to print before causing a carriage return through the carriage return solenoid 330. This is accomplished by the temporary hold 304 connecting the windings 328 to the circuit which bypasses the contacts 339 and 340.

In the event of a very long word, a pair of contacts 346 on a limit detector 348 is closed by the cam 318, causing a keyboard locking solenoid 350 to prevent the linkage 352 from being fully actuated by any of the printing keys and thus prevent any character from being printed except the word-divide symbol or the hyphen symbol. With the keyboard locked, if the word divide key 336, the hyphen key 338, the space bar 324, or the carriage return key 334, are actuated either manually or by automatic control, the carriage will return just the same as when the typing point 306 is in any other part of the automatic line advance region 308. However, if any other printing key, such as a "B" key 354 is actuated, its respective character will not be printed; instead a key microswitch 356 will close, energizing a word-divide solenoid 358. This will cause a word-divide to be printed and also the word-divide microswitch 339 to close causing a carriage return, as discussed above.

Thus, the embodiment shown in FIG. 14, will automatically marginate, during either manual or automatic operation of the typewriter 302, at the occurrence of either a blank character space, a word-divide, or a hyphen in the automatic line advance region 308. Also, upon reaching the margin stop position, if the next symbol or operation is not a word-divide, hyphen, blank character space, or carriage return (any of which will result in starting a new line), a word-divide will be automatically printed followed by a carriage return. For automatic control, the next symbol will then be immediately printed, since the signal for it will be continuously presented to the typewriter until an enable signal is received from the typewriter (as discussed earlier). For manual operation of the typewriter the keyboard will be locked preventing the typing of the next symbol for the fraction of a second required to perform the word-divide and the carriage return, whereupon, if the manual pressure is still on the key, or is reapplied, the desired character will be printed.

The limit detector 348 is prepositioned to establish the location of the right margin stop position, and the location of the detector 304 is prepositioned to obtain the desired width of the automatic line advance region 308. The frequency that the right margin stop position is hit during the typing of a considerable quantity of textural material depends upon the width of this region. For a width of 11 spaces, less than 1 per cent of the lines will extend past the position of the limit detector 348. This means that for double spaced typing, typically with about 25 lines of typing on a full page, less than once in typing 4 pages, on the average, does a line extend to the margin stop position. For a width of 12 spaces, less than one-half of 1 percent of the lines will extend past the position of the limit detector 348. If only a 10 space width is used, about 3 per cent of the lines will extend to the margin stop position.

The operation of the automatic margining system can be improved by typing a character into the space immediately after the margin stop position (instead of typing a word-divide) when the character will complete the word. To do this, the following symbol (the second one after the margin stop position is reached) must be first examined to determine if it is a blank character space or a carriage return. If it is one of these, the previous character is then typed followed by the carriage return. If it is not, a word-divide is typed, followed by a carriage return, and then followed by the typing of the two symbols which have had to be temporarily stored until this time (the two symbols are the character received immediately after the margin stop position is reached, and the one following it). To accomplish this function more complex logic and storage capability is required, which is frequently only justified in those configurations which have more sophisticated message synthesizers of the kind discussed previously.

In addition to the method described above, and the one shown in FIG. 15 for handling very long words which hit a boundary, or limit, or what might be designated "a margin stop position", there are other methods that may be used. For example, one of the simplest is to have an operator divide the word at the next available location in the word, allowing the word to enter the region beyond the margin stop position. This method, obviously, is not suitable to fully automatic operation.

Another simple method is to just automatically carriage return, when the margin stop position is hit, independent of what the next symbol may be, and without printing a word-divide symbol.

It is apparent that an automatic margining system and method can be used with "proportional spacing" (i.e., different widths for the different characters) as well as with "uniform spacing" (typewriters or printers).

The basic automatic margining capability described in connection with FIG. 15, may be considered as achieved by the following major elements:

1. A margin proximity detector, such as the detector 304,
2. A blank character space signal detector (the space bar microswitch 320),
3. A logical "and" detecting means (the series circuit: ground, power source 326, windings 328 of carriage return solenoid 330, space bar microswitch 320, and switch contacts 316 (of margin proximity detector 304), and 4. A carriage return actuator (the carriage return solenoid 330, its windings 328, the carriage return linkage 332, and the rest of the conventional carriage return mechanism of the typewriter).

Each of these elements may of course be mechanized in a variety of ways, and in some mechanizations two or more of the elements may be mechanized by one conventional component. Thus, a margin proximity detector may be a device measuring a characteristic of the status of the printing or formatting mechanism. Such a device may be mechanized by a mechanical mechanism as shown in FIG. 15, or it may consist of a counter which electronically or electromechanically counts up the number of message elements, spaces or other units that the printing or formatting mechanism has moved from the beginning of a line, and which includes a detector which detects when the count has entered the region corresponding to the automatic line advance region. Alternatively, a margin proximity detector may measure a characteristic of the status of a storage medium. For example, in a system which has individual message element stores for each message element position along a line, and individual inputs to each of the message element stores, a margin proximity detector may detect the presence of the formatting point in the line advance region by sensing the presence of input signals into those message element stores which are in the automatic line advance region. Similarly, a margin proximity detector might detect the presence of characters or of the printing point in a line advance region measured on a page or the equivalent.

A blank character space signal detector may be mechanized to detect the movement of some portion of the character spacing mechanism, such as is shown in FIG. 15. Alternatively, for applications, such as (1) an automatically controlled printer in which there is no capability for manual input, (2) a manually or automatically controlled typewriter in which there is a character code generated for the various characters and the blank character space, or (3) an internal message formatting system: a blank character space signal detector might examine each message element signal to detect the specific bit code of a blank character space signal.

The logical "and" detector may be mechanized as shown in FIG. 15, or alternatively it may be mechanized by a conventional diode, transistor, or other electronic "and" gate. Other alternative mechanizations include mechanical, (or hydraulic, pneumatic, etc.) logical "anding" mechanisms. Others will be apparent to those skilled in the art.

A carriage return actuator, or more generally "a line advance actuating means", may be mechanized as shown in FIG. 15. For some applications, such as those in which the message elements are being formatted internally in a computer, the line advance actuating means is a "jump shift" in the program, or in the logical operation sequence, such that the succeeding message elements are formatted into the beginning of the next line rather than in the next location on the current line.

For various applications the line advance may take any of a variety of forms. For example, it may be: the mechanical moving of a printing point or a formatting point; the electronic switching of a formatting point from one message element storage position in a line to another; the adding of a formatting symbol (line ending symbol, which may be a carriage return symbol if a typewriter or other character-by-character, line-by-line printer is to be utilized later) to intelligence being stored; the conversion of space symbols into formatting symbols in stored intelligence; the cutting or dividing up of a strip of a physical medium message element train; and others.

FIG. 16 shows a more generalized embodiment of the automatic margining system.

A line advance conditions detector 362 detects the coincidence of a blank character space indicia with the automatic line advance region of a line. The output of the detector 362 is coupled to a line advance actuating means 364.

The registration or correlation or what may be designated coincidence detected by the detector 362 may be conceptually considered as being of several distinguishable but equivalent types:

1. the existence of a blank character space *signal at the same time* that a formatting point exists in the automatic line advance region,
2. the exitence of a blank character space signal entering the automatic line advance region,
3. the existence of a blank character space signal in the automatic line advance region (in a memory store), or
4. the existence of a blank character space in the automatic line advance region.

As can be seen from the discussion above, blank character space indicia designates either a blank character space signal, symbol, or other indication such as the blank space itself.

The first type of registration or coincidence detection may be mechanized, for example, by a combination of a message proximity detector, a blank character space signal detector, and a logical "and" detector in any of the ways discussed in connection with FIG. 15.

The second type of coincidence detection applies to applications, such as those in which the message elements are stored in individual message element stores. This detection may be mechanized, for example, by coupling (1) the input signal connections that enter each of the individual message element stores in the automatic line advance region, with (2) a means for detecting the presence of a blank character space signal.

The third type of coincidence may be mechanized, for example, by examining the signals stored in the message element stores (or equivalent storage) in the automatic line advance region.

The fourth type of coincidence may be mechanized, for example, by examining the characters (stored) in the automatic line advance region of a printed line or other physical medium message element train store (of the type discussed in connection with FIG. 12, e.g., type slugs).

There are a variety of intelligence formatting situations to which this novel method may be applied. For example, some of these are: printing with a character-by-character, line-by-line printer such as a typewriter; formatting into lines in a storage medium which is organized in lines, such as prior to feeding a line-at-a-time printer, or for later outputting or transfer to other storage; storing of line ending symbols with the data so that that the stored data can later be used to operate a character-by-character printer, or the equivalent, or to simplify the later division into lines; adding of line ending symbols to data already stored (by changing the appropriate blank character space signals to carriage return signals); cutting or dividing up a physical message element medium, such as a long strip from a strip printer (e.g., a ticker tape), into strips of line length; and others. Such means which may be used for formatting intelligence from a message element train into an array of lines may be termed "intelligence arraying means". The combination of intelligence arraying means with elements to permit automatic line ending such as in the novel method described in this specification may be termed an "intelligence formatting system".

A still more generalized embodiment of the automatic margining system utilizes a line advance conditions detector which detects the coincidence of "word breaking indicia" with the automatic line advance region of a line. "Word breaking indicia" includes blank character space indicia, hyphens, word-divides, discretionary hyphens, and any other preestablished conditions or rules which indicate that a particular position in a word, or between words, is a "proper" place to divide or break words (if the word is near the end of a line) for the purpose of line ending. "Proper" is based upon generally accepted or acceptable usage. Note that the end of a word is not a "proper" place to divide a word if there is any punctuation immediately following the word. Rather, the word breaking must be done after the punctuation.

It should be noted that a combination of automatic and manual operations may be utilized to effect higher quality, more efficient line ending. This may be accomplished in a variety of ways.

One method is to utilize fully automatic margining including automatic provisions for ending the line when long words are encountered (such as the logic provisions at the margin stop position described earlier), combined with later manual edit marking with commands such as "insert a 'word-delete symbol' here, (and then carriage return the printer, if its typing point is in the automatic line advance region)". This method may be utilized both for manual typing of a record, and for automatic generation of a record. In the former case, the typist gives no attention to the line ending process at all while he is manually typing a record or message.

A second method is to utilize automatic margining except that when a word hits the margin stop position, manual on-line editing operations are utilized to choose a proper point for dividing the word. This method may be accomplished by locking the keyboard to all key actuating except for printing of hyphens, word-divides, and editing symbols, and except typing point movement control actuations (e.g., blank character space, carriage return, back space, and the like) when the margin stop position is reached. This signals the typist or operator to examine the long word, thus encountered, to decide where to divide it. Upon deciding, appropriate on-line editing signals may be typed to delete the superfluous characters on the line and to indicate where to insert a word-divide symbol, or alternatively to just indicate where to insert a word-divide symbol, with the man or the machine leaving space or otherwise taking into account the extra characters that will occur at the beginning of the next line — and thus perhaps affect the point where the next line is divided. One method of "otherwise taking into account the extra characters . . . " is to bias the automatic line advance region on the next line so that it begins and ends n characters to the left of its usual boundaries, n being the number of extra characters which will be added from the previous line.

The on-line editing method used may be one or more of several. For example, an overprinting symbol indicating "insert word-divide here" is utilized in one embodiment (this command causes the message train synthesized to "carriage return" if it is in the automatic line advance region, but the reader would not carriage return until it had finished reading the symbols in the current line). Another embodiment overprints character delete symbols and also prints a word-divide symbol. A third embodiment makes use of the novel on-line editing method (described in the discussion of FIG. 14), for example, by first utilizing a number of "delete last character" edit symbols, followed by a word-divide symbol. This results in the word being divided at the desired location. For example, if the first 12 letters of "establishment" had been typed before hitting the margin stop position, e.g., "establishmen ", three "-delete last character symbols plus a word-divide symbol may be added immediately after the "n", e.g. "establishmen♦♦♦*" (the arbitrary symbols "♦", "*" have been used to indicate the edit symbol and the word-divide symbol, respectively). This would result in "establish*" being typed at the next regeneration of this record (provided no other insertions or deletions resulted in the word-divide symbol occurring in other than the automatic line advance region; if the word-divide symbol did occur elsewhere, it would just be ignored).

This second method (of utilizing a combination of automatic and manual operations to effect high quality, more efficient line ending) is applicable primarily to manual typing of a record or message; however, in some applications, where an operator is readily available, the operator can be signalled to perform "on-line" editing of automatically typed records when the margin stop position is hit (this kind of "on-line" editing is an extension of the definition of the phrase).

A third method is to utilize manual typing in which the typist is signalled that the automatic line advance region has been reached (and thus, that he may word-divide anytime in the next several or so spaces that he may think appropriate). In addition, in this method the machine will automatically carriage return if a hyphen, or word-divide symbol is typed (the carriage being returned after the symbol is typed) or upon the actuation of a blank character space.

Still other methods may, for example, utilize a combination or modification of one or more of the above methods; such as, only signalling the operator (to consider word-dividing) after a number of spaces of the automatic line advance region have been used up without an automatic line advance occuring; this reduces the frequency of the typist having to be involved in the ending of a line.

The manual operations in any of the methods described above can also be replaced by real time editing system operations in a manner that should be apparent to one skilled in the art, on the basis of the above and previous discussions.

It should also be noted that automatic margining may be applied to a novel and useful method of justification having advantages of improved economy by having greater capacity per operator than the systems taught in the prior art. To do this the left boundary of the automatic line advance region is either set to, or supplemented by (depending upon the mode of operation — to be discussed below), the maximum line length which can be contracted to the margin to be justified to.

The amount of expansion and contraction or "justification increments" available depends upon the kinds of expansion and contraction utilized. Some of the simplest systems may utilize only the expansion or contraction of some or all of the blank character spaces which occur on a line, e.g., increasing each of the first four blank characters spaces by one-half space to result in a line expansion of two character spaces, or decreasing each of the first nine blank character spaces by one-third to result in a contraction of the line by three spaces. The very simplest system may have only line expansion capability. Many systems utilize proportional spacing characters. The more complex systems may also vary the distance between characters. Still other systems may photographically (or by an equivalent process) expand or contract the image of a line.

Based upon the kind of expansion and contraction available: the amount of expansion and contraction or "justification increments" available — and thus the minimum and maximum line lengths available — can either be (1) preestablished upon the basis of statistics of the language so that for the length of line being used, there will be essentially always at least the preestablished amounts available (e.g., a line of about 80 spaces might be considered to provide essentially always about four spaces expansion and almost three spaces contraction (based upon a minimum of eight blank character spaces occurring, and capabilities of one-half space expansion, and one-third space contraction per blank character space), or (2) "computed" for each individual line upon the basis of the number of blank character spaces (and any other "justification increments" determining factors which may occur due to the kind of expansion and contraction used) actually occurring in the specific line. These may be "computed" simply by counting them as they occur.

The computed approach is frequently to be preferred because of the greater capability it provides — not having to be restricted to the minimum of the range of expansion and contraction which might occur.

In one embodiment, the basic automatic margining process is applied to justify with the following characteristics:

1. The number of blank character spaces occurring in the line (before justification) is counted.
2. Line expansion capability equals one-half space per blank character space occurring in the particular line.
3. Line contraction capability equals one-third space per blank character space occurring in the particular line.
4. The line length after justification is to be 84 spaces.
5. The left border of the automatic line advance region is set to (84) minus (one/half space times the number of blank character spaces occurring in the line). This usually results in an average of about 79 spaces.
6. The right border of the automatic line advance region is set to (84) plus (one-third space times the number of blank character spaces occurring on the line). This usually results in an average of about 87 or 88 spaces.
7. The four methods of combining automatic and manual operations described earlier for ending the line are applied to justifying. For example, applying the second method described, the typist types normally and the machine automatically establishes and prints the justifying command (discussed below) and carriage returns if a blank character space, or a hyphen (or a word-divide) occurs in the automatic line advance region computed as indicated above. If a long word occurs so that the right border of the automatic line advance region is reached, the typist is signalled, for example, by the keyboard locking. The typist then decides where to divide this long word, and utilizes the appropriate number of "delete last character" symbols plus a word-divide symbol. This causes the machine to establish and print the justification command and to carriage return. The other methods of combining automatic and manual operations discussed previously may also be utilized as should now be apparent to anyone skilled in the art.
8. Just prior to the carriage return in the justification process, a justification command is printed indicating whether expansion or contraction should be applied, and to how many blank character spaces in order to effect the justified margin. This command is printed by an appropriate choice of a symbol at the end of the line just prior to performing the carriage return.
9. When the record is later regenerated for justification, the reader, after completing the reading of one line, advances to a "right stop position" on the line, steps down one line to the next line, steps backward to read the justification command, proceeds to the beginning of the line, and then commences reading the line. Thus, the justification command is available to the message synthesizer before the line is read. Obviously other methods of recording and reading the justification command may be utilized, such as the printer stepping up to record it at the end of the prior line; or carriage returning without line advancing and printing the justification command in the margin in front of the line it refers to, before line advancing.

Figure 17:
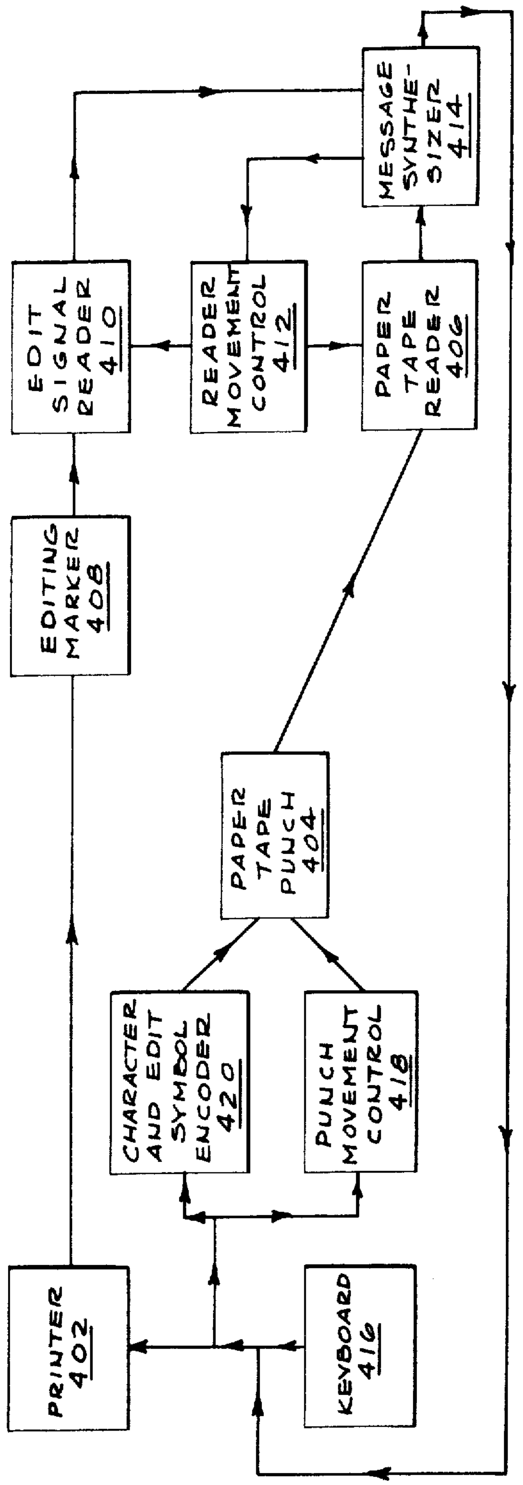
FIG. 17 is a block diagram illustrating in more detail an example of the "dual form" editing system constructed in accordance with the present invention.

FIG. 17 is presented for the purpose of describing in more detail the novel "dual form" editing system and method mentioned briefly in the discussion of FIG. 12. FIG. 17 shows an embodiment of a dual form editing system in which a printer 402 produces a man readable hardcopy record, and a paper tape punch 404 produces a punched paper tape which is machine readable by a paper tape reader 406. In addition, the hardcopy record may be manually edit marked by an editing marker 408 (which is similar to the editing marker described in connection with FIG. 12 and also FIG. 1); after which an edit signal reader 410 reads the manual edit marks on the record, in synchronization with the reading of the punched paper tape by the paper tape reader 406. It should be noted that an edit location record, or an edit location and edit instruction record, instead of the man readable record may be entered into the edit signal reader, as discussed earlier (for example, a record produced by edit marking a transparent sheet held over the original record). A reader movement control 412 controls the movement of the readers 410 and 406 to cause them to read in synchronization. A message synthesizer 414 receives electrical signals from the reader 406 representing the primary intelligence punched into the paper tape plus any on-line editing symbols which may be on the record (discussed further below). Also, any required inserts may be read in previously by the reader 406 and stored in the message synthesizer 414 as described in connection with the discussion of FIG. 12. Alternatively, inserts may be in the form of interlineations on the primary record as described further below. In addition, the message synthesizer 414 receives edit signals from the edit signal reader 410 indicating the location and kinds of editing desired to be accomplished to the intelligence on the original record. The message synthesizer 414 provides control signals to the reader movement control 412 to cause the intelligence from the original record and the editing signals to be in proper synchronization.

Also, as shown in FIG. 17, the message element train output from the message synthesizer 414 may serve to provide the inputs to the printer 402 and the paper tape punch 404 in a manner similar to the inputs provided by a keyboard (discussed below).

It should be noted that for regenerating "clean" records after on-line editing (but without any edit marking on the man readable record or other edit location records) the edit signal reader 410 is not required.

In one embodiment there is a one-to-one correspondence between each code symbol position on the paper tape and each character space position on the man readable (and potential carrier of machine readable, manual edit marks) hardcopy. In this embodiment, the paper tape reader 406 and the edit signal reader 410 start at corresponding points on the records and are stepped through corresponding positions during the reading process.

To accomplish this one-to-one-correspondence all movements of the printer 402 are in response to controls on a keyboard 416 (no direct manual movement of the printer can be accomplished) and a punch movement control 418 causes corresponding movements in the paper tape being punched in the punch 404 so as to keep each code symbol position on the paper tape correctly in synchronization with each character space position on the hardcopy.

A character and edit symbol encoder 420 encodes into binary coded electrical signals to be punched into the paper tape, the characters command by the keyboard (which are also being printed by the printer 402). It should be noted that the printer 402 instead of being coupled to the keyboard 416 is in some embodiments operated from signals from the encoder 420.

In addition to the conventional character symbol set, the keyboard 416, the encoder 420, and the printer 402 have an editing symbol set which permits on-line editing to indicate desired modification of (1) errors made in the recording of the primary intelligence, or (2) the primary intelligence. For example, deletions may be made by backspacing the hardcopy and superimposing delete symbols on the characters to be deleted. Concurrently, the punch movement control 418 causes the punch 404 to backspace in synchronization with the hardcopy so that a delete signal is punched in the position corresponding to the delete symbol printed on the harecopy.

Alternatively, deleting may be accomplished by the novel method of utilizing "delete last 'section'" editing symbols (as discussed in connection with FIG. 16).

For a one-to-one correspondence dual system to have all of the typing font capabilities that a conventional typewriter or paper tape typewriter has, it must have considerably more bit positions per code symbol position on the tape. For example, an extra bit position is required to indicate whether a character is upper or lower case, and one is required to show whether a character is underlined or not. In conventional paper tape typewriters a special character using a code symbol position on the tape is used to indicate each change in case and each time an underline is printed. However, these extra characters prohibit having a one-to-one correspondence. Thus, the extra bit positions are necessary. It is also desirable to utilize an extra bit to indicate deletion (although this could be indicated by over punching all bit positions) and another bit to indicate an insertion is to be made at this location. Still another bit is required to indicate that "an interlinear insertion (if they are used) is starting here" (discussed below). Six bits are required to represent the conventional 42–44 characters of a typewriter. At least one bit is desirable for parity checking. This makes a total of 10 to 11 bits.

The required number of bit positions per code symbol may be provided by a wider tape than the conventional one which provides six to eight channels. However, a preferable method, for some applications, is the use of two rows of six two eight channels, or 12 to 16 bits to make up one code symbol position. This has the advantages: of utilizing conventional paper tape punches; of providing extra bits for other editing symbols; and of allowing the conventional coding to be used, with the six to eight bits representing the particular character, a parity signal, and perhaps one bit to spare, and allowing the other six or so bits from the second row of a code symbol position to be used for the indication of the case, underlining, deletions, and insertions, for another parity bit, and for other uses as may be desired in particular applications.

Another desirable difference from the conventional paper tape typewriter is the ability to punch "singlespace", or "doublespace", or possibly "triplespace". By this is meant, for example, the punching of every other code symbol position for double spacing (and if a conventional six to eight channel tape is used, this means skipping two rows between each two punched). This permits the interlinear insertion of inserts as may be desired for editing operations. For this function it is necessary to have a capability for a "step up" opseration on the hardcopy combined with a "move over" on the paper tape to go "in-between the lines", and also the editing logic to perform the sequence of operations required to read the insert and return to start reading at the next space (as described earlier in the discussion in connection with FIG. 12).

Other desirable or required differences from conventional paper tape typewriters are: the ability to backspace the paper tape automatically (and in synchronization with the backspacing of the hardcopy); the ability to "backline" (by keyboard controls) the hardcopy (and the paper tape), i.e., cause the hardcopy to move up to the line above without requiring (more specifically — without allowing) manual movement of the platen; and automatic margining.

An alternative to requiring keyboard controls to cause all desired movements of the carriage, is to allow manual movement but have pickup devices which detect these movements (and which transmit them to the movement control 418 for moving the punch in synchronization).

It should be noted that "stop codes" and other "program codes" often used on paper tape typewriters may be coded using the extra available bit positions without requiring special characters (which if required would prevent the one-to-one correspondence).

If desired the extra bits can be utilized to record: double typed letters such as "!" or "  ", or those using non-escaping characters, such as diacritical marks; ribbon color position; or others.

It should be noted that no carriage return character or signal is required to be recorded since automatic margining is used. In fact, none of the movement control operations such as the blank character space, back space, etc., are recorded.

The "backline" movement of the tape can be accomplished in a variety of ways. One method is to count the number of spaces moved during the backline movement and when this equals the number of spaces in a line, one full line has been moved. One embodiment uses a circular stepping disk having 102 positions to provide for a full 8.5 inch line width, with 12 spaces per inch. Such a disk also has provisions for setting margins and tab positions corresponding to those on the typewriter. As each code symbol position on the tape is moved, one step is made on the disk.

Another method combines (1) a configuration which allows only backlines at the beginning of the line, with (2) a paper tape that has prepunched or otherwise marked indications of the start of each line. If the backline is only allowed at the beginning of the line, a control for it may be omitted by automatically converting a backspace at the beginning of a line to a backline.

Another desirable feature is the use of plug-in casset of paper tape in which one casset represents one or some other integer number of pages. This simplifies the handling of the paper tape. Subsequent tables tabulate the responses of the printer 402 and the paper tape punch 404 to signals from the keyboard 416.

Figure 18:
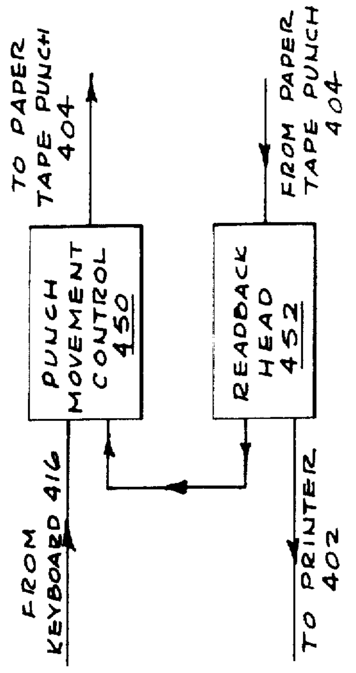
FIG. 18 is a block diagram showing a modification of the example shown in FIG. 17 for the purpose of describing an alternative embodiment.

FIG. 18 shows a modification to the invention shown in FIG. 17. A punch movement control 450, which replaces the punch movement control 418, receives movement signals from the keyboard 416, but in this embodiment a one-to-one correspondence does not exist between each code symbol position on the paper tape and each character space position. Instead, a more conventional paper tape coding may be utilized such as one row of a six to eight column taper per code symbol position. However, each character printed on the hardcopy is still kept in synchronization with the corresponding code position of the paper tape even though the hardcopy is backspaced and backreturned. This is accomplished by the use of (1) a readback head 452 associated with the paper tape punch 404, and (2) more complex logic in the punch movement control 450. When the hardcopy is backspaced the punch is also backspaced, and if only conventional characters are detected by the readback head 452 no special action is required.

However, for handling symbols which are punched on the paper tape but not indicated on the hardcopy, such as the stop code, it is difficult to delete these codes or even know they exist based upon the hardcopy alone. An approach which remedies this problem may be referred to as the "barrier" approach. Here the printer is only allowed to backspace if the readback head indicates that the previous code symbol punched is not one of those codes which are punched on the tape but which have no corresponding characters or spaces on the hardcopy. If the previous code is such a code, e.g., a stop code or an upper or lower case code, the "barrier approach" will prevent the printer carriage from backspacing and will light a light indicating which type of stored symbol has been encountered. At this time the operator may punch a delete code key if he wishes to cause a delete code symbol to be punched over the code on the tape, which will then allow the paper tape to backspace to the next code symbol, which, if it is an ordinary character, will cause the hardcopy to also backspace. If the operator does not wish to delete the stored stop code (or case change, etc.), he may cause the tape to backspace again by pressing a "tape backspace key". Alternatively, in another embodiment, he presses the ordinary backspace key again to accomplish the same result.

If the operator prefers not to evaluate each code symbol on the tape that has no space or spaces corresponding to it on the hardcopy, he may switch to a "hardcopy edit only" mode. In this mode, if a case change or a stop code symbol is detected, the movement control 450 will cause the punch to take one or more extra backspaces (through any such symbols which do not have a corresponding space on the hardcopy) until a character which does correspond to a space on the hardcopy is detected. At the same time, if a case change code symbol occurs, the case of the printer will automatically be changed (reversing the effect of the case change signal).

It should be noted that stop commands and similar programmed instructions which are not printed, may be utilized in the one-to-one correspondence configuration by providing one or more bit positions for recording them. If they are used, it is also desirable to include lights and perhaps audio indicators to tell the operator of their presence if he wishes to delete one of them.

As indicated, a case change or a stop code is an example of a situation in which code symbol positions on the paper tape have no corresponding space on the hardcopy (actually, they correspond to boundaries between hardcopy spaces). Another type of situation is that of "tab" operations or "carriage returns" in which one code symbol position on the paper tape may correspond to many spaces on the hardcopy. When a tab or carriage return signal is detected by the readback head 452, the paper tape backspaces until it reaches the previous carriage return and then steps one position forward. Meanwhile, a signal is sent to the printer 402 to "backreturn" to the beginning of the current line or, if at the beginning of the line, to the beginning of the previous line.

A backspace signal which is automatically converted to a backreturn, similar to the backline as described earlier, is especially well suited to this configuration.

For underlining, it is necessary to have an extra bit code in this embodiment as in the one-to-one correspondence embodiment. Alternatively, the capability for underlining may be omitted.

It should also be noted that in this configuration, logic provisions similar to those in the punch movement control 450 are included in the message synthesizer 414 to control the reader movement control 412 to cause the appropriate movements of the readers to keep proper synchronization between edit mark signals and the primary intelligence symbols they refer to.

Also in this embodiment, in addition to a conventional blank character space signal for normal message generation, a "forward" signal is used during the one-line editing process when the typing point and the punching point have been backspaced so that they are over previously typed or punched codes. The forward signal may be a separate control. However, the conventional character space bar may also be used, provided logic is used to prevent it from punching the tape (and thus overpunching a previous code) as it would normally do if it were not in the "backspaced region".

To summarize the way the various movements and movement control commands are treated in this embodiment, the backspace and backreturn always cause only movements of both the hardcopy and the paper tape; they never are recorded. The blank character space, carriage return, and tab always cause movement of both the hardcopy and the paper tape; they are recorded ordinarily; however when in the "-backspace region", they are either not used, and replaced by "forward" or "line step" commands, or are interpreted as such.

Figure 19:
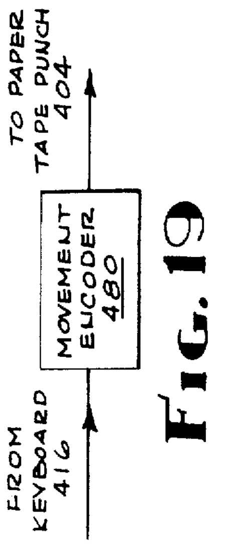
FIG. 19 is a block diagram showing a different modification of the example shown in FIG. 17 for the purpose of describing another alternative embodiment of the present invention.

FIG. 19 shows another modification to the invention shown in FIG. 17. In this embodiment a movement encoder 480 is added to the configuration shown in FIG. 17. The movement encoder 480 encodes all of the movements of the printer 402 (ther than those automatically associated with the printing of each ordinary character) upon the basis of signals the encoder 480 receives from the keyboard 416 such as, backspace, carriage return, tab, etc., and causes them to be punched onto the paper tape by the punch 404. In this embodiment, the punch (and the paper tape) never move backwards, regardless of the movement of the hardcopy. Rather, as indicated above, the movements are just recorded. This embodiment still has all of the capability for on-line editing that the previous two embodiments had. (However, although the characters on the hardcopy may be overprinted, the codes on the tape are never overpunched).

In this embodiment, which may be designated the "one-directional" configuration, the message synthesizer 414 has still more logical capability. In particular, it has the capability to revise the primary intelligence in accordance with its interpretation of the on-line editing symbols and all of the movements of the hardcopy (as well as the capability to interpret and execute the edit mark signal commands).

This embodiment does not require any of the special capabilities and provisions included in the one-to-one correspondence or the readback correspondence configuration, because synchronization between the printer and the paper tape recorder is not utilized in this embodiment.

The following chart more clearly indicates which characteristics and capabilities are utilized in the one-to-one correspondence, the readback, and the one-directional configuration.

TABLE A

Characteristics and Capabilities Utilized in the Paper Tape Typewriter Configurations OF FIGS. 17, 18, and 19

| | One-To-One correspondence | readback | One-directional |
|---|---|---|---|
| One-to-one correspondence between space on hardcopy and code positions on paper tape | Yes | No | No |
| Punch kept synchronized so that printed characters are aligned with corresponding punched characters when correcting errors | Yes | Yes | No |
| Undetected manual movements of the carriage | No | No | No |
| On-line editing using: | | | |
| "overprint delete" | Yes | Yes | Yes |
| "start delete here" | Yes | Yes | Yes |
| "delete last section" | Yes | Yes | Yes |
| and others | Yes | Yes | Yes |

| | | | |
|---|---|---|---|
| More bits per character than conventional punched paper tape | Yes | No, or just one more for normal capabilities | No |
| Interlinear insert | May be included | May be included | May be included |
| Double or triple spacing on the paper tape | May be included | May be included | Not utilized |
| Backmovements of the paper tape utilized | Yes | Yes | No |
| Automatic margining | May be included | May be included | May be included |
| The following punched on the paper tape: Carriage return signal, Blank character space signal, Tab signal | No | Yes, except when over previously punched portion of the tape | Yes |
| Back space signal | No | No | Yes |
| Backline signal | No | Not applicable | Yes |
| Backreturn signal | No | No | Yes |
| Stop codes may be utilized | not normally included; uses extra hole positions if included | Yes | Yes |
| Special logical capability required in message synthesizer | No | Yes | Yes |

The method used to control the movement of the readers 410 and 406 to cause them to read in synchronization, is described below. It is necessary in all three configurations (one-to-one, readback, and one-directional) that the typing and punching points always start at the corresponding points. In the one-to-one configuration the movements of the two readers are synchronized independently of any recordings on them (except for interlinear inserts), since there is a code position "space" on a "line" on the paper tape for each space on the hardcopy.

For the one-directional configuration, the edit signal reader 410 is controlled utilizing the signals from the paper tape reader 406 just as though a new record which is a duplicate of the one recorded on the punched tape were being typed on a paper tape controlled typewriter, except that backspaces and all operations while in the backspace region are not duplicated. This may be accomplished by duplicating the hardcopy record in a store, formatted into lines just as the hardcopy is, inside the message synthesizer 414. To do this, all of the printer motions and operations, as recorded on the punched paper tape, are utilized to generate control signals for corresponding movements of the edit signal reader. However, the presence of the "storing point" (which enters new or modified message elements into the store) in the backspace regions is detected (by detecting that a symbol is already in the store for that position on a line) and utilized to inhibit the transmission of any movement control signals to the edit signal reader 410 while the storing point is in the backspace region. For the readback configuration, logic in the message synthesizer 414 translates each code recorded on the punched paper tape into the appropriate forward movement signal of the edit signal reader 410, on the baais of whether or not a movement of the printer 402 would have been associated with the code. The movement relationships of this and the other two configurations are shown on the following concise tables.

TABLE B

One-to-one Configuration: Printer 402 Response to Keyboard 416 Operations

| Keyboard operations | Movement: no movement | one space | other as commanded | printing | other |
|---|---|---|---|---|---|
| Ordinary character | | X | | X | |
| Upper or lower case change | X | | | — | (1) |
| Ribbon color change | X | | | — | X |
| Non-escaping character (e.g., diacritical mark) | X | | | X | |
| Underline | | X | | X | |
| Double typed letter (e.g.,"!") | | X(2) | | X | |
| Non-printed instruction (e.g., stop code) | X (3) | | | — | |
| Edit symbol—printed | | X | | X | |
| —non-printed | X (3) | | | — | |
| —added printed | | X | | X | |
| Blank character space | | X | | — | |
| Carriage return | | | X | — | |
| Tab | | | X | — | |
| Platen advance or line step (index one line forward) | | | X | — | |
| Backline (index one line backward) | | | X | — | |
| Backreturn | | | X | — | |
| Back space | | | X | — | |
| Forward space Not distinguishable from BLANK CHARACTER SPACE | | | | | |
| Step-up (if included) | | | X | (4) | |
| Step-down (if included) | | | X | (5) | |

Notes: (1) The case is implicitly indicated by the symbol printed.
(2) One space for the typing of each conventional letter making up the double typed letter (a backspace is also needed).
(3) Not normally utilized in the one-to-one configuration; special provisions are required for it.
(4) This is recorded as an added printed edit symbol.
(5) This is recorded as a printed edit symbol.

TABLE C one-to-one configuration:

Paper Tape Punch 404 Response to Keyboard 416 Operations

| Keyboard operations | MOVEMENT: No movement | one space | other as commanded | PUNCHING: ordinary hole positions | special hole position | extra hole positions |
|---|---|---|---|---|---|---|
| Ordinary character | | X | | X | | |
| Upper or lower case change | X | | | | (1) | |
| Ribbon color change | X | | | | | X |
| Non-escaping character (e.g., diacritical mark) | X | | | | | X |
| Underline | | X | | | | X |
| Double typed letter (e.g., "!") | | X | | (2) | | (2) |
| Non-printed instruction (e.g., stop code) | X (Not normally utilized) | | | | | X |
| Edit symbol—printed | | X | | X | | (3) |
| —non-printed | X (Not normally utilized) | | | | | X |
| —added printed | | X | | (4) | | X |
| Blank character space | | X | | — | — | — |
| Carriage return | | | X | — | — | — |
| Tab | | | X | — | — | — |
| Platen advance or line step (index one line forward) | | | X | — | — | — |
| Backline (index one line backward) | | | X | — | | |
| — | | | | | | — |
| Backreturn | | | X | — | — | — |
| Back space | | | X | — | — | — |
| Forward space Not distinguishable from BLANK CHARACTER SPACE | | | | | | |
| Step-up (if included) | | | X | — | — | (5) |
| Step-down (if included) | | | X | (6) | — | — |

Notes: (1) The case change is not recorded separately; the case is recorded with each specific character punched.
(2) One of the double type letters utilizes extra hole positions.
(3) May include these in addition to or instead of the ordinary hole positions.

(4) An overpunching delete may also be utilized.
(5) This is recorded as an added printed edit symbol.
(6) This is recorded as a printed edit symbol.

TABLE D

One-to-one configuration: Hardcopy movement control signals to edit signal reader 410 based upon signals read by paper tape reader 406

| signals read | MOVEMENT no move-ment | one space | other as com-manded | |
|---|---|---|---|---|
| Ordinary character | | X | | |
| Upper or lower case change | (1) | | | |
| Ribbon color change | (1) | | | |
| Non-escaping character (e.g., diacritical mark) | (1) | | | |
| Underline | (1) | | | |
| Double typed letter (e.g., "!") | | X | | |
| Non-printed instruction (e.g., stop code) | —(not normally utilized) | | | |
| Edit symbol—printed | | X | | |
| —non-printed | —(not normally utilized) | | | |
| —added printed | (2) | | | |
| Blank character space | | X | | Note (3) |
| Carriage return | | | X | Note (3) |
| Tab | — | — | — | Note (3) |
| Platen advance or line step (index one line forward) | — | — | — | Note (3) |
| Backline (index one line backward) | — | — | — | Note (4) |
| Backreturn | — | — | — | Note (4) |
| Back space | — | — | — | Note (4) |
| Forward space | Not applicable | | | |
| Step-up (if included) | | | X | |
| Step-down (if included) | | | X | |

Notes: (1) No movement for this signal per se; the presence of this signal in a character space is ignored.
(2) No movement for the added printed symbol per se; the edit instruction conveyed by the symbol may cause movement.
(3) This is not explicitly recorded as a code on the paper tape.
(4) This is not detected.

TABLE E

Readback Configuration: Printer 402 response to keyboard 416 operations

| Keyboard operations | Movement no move-ment | one space | other as com-manded | print-ing | other |
|---|---|---|---|---|---|
| Ordinary character | | X | | X | |
| Upper or lower case change X | | | | — | X |
| Ribbon color change X | | | | — | X |
| Non-escaping character (e.g., diacritical mark) | Not utilized | | | | |
| Underline | | X | | X | |
| Double typed letter (e.g., "!") | Not utilized | | | | |
| Non-printed instruction X (e.g., stop code) | | | | — | |
| Edit symbol—printed | | X | | X | |
| —non-printed X | | | | — | |
| —added printed | Not utilized—Note (1) | | | | |
| Blank character space | | X | | — | |
| Carriage return | | | X | — | |
| Tab | | | X | — | |
| Platen advance or line step (index one line forward) | Not utilized | | | | |
| Backline (index one line backward) | Not utilized | | | | |
| Backreturn | | | X | — | |
| Back space | | | X | — | |
| Forward space | | X | | — | |
| Step-up (if included) | | | X | X | |
| Step-down (if included) | | | X | X | |

Notes: (1) Except for the "step-up" command (which is printed only over a blank character space in this configuration), or the over-printed "x-ing" out of a character.

TABLE F

Readback Configuration:

Paper tape punch 404 response to keyboard 416 operations

| Keyboard operations | Movement no move-ment | one space | other as com-manded | Punching ordinary hole positions | special hole position |
|---|---|---|---|---|---|
| Ordinary character X | | | | X | |
| Upper or lower case change X | | | | X | |
| Ribbon color change X | | | | X | |
| Non-escaping character (e.g., diacritical mark) | | | Not utilized | | |
| Underline X | | | | | X |
| Double typed letter (e.g., "!") | | | Not utilized | | |
| Non-printed instruction X (e.g., stop code) | | | | X | |
| Edit symbol—printed X | | | | X | |
| —non-printed X | | | | X | |
| —added printed | | | Not utilized—Note (1) | | |
| Blank character space X | | | | X* | |
| Carriage return X | | | | X* | |
| Tab X | | | | X* | |
| Platen advance or line step (index one line forward) | | | Not utilized | | |
| Backline (index one line backward) | | | Not utilized | | |
| Backreturn | | | X | — | |
| | | | (2) | — | |
| Back space X | | | | | |
| Forward space X | | | | — | |
| Step-up (if included) | | | X | (3) | |
| Step-down (if included) | | | X | X | |

Notes: *Except in the back space region.
(1) Except for the step-up command (see note 3) and the over-punching of a code to a delete code.
(2) See separate chart indicating the movement response as a function of the signal readback from the paper tape.
(3) The blank character space code is overpunched to convert it to a "-step-up" code.

TABLE G

READBACK CONFIGURATION: PAPER TAPE PUNCH 404 AND PRINTER 402

RESPONSE TO SIGNALS READBACK FROM PAPER TAPE UPON BACK SPACING

| SIGNALS Readback | Punch movement No move-ment | One back space | Other as com-manded | punch & printer back-Return | Printer Move-ment One back space | As com-manded |
|---|---|---|---|---|---|---|
| Ordinary characters | | X | | | X | |
| Upper or Lower case change | | X | | | | X |
| Ribbon color change | | X | | | | X |
| Non-escaping character (e.g., diacritical mark) | | not utilized | | | | |
| Underline | | Not a separate code position | | | | |
| Double typed Letter (e.g., "!") | | Not utilized | | | | |
| Non-printed Instruction (e.g., stop code) | | X | | | | X |
| Edit symbol—printed | | X | | | X | |
| —non-printed | | X | | | | X |
| —added | | | | | | |

| | | | | |
|---|---|---|---|---|
| printed Blank | Not utilized—Note¹ | | | |
| Character space | X | | X | |
| Carriage return | | X | | |
| Tab | | X | | |
| Platen advance or line step (index one line forward | Not utilized | | | |
| Backline (index one line backward) | Not utilized | | | |
| Backreturn | Not applicable | | | |
| Back space | Not applicable | | | |
| Forwar. space | Not applicable | | | |
| Step-up (if included) | X | | | X |
| Step-down (if included) | X | | | X |

Notes: ¹Except for the "step-up" command and the overpunched delete code (the latter results in one back space of the punch and printer).

TABLE H

Readback configuration: Hardcopy movement control signals to edit signal reader 410 based upon signals read by paper tape reader 406

| Signals read | MOVEMENT no movement | one space | other as commanded |
|---|---|---|---|
| Ordinary character | | X | |
| Upper or lower case change | X | | |
| Ribbon color change | X | | |
| Non-escaping character (e.g., diacritical mark) | Not utilized | | |
| Underline | X | | |
| Double typed letter (e.g., "!") | Not utilized | | |
| Non-printed instruction (e.g., stop code) | X | | |
| Edit symbol—printed | | X | |
| non-printed | X | | |
| added printed | Not utilized—Note (1) | | |
| Blank character space | | X | |
| Carriage return | | | X |
| Tab | | | X |
| Platen advance or line step (index one line forward) | Not utilized | | |
| Backline (index one line backward) | Not utilized | | |
| Backreturn | Not applicable | | |
| Back space | Not applicable | | |
| Forward space | Not applicable | | |
| Step-up (if included) | | | X |
| Step-down (if included) | | | X |

Notes: (1) Except for the step-up command and the overpunched delete code (the latter results in one back space of the punch and printer).

TABLE I

One-directional configuration:

Printer 402 response to keyboard 416 operations

| Keyboard operations | Movement no movement | one space | other as commanded | printing | other |
|---|---|---|---|---|---|
| Ordinary character | | X | | X | |
| Upper or lower case change | X | | | — | X |
| Ribbon color change | X | | | — | X |
| Non-escaping character (e.g., diacritical mark) | X | | | X | |
| Underline | | X | | X | |
| Double typed letter (e.g., "!") | | X | | X | |
| Non-printed instruction (e.g., stop code) | X | | | — | |
| Edit symbol—printed | | X | | X | |
| —non-printed | X | | | — | |
| —added printed | | X | | X | |
| Blank character space | | X | | — | |
| Carriage return | | | X | — | |
| Tab | | | X | — | |
| Platen advance or line step (index one line forward) | | | X | — | |
| Backline (index one line backward) | | | X | — | |
| Backreturn | | | X | — | |
| Back space | | | X | — | |
| Forward space | | X | | — | |
| Step-up (if included) | | | X | — | |
| Step-down (if included) | | | X | — | |

TABLE J

One-directional configuration:

Paper tape punch 404 response to keyboard 416 operations

| Keyboard Operations | Movement no movement | one space | other as commanded | Punching ordinary hole positions |
|---|---|---|---|---|
| Ordinary character | | X | | X |
| Upper or lower case change | | X | | X |
| Ribbon color change | | X | | X |
| Non-escaping character (e.g., diacritical mark) | | X | | X |
| Underline | | X | | X |
| Double typed letter (e.g., "!") | | X | | X |
| Non-printed instruction (e.g., stop code) | | X | | X |
| Edit symbol—printed | | X | | X |
| —non-printed | | X | | X |
| —added printed | | X | | X |
| Blank character space | | X | | X |
| Carriage return | | X | | X |
| Tab | | X | | X |
| Platen advance or line step (index one line forward) | | X | | X |
| Backline (index one line backward) | | X | | X |
| Backreturn | | X | | X |
| Back space | | X | | X |
| Forward space | | X | | X |
| Step-up (if included) | | X | | X |
| Step-down (if included) | | X | | X |

TABLE K

One-directional configuration: Hardcopy movement control signals to edit signal reader 410 based upon signals read by paper tape reader 406

| Signals read | MOVEMENT no movement | one space | other as commanded |
|---|---|---|---|
| Ordinary character | | X* | |
| Upper or lower case change | X | | |
| Ribbon color change | X | | |
| Non-escaping character (e.g., diacritical mark) | X | | |
| Underline | | X* | |
| Double typed letter (e.g., "!") | | X* | |
| Non-printed instruction (e.g., stop code) | X | | |
| Edit symbol—printed | | X* | |
| —non-printed | X | | |
| —added printed | | X* | |
| Blank character space | | X | |
| Carriage return | | | X |
| Tab | | | X |
| Platen advance or line step (index one line forward) | | | X |
| Backline (index one line backward) | X | | |
| Backreturn | X | | |
| Back space | X | | |
| Forward space | X | | |

| | |
|---|---|
| Step-up (if included) | X(1) |
| Step-down (if included) | X(1) |

Notes: *Unless in the back space region; in which case no movement.
(1) Special provisions required to look for edit signal marks within an interlinear insert are not included in most configurations: thus no movement occurs.

There have thus been disclosed a number of examples of automatic editing systems and methods of automatic editing which have all the versatility and other advantages and which achieve the objects set out hereinbefore. Obviously other examples, falling within the scope of the following claims, and their advantages will occur to one skilled in the art: for example it will be apparent that another important application of the invention is in adding machine and accounting operations. The ability to selectively read or selectively not read recorded entries gives great flexibility. These applications can best be quickly understood when they are considered examples of the editi..g system principle to AVOID MANUALLY RETYPING, REPRINTING, RECOPYING, OR REPEATING ANY RECORDED MESSAGE OR PORTION OF A RECORDED MESSAGE in order to avoid errors and "inefficiencies" inherent in the accomplishing of such processes manually. Thus, in many accounting operations the same entry would normally be made manually in several places; in many adding machine operations previous totals would be totaled together after manual rekeyboarding of the totals. By using edit marks or previously prepared, perhaps standard, edit instruction records, this may be avoided. Similar procedures in the transfer of selected information from one standard form to a different one (e.g., from an employment application form to a personnel record form) are apparent.

Similarly a useful provision that is utilized in applications where small but important changes periodically occur in records (such as in the revisions of legislation or administrative regulations) is to automatically indicate in a distinctive manner the new material that has been inserted and the old material that has been deleted chronologically subsequently to the previous revision. For example, deleted material might be still shown, but be printed between special brackets; inserted material might be shown between special asterisks. A wide variety of alternative symbols or even distinctive colors might be utilized to "flag" the changes. Whatever method is utilized to signal the changes, these would be automatically interpretable to the machine as edit signals indicating that this flagged material was to indicate changes, and thus should not be included in this fashion in the next revision of the material. Also, extra logic may be included to permit the regeneration of such records without omitting the old additions and deletions (as when correcting some error in manually entered intelligence and selectively modifying which insertions and deletions are to be flagged this way).

What is claimed is:

1. Editing system for editing a message comprising
a message change receiver for receiving desired editing changes to be made to said message and for providing message change output signals suitable for logical processing; and
a message element handler for changing the message elements in said message in accordance with said message change output signals; the message change output signals of said message change receiver being coupled to said message element handler.

2. System for editing a message comprising:
a manual edit indicating means for specifying an editing change to be made to said message, said indicating means having an editing indicia output;
an inputting means for converting said message and the output of said manual edit indicating means into signals suitable for logical processing; and
a message revising means coupled to said inputting means for editing said message by changing the message elements in said message in accordance with the editing change specified by said manual edit indicating means, said message revising means generating a resulting edited message.

3. System for editing a message according to claim 2 in which said inputting means includes a reader for machine reading said message from a machine readable record and for automatically interpreting the output of said manual edit indicating means, said reader generating an output signal suitable for logical processing.

4. System for editing a message according to claim 3 in which said reader includes a reading means for reading a record which contains primary intelligence which is both man and machine readable.

5. System for editing a message at a message element location arbitrarily selectable subsequent to the original generation of said message according to claim 4 in which said message revising means includes an intelligence arraying means having an automatic line ending means for providing formatting signals to permit page formatting, said formatting signals being associated with said resulting edited message and in which said message revising means includes an electrically actuated man-machine readable record generator for generating a man-machine readable record containing said resulting edited message thereon in page format.

6. System for editing a message according to claim 4 which also includes insert handling means coupled to said message revising means for providing the message elements of inserts at the required time to include said elements in the edited message being synthesized.

7. System for editing a message at a message element location arbitrarily selectable subsequent to the original generation of said message according to claim 4
in which said manual edit indicating means includes an off-line, manual, edit marking means for manually scribing an edit mark onto a previously recorded man and machine readable record containing said message which is to be edited, said edit mark being associated with an arbitrary message element space on said record; and in which
said reader includes means for automatically converting said edit mark into a signal suitable for logical processing.

8. System for editing a message according to claim 4 in which said reader includes signal species separator means for separating the information of said edit indicia from the information of said message.

9. System for editing a message according to claim 4 and which also includes a source generator of said record including an ink ejector imprinting system comprising an ink ejector head and including an array of ink ejectors adapted to be juxtaposed contiguously to the writing medium for imprinting thereon a pattern of information bits to represent a character of said intelligence and which permit the unique identification of the said character by said reader.

10. System for editing a message according to claim 4
in which said record has been printed by a font characterized by faces which each produce a character impression which is man readable, a plurality of information bit positions associated with each of said faces, each said bit position comprises means for printing an area mark upon the surface to be printed whereby the pattern of said information bits in said positions is unique for each character produced by said type face, said area mark is at least machine visible, as by fluorescent ink; and
in which said reading means comprises
a reading head including a plurality of fiber optic bundles disposed in a geometrical array such that a plurality of said bundles may be juxtaposed over the impression of said pattern of information bit positions, and means for positioning said record relative to said reading head so that said reading head is sequentially placed in register with successive individual ones of the machine readable portions of said character impressions.

11. System for editing a message according to claim 6 in which said insert handling means includes a message element store for storing the message elements of at least one insert until required for the edited message being synthesized, said message elements of said insert being retrieved from said message element store during the synthesis of said edited message upon the occurrence at a message element location of an editing mark that indicates the insertion is to start at said location in said message to be edited.

12. System for editing a message according to claim 7 in which said message revising means includes an intelligence arraying means having an automatic line ending means for providing formatting signals to permit page formatting, said formatting signals being associated with said resulting edited message, and in which said message revising means includes an electrically actuated man-machine readable record generator for generating a man-machine readable record containing said resulting edited message thereon in page format.

13. System for editing a message according to claim 9 in which said ink ejector imprinting system utilizes a fluorescent ink for imprinting machine readable impressions invisible to human readers.

14. System for editing a message according to claim 3 in which said edit indicating means includes an on-line, manually operated means for recording machine readable symbols on said machine readable record, said on-line means having a font which includes edit signal symbols for recording edit indicia upon said record.

15. System for editing a message according to claim 3 in which said manual edit indicating means includes an off-line, manual edit indicating means for recording a machine readable edit indicia on a record to specify an editing change to be made to said message.

16. System for editing a message according to claim 24, in which said reader includes a reading means for reading a man-machine readable record containing the primary intelligence, and in which said edit symbols may be recorded at message element locations arbitrarily selectable subsequent to the original generation of said message.

17. A system for editing a message in accordance with claim 2 in which said inputting means includes a first manual control means for entering a message to be edited, said message revising means includes a message element store for storing the message elements of said message, and said manual edit indicating means includes a second manual control means for indicating subsequent to the storage of said message in said message element store the editing changes to be made to the message elements stored in said message element store.

18. System for editing a message according to claim 17 in which said message revising means further includes an intelligence arraying means having an automatic line ending means for providing formatting signals to permit page formatting, said formatting signals being associated with said resulting edited message.

19. System for editing symbolic and speech messages comprising an inputing means for entering:

a message to be edited, editing indicia associated with said message to be edited, and message inserts to be inserted in said message to be edited, and a message synthesizer coupled to said inputting means, for changing said message to be edited in accordance with the editing instructions indicated by said editing indicia, the output of said message synthesizer being a message element train representative sequentially of message elements of said message as edited.

20. System for editing a message in accordance with claim 19 in which said inputting means comprises a reading means for reading a record which contains primary intelligence which is both man and machine readable.

21. Editing system comprising a message handler including means for automatic handling of the elements of a message by physically handling the medium of the message, and means coupled to said automatic handling means for changing the elements of a message by physically inserting new elements to and physically deleting elements from the medium of the message.

22. Automatic editing system comprising:

a manually operated means for generating a man readable record, said manually operated means having a font which includes a conventional symbol set for recording primary intelligence as a message on said man readable record, and edit signal symbols for indicating desired changes to said message on said record;

a machine readable record generating means coupled to said manually operated means for generating a machine readable record corresponding to, correlated with, and containing substantially the same intelligence as said man readable record; and machine reading means for reading said intelligence on said machine readable record and for interpreting said edit symbols on said machine readable record and for providing a message element train representative of said intelligence of said machine readable record as changed in accordance with the interpretation of said edit symbols.

23. An automatic editing system in accordance with claim 22 in which said manually operated means also includes an edit movement control means for moving said man readable record to permit said edit signal symbols to be superimposed upon any message space containing said primary intelligence recorded upon said record; and in which said machine readable record generating means includes encoding means for generating machine readable recordings corresponding to the symbols of said font of said manually operated means.

24. An automatic editing system in accordance with claim 23 in which said encoding means includes means for generating machine readable recordings of the movements effected by said edit movement control means.

25. An automatic editing system in accordance with claim 23 in which said machine readable record generating means also includes means for moving said machine readable record in one-to-one synchronization with the backward and advance movements of said man readable record.

26. An automatic editing system in accordance with claim 23 in which said machine readable record generating means includes means for reading back any of said machine readable recordings and for providing readback signals, a logic network coupled to and receiving said readback signals from said means for reading back, said logic network moving said machine readable record for synchronizing the symbols of the primary intelligences recorded on the man readable record with the corresponding symbols on the machine readable record.

27. Editing system according to claim 22 in which said machine readable record generating means includes a record stepping means and also includes logic means for including at least one unused message element space to permit a subsequent recording of an insert on said machine readable record, and said logic means is coupled to said record stepping means.

28. Editing system comprising:

means for reading records;

a message element store for temporarily storing the message elements read from said records;

manual control means for indicating editing changes to be made to the message elements stored in said message element store;

display means for displaying the message elements currently stored in said message element store; and an edit signal analyzer and control logic network for changing the message elements in said message element store in accordance with the editing changes indicated by said manual control means, said network being coupled to each of the following, said message element store, said manual control means, and said display means.

29. Editing system according to claim 28 in which said means for reading records is a means for reading a record which contains primary intelligence which is both man and machine readable.

30. Editing system according to claim 28 and which includes an intelligence arraying means having an automatic line ending means coupled to said logic network for associating appropriate formatting signals with said message elements to permit page formatting.

31. Editing system comprising:

means for inputting a message;

a message element store for storing the message elements read from said message;

manual control means for indicating editing changes to be made to the message elements stored in said message element store; and an edit signal analyzer and control logic network coupled to said message element store and to said manual control means for changing the message elements stored in said message element store in accordance with the editing changes indicated by said manual control means.

32. Editing system according to claim 31 in which said means for inputting a message is a means for reading a record which contains primary intelligence which is both man and machine readable.

33. Editing system comprising:

means for reading a message recorded on a man-machine readable record; and manual control means for effecting editing changes to be made to said message on said man-machine readable record by controlling the operation of said reader and by inserting desired message inserts.

34. In an intelligence handling system having a formatting point, a line advance mechanisms for advancing said formatting point to the beginning of the next line, and an automatic line advance region, and in which work breaking indicia occur in the intelligence, an automatic margining system comprising:

a line advance conditions detector for detecting the coincidence of said word breaking indicia at said formatting point with said automatic line advance region, and a line advance actuating means coupled to said line advance conditions detector for actuating said line advance mechanism upon the detection of said coincidence.

35. In combination:

an intelligence arraying means for arraying intelligence symbols into a number of lines from a message element train, said arraying means including a line advance mechanism for advancing the formatting point of said arraying means to the beginning of the next line;

a first means for providing a first signal upon the occurrence of word breaking indicia at said formatting point;

a second means for providing a second signal when said formatting point is within an automatic line advance region; and a third means for actuating said line advance mechanism upon the simultaneous occurrence of signals from said first means and from said second means.

36. The combination in accordance with claim 35 in which said arraying means comprises a typewriter having a space bar and space bar linkage and in which said first means includes a means for detecting character space signals which includes a space bar linkage actuation detector energized by the actuation of said space bar linkage for establishing said first signal.

37. The combination in accordance with claim 35 in which said arraying means comprises a typewriter having a platen and a typing point and in which said second means comprises a cam mechanism controlled by the relative location of said typing point on said platen for establishing said second signal.

38. The combination in accordance with claim 35 in which said arraying means comprises a typewriter having a line advance linkage attached to said line advance mechanism, and in which said third means comprises a solenoid actuator and circuit for actuating said line advance linkage whereby said line advance mechanism is energized.

39. The combination in accordance with claim 35 in which said arraying means also includes a keyboard, and a means for locking said keyboard; and in which said third means includes a means for energizing said means for locking during the interval when said line advance mechanism is advancing said formatting point to the beginning of the next line.

40. The combination in accordance with claim 35 which also includes a means coupled to said formatting point and to said automatic line advance region for providing a third signal to a manual operator of said arraying device when said formatting point passes a preselected location with respect to the boundaries of said automatic line advance region.

41. The combination in accordance with claim 35 in which said arraying means is a typewriter for manually generating said message element train.

42. The combination in accordance with claim 35 in which said arraying means comprises a justification preparation unit for arraying intelligence symbols in a number of lines each capable of being justified, and in which said second means also includes a logic means responsive to the justification increments determining factors contained in the intelligence symbols arrayed on a line for generating signals representing the justification increments allowable in justifying said line and for setting the boundaries of said automatic line advance region equal to said justification increments allowable.

43. The method of formatting intelligence comprising the steps of:

providing a first signal upon the occurrence of word breaking indicia at the formatting point;

providing a second signal when said formatting point is within an automatic line advance region; and advancing the formatting point to the beginning of the next line upon the simultaneous occurrence of said first signal and said second signal.

44. In an intelligence arraying means having a line advance mechanism for advancing the formatting point of said arraying means to the beginning of the next line, the combination comprising:

a first means for providing a first signal upon the occurrence of word breaking indicia at said formatting point;

a second means for providing a second signal when said formatting point is within an automatic line advance region; and a third means for actuating said line advance mechanism upon the simultaneous occurrence of signals from said first means and from said second means.

45. System for editing a message comprising:

a manual edit indicating means for specifying an editing change to be made to said message, said indicating means having an editing indicia output;

an inputting means for converting said message and the output of said manual edit indicating means into signals suitable for logical processing, said inputting means including a reader for machine reading said message from a machine readable record and for automatically interpreting the output of said manual edit indicating means, said reader generating an output signal suitable for logical processing, said indicating means including manual control means for effecting an editing change to be made to said message at a message element location arbitrarily selectable subsequent to the generation of said message by controlling the operation of said reader and by inserting a desired message insert; and a message revising means coupled to said inputting means for editing said message by changing the message elements in said message in accordance with the editing change specified by said manual edit indicating means, said message revising means generating a resulting edited message.

46. System for editing a message according to claim 45 in which said message revising means includes an intelligence arraying means having an automatic line ending means for providing formatting signals to permit page formatting, said formatting signals being associated with said resulting edited message.

47. System for editing a message according to claim 46 in which said arraying means includes a line advance mechanism for advancing the formatting point of said arraying means to the beginning of the next line, and in which said automatic line ending means includes an automatic margining system comprising:

a first means for providing a first signal upon the occurrence of word breaking indicia at said formatting point;

a second means for providing a second signal when said formatting point is within an automatic line advance region; and a third means for actuating said line advance mechanism upon the simultaneous occurrence of signals from said first means and from said second means.

48. System for editing a message according to claim 47 in which said manual control means for effecting an editing change includes means for causing said reader to read in a one-character-at-a-time mode.

49. System for editing a message according to claim 48 which also includes manual switching means coupled to said message revising means for selectively placing said system in a textual mode or a tabular mode of operation; and in which said third means actuates said line advance mechanism upon the simultaneous occurrence of signals from said first means and from said second means provided the system is in the textual mode of operation.

50. System for editing a message according to claim 46 in which said reader includes a reading means for reading a man-machine readable record containing the primary intelligence.

51. Method of editing a message stored on a record in accordance with an editing change to be made to said message at a message element location arbitrarily selectable subsequent to the generation of said record comprising the steps of:

providing a record, said record being machine readable;

machine reading said message from said record by a reader under the control of a manual control means;

providing first electrical signals from said reader representative of said message;

impressing said first electrical signals onto a message revising means;

providing stepping edit signals from said manual control means;

operating said reader in a step-by-step mode in response to said stepping edit signals until the reading point of said reader is at said arbitrarily selectable message element location;

inserting a desired message insert by manually keyboarding said insert on a keyboard of said manual control means;

providing second electrical signals from said manual control means representative of said message insert;

impressing said second electrical signals onto said message revising means;

providing a start delete edit signal from said manual control means;

inhibiting said first electrical signals from said reader in response to said start delete edit signal;

providing an end delete edit signal from said manual control means;

uninhibiting said first electrical signals in response to said end delete edit signal;

said message revising means generating a message element train containing the intelligence of said record as modified in accordance with the desired editing change; and providing textual formatting signals to permit page formatting, said textual formatting signals being associated with said message element train, by providing a first signal upon the occurrence of word breaking indicia at the formatting point;

providing a second signal when said formatting point is within an automatic line advance region; and providing a line advance textual formatting signal upon the simultaneous occurrence of said first signal and said second signal.

52. Method of editing according to claim 51 which also includes the steps of:

impressing said stepping edit signals onto said message revising means;

examining and recognizing message element characteristics in said first signals element-by-element as read by said reader in accordance with said stepping edit signals; and stopping said reader upon recognizing message element characteristics in accordance with said stepping edit signals.

53. Method of editing according to claim 52 which also includes the steps of:

manually selecting a textual or tabular mode of operation;

providing third electrical signals representative of said message element train and associated formatting signals onto a generator of man-readable hardcopy records;

generating a man-readable hardcopy record in response to said third electrical signals; and in which said textual formatting signals are provided in the textual mode of operation;

said machine readable record and said keyboarding provide formatting signals which are associated with said message element-train in said tabular mode of operation; and said reader step-by-step modes includes a character-by-character step mode.

54. Method of incorporating an insert when automatically editing a message in an editing system having means for reading multiple spaced lines of message elements of said message to be edited, means to step-up the reading point of a reading means from one message space to a message space above in the multiple spaced region, means to step-down said reading point for returning to the primary intelligence message elements of said message to be edited, and means to move backwards said reading point, to the left along the message element line, comprising the steps of:

detecting a step-up insert editing signal, stepping-up the reading point to said multiple spaced region, reading the insert contained in said multiple spaced region, detecting the end of said insert, inhibiting the outputs of said reader, stepping-down the reading point of said reader to the primary intelligence of the message to be edited, moving the reading point backwards, detecting said step-up insert editing signal, resuming normal forward reading, and disinhibiting the output of said reader.

55. Editing system in accordance with claim 28 which also includes a manual edit indicating means for recording a machine readable edit indicia on said record to specify an editing change to be made to said message, in which said means for reading records includes means for automatically converting said edit indicia into a signal suitable for logical processing and in which said logic network also includes an input editing network which stores in said message element store a message element train containing the message elements read from said records as modified in accordance with said edit indicia.

56. Editing system according to claim 31 in which said system includes a display means coupled to said network for displaying the message elements currently stored in said message element store and in which said manual control means indicates an editing change to said message at a message element location arbitrarily selectable subsequent to the original generation of said message.

57. Editing system according to claim 56 in which said system includes an automatic line ending means for providing formatting signals to permit page formatting, said formatting signals being associated with the resulting edited message.

58. Editing system according to claim 57 in which said system includes means for displaying a pointer on said display to indicate the location in the message stored in the message element store where an editing change is to be made, and in which said network includes logic provisions to move the pointer in response to manual inputs into said manual control means.

59. Editing system in accordance with claim 31 in which said system includes a printer coupled to said network, in which said printer produces a hardcopy record of the message elements currently stored in said message store, and in which said network also includes an automatic line ending means for providing formatting signals to permit page formatting, said formatting signals being associated with the resulting edited message and said formatting signals causing the formatting point of said printer to be advanced to the beginning of the next line.

* * * * *

UNITED STATES PATENT OFFICE

CERTIFICATE OF CORRECTION

Patent No. 3,676,856 Dated July 11, 1972

Inventor(s) Ron Manly

It is certified that error appears in the above-identified patent and that said Letters Patent are hereby corrected as shown below:

Column 1, line 20, "relates" should read -- related --. Column 5, line 9, "it" should read -- is --. Column 9, line 53, after "This," insert -- in --. Column 16, line 59, 'be "shall"' should read -- be "shall" --. Column 19, line 52, before "the encoded" insert -- of --; line 65, "manmachine" should read -- man-machine --. Column 20, line 63, "data" should read -- date --. Column 23, line 75, "consists" should read -- consist --. Column 25, line 25, '"delete3"' should read -- "delete" --. Column 26, line 48, delete "-". Column 35, line 70, "MOvement" should read -- Movement --. Column 36, line 58, "14" should read -- 15 --. Column 38, line 67, "signal entering" should be in italics; line 69, "signal in" should be in italics Column 44, line 33, '" "' should read -- "-"; line 70, "taper" should read -- tape --. Column 38, line 71, "space in" should be in italics. Column 55, line 32, "according to Claim 24" should read -- according to Claim 14 --.

UNITED STATES PATENT OFFICE
CERTIFICATE OF CORRECTION

Patent No. 3,676,856 Dated July 11, 1972

Inventor(s) Ron Manly - 2 -

It is certified that error appears in the above-identified patent and that said Letters Patent are hereby corrected as shown below:

Tables "A - J" should appear as shown on the attached sheets.

Signed and sealed this 19th day of November 1974.

(SEAL)
Attest:

McCOY M. GIBSON JR.
Attesting Officer

C. MARSHALL DANN
Commissioner of Patents

TABLE A

CHARACTERISTICS AND CAPABILITIES UTILIZED IN THE PAPER TAPE TYPEWRITER CONFIGURATIONS OF FIGS. 17, 18, AND 19

| | ONE-TO-ONE CORRESPONDENCE | READBACK | ONE-DIRECTIONAL |
|---|---|---|---|
| One-to-one correspondence between space on hardcopy and code positions on paper tape | Yes | No | No |
| Punch kept synchronized so that printed characters are aligned with corresponding punched characters when correcting errors | Yes | Yes | No |
| Undetected manual movements of the carriage | No | No | No |
| On-line editing using: | | | |
| "overprint delete" | Yes | Yes | Yes |
| "start delete here" | Yes | Yes | Yes |
| "delete last section" | Yes | Yes | Yes |
| and others | Yes | Yes | Yes |
| More bits per character than conventional punched paper tape | Yes | No, or just one more for normal capabilities | No |
| Interlinear insert | May be included | May be included | May be included |
| Double or triple spacing on the paper tape | May be included | May be included | Not utilized |
| Backmovements of the paper tape utilized | Yes | Yes | No |

(continued on following page)

TABLE A (continued)

| | ONE-TO-ONE CORRESPONDENCE | READBACK | ONE-DIRECTIONAL |
|---|---|---|---|
| Automatic margining | May be included | May be included | May be included |
| The following punched on the paper tape: | | | |
| Carriage return signal | | | |
| Blank character space signal | | | |
| Tab signal | No | Yes, except when over previously punched portion of the tape | Yes |
| Back space signal | No | No | Yes |
| Backline signal | No | Not applicable | Yes |
| Backreturn signal | No | No | Yes |
| Stop codes may be utilized | Not normally included; uses extra hole positions if included | Yes | Yes |
| Special logical capability required in message synthesizer | No | Yes | Yes |

TABLE B - ONE-TO-ONE CONFIGURATION: PRINTER 402 RESPONSE TO KEYBOARD 416 OPERATIONS

| KEYBOARD OPERATIONS | MOVEMENT: NO MOVEMENT | MOVEMENT: ONE SPACE | MOVEMENT: OTHER AS COMMANDED | PRINTING | OTHER |
|---|---|---|---|---|---|
| ORDINARY CHARACTER | | X | | X | |
| UPPER OR LOWER CASE CHANGE | X | | | --- | (1) |
| RIBBON COLOR CHANGE | X | | | --- | X |
| NON-ESCAPING CHARACTER (E. G., DIACRITICAL MARK) | X | | | X | |
| UNDERLINE | | X | | X | |
| DOUBLE TYPED LETTER (E.G., "!") | | X(2) | | X | |
| NON-PRINTED INSTRUCTION (E.G., STOP CODE) | X(3) | | | --- | |
| EDIT SYMBOL--PRINTED | | X | | X | |
| --NON-PRINTED | X(3) | | | --- | |
| --ADDED PRINTED | | X | | X | |
| BLANK CHARACTER SPACE | | X | | --- | |
| CARRIAGE RETURN | | | X | --- | |
| TAB | | | X | --- | |
| PLATEN ADVANCE OR LINE STEP (INDEX ONE LINE FORWARD) | | | X | --- | |
| BACKLINE (INDEX ONE LINE BACKWARD) | | | X | --- | |
| BACKRETURN | | | X | --- | |
| BACK SPACE | | | X | --- | |
| FORWARD SPACE | Not distinguishable from BLANK CHARACTER SPACE | | | | |
| STEP-UP (if included) | | | X | (4) | |
| STEP-DOWN (if included) | | | X | (5) | |

Notes: (1) The case is implicitly indicated by the symbol printed.

(2) One space for the typing of each conventional letter making up the double typed letter (a backspace is also needed).

(3) Not normally utilized in the one-to-one configuration; special provisions are required for it.

(4) This is recorded as an added printed edit symbol.

(5) This is recorded as a printed edit symbol.

TABLE C ONE-TO-ONE CONFIGURATION:

PAPER TAPE PUNCH 404 RESPONSE TO KEYBOARD 416 OPERATIONS

| KEYBOARD OPERATIONS | MOVEMENT: NO MOVEMENT | MOVEMENT: ONE SPACE | MOVEMENT: OTHER AS COMMANDED | PUNCHING: ORDINARY HOLE POSITIONS | PUNCHING: SPECIAL HOLE POSITION | PUNCHING: EXTRA HOLE POSITIONS |
|---|---|---|---|---|---|---|
| ORDINARY CHARACTER | | X | | X | | |
| UPPER OR LOWER CASE CHANGE | X | | | | (1) | |
| RIBBON COLOR CHANGE | X | | | | | X |
| NON-ESCAPING CHARACTER (E.G., DIACRITICAL MARK) | X | | | | | X |
| UNDERLINE | | X | | | | X |
| DOUBLE TYPED LETTER (E.G., "!") | | X | | (2) | | (2) |
| NON-PRINTED INSTRUCTION (E.G., STOP CODE) | X (Not normally utilized) | | | | | X |
| EDIT SYMBOL--PRINTED | | X | | X | | (3) |
| --NON-PRINTED | X (Not normally utilized) | | | | | X |
| --ADDED PRINTED | | X | | (4) | | X |
| BLANK CHARACTER SPACE | | X | | --- | --- | --- |
| CARRIAGE RETURN | | | X | --- | --- | --- |
| TAB | | | X | --- | --- | --- |
| PLATEN ADVANCE OR LINE STEP (INDEX ONE LINE FORWARD) | | | X | --- | --- | --- |
| BACKLINE (INDEX ONE LINE BACKWARD) | | | X | --- | --- | --- |
| BACKRETURN | | | X | --- | --- | --- |
| BACK SPACE | | | X | --- | --- | --- |
| FORWARD SPACE | Not distinquishable from BLANK CHARACTER SPACE | | | | | |
| STEP-UP (if included) | | | X | --- | --- | (5) |
| STEP-DOWN (if included) | | | X | (6) | --- | --- |

Notes: (1) The case change is not recorded separately; the case is recorded with each specific character punched.

(2) One of the double type letters utilizes extra hole positions.

(3) May include these in addition to or instead of the ordinary hole positions.

(4) An overpunching delete may also be utilized.

(5) This is recorded as an added printed edit symbol.

(6) [illegible]

TABLE D ONE-TO-ONE CONFIGURATION: HARDCOPY MOVEMENT CONTROL SIGNALS TO EDIT SIGNAL READER 410 BASED UPON SIGNALS READ BY PAPER TAPE READER 406

| SIGNALS READ | MOVEMENT: NO MOVEMENT | MOVEMENT: ONE SPACE | MOVEMENT: OTHER AS COMMANDED | |
|---|---|---|---|---|
| ORDINARY CHARACTER | | X | | |
| UPPER OR LOWER CASE CHANGE | (1) | | | |
| RIBBON COLOR CHANGE | (1) | | | |
| NON-ESCAPING CHARACTER (E.G., DIACRITICAL MARK) | (1) | | | |
| UNDERLINE | (1) | | | |
| DOUBLE TYPED LETTER (E.G., "!") | | X | | |
| NON-PRINTED INSTRUCTION (E.G., STOP CODE) | --- (Not normally utilized) | | | |
| EDIT SYMBOL--PRINTED | | X | | |
| --NON-PRINTED | --- (Not normally utilized) | | | |
| --ADDED PRINTED | (2) | | | |
| BLANK CHARACTER SPACE | | X | | Note (3) |
| CARRIAGE RETURN | | | X | Note (3) |
| TAB | --- | --- | --- | Note (3) |
| PLATEN ADVANCE OR LINE STEP (INDEX ONE LINE FORWARD) | --- | --- | --- | Note (3) |
| BACKLINE (INDEX ONE LINE BACKWARD) | --- | --- | --- | Note (4) |
| BACKRETURN | --- | --- | --- | Note (4) |
| BACK SPACE | --- | --- | --- | Note (4) |
| FORWARD SPACE | Not applicable | | | |
| STEP-UP (if included) | | | X | |
| STEP-DOWN (if included) | | | X | |

Notes: (1) No movement for this signal per se; the presence of this signal in a character space is ignored.

(2) No movement for the added printed symbol per se; the edit instruction conveyed by the symbol may cause movement.

(3) This is not explicitly recorded as a code on the paper tape.

TABLE E READBACK CONFIGURATION: PRINTER 402 RESPONSE TO KEYBOARD 416 OPERATIONS

| | MOVEMENT | | | | |
|---|---|---|---|---|---|
| KEYBOARD OPERATIONS | NO MOVEMENT | ONE SPACE | OTHER AS COMMANDED | PRINTING | OTHER |
| ORDINARY CHARACTER | | X | | X | |
| UPPER OR LOWER CASE CHANGE | X | | | --- | X |
| RIBBON COLOR CHANGE | X | | | --- | X |
| NON-ESCAPING CHARACTER (E.G., DIACRITICAL MARK) | Not utilized | | | | |
| UNDERLINE | | X | | X | |
| DOUBLE TYPED LETTER (E.G., "!") | Not utilized | | | | |
| NON-PRINTED INSTRUCTION (E.G., STOP CODE) | X | | | --- | |
| EDIT SYMBOL--PRINTED | | X | | X | |
| --NON-PRINTED | X | | | --- | |
| --ADDED PRINTED | Not utilized--Note (1) | | | | |
| BLANK CHARACTER SPACE | | X | | --- | |
| CARRIAGE RETURN | | | X | --- | |
| TAB | | | X | --- | |
| PLATEN ADVANCE OR LINE STEP (INDEX ONE LINE FORWARD) | Not utilized | | | | |
| BACKLINE (INDEX ONE LINE BACKWARD) | Not utilized | | | | |
| BACKRETURN | | | X | --- | |
| BACK SPACE | | | X | --- | |
| FORWARD SPACE | | X | | --- | |
| STEP-UP (if included) | | | X | X | |
| STEP-DOWN (if included) | | | X | X | |

Notes: (1) Except for the "step-up" command (which is printed only over a blank character space in this configuration), or the over-printed "x-ing" out of a character.

TABLE F READBACK CONFIGURATION:

PAPER TAPE PUNCH 404 RESPONSE TO KEYBOARD 416 OPERATIONS

| | MOVEMENT | | | PUNCHING | |
|---|---|---|---|---|---|
| KEYBOARD OPERATIONS | NO MOVEMENT | ONE SPACE | OTHER AS COMMANDED | ORDINARY HOLE POSITIONS | SPECIAL HOLE POSITION |
| ORDINARY CHARACTER | | X | | X | |
| UPPER OR LOWER CASE CHANGE | | X | | X | |
| RIBBON COLOR CHANGE | | X | | X | |
| NON-ESCAPING CHARACTER (E.G., DIACRITICAL MARK) | Not utilized | | | | |
| UNDERLINE | | X | | | X |
| DOUBLE TYPED LETTER (E.G., "!") | Not utilized | | | | |
| NON-PRINTED INSTRUCTION (E.G., STOP CODE) | | X | | X | |
| EDIT SYMBOL--PRINTED | | X | | X | |
| --NON-PRINTED | | X | | X | |
| --ADDED PRINTED | Not utilized--Note (1) | | | | |
| BLANK CHARACTER SPACE | | X | | X* | |
| CARRIAGE RETURN | | X | | X* | |
| TAB | | X | | X* | |
| PLATEN ADVANCE OR LINE STEP (INDEX ONE LINE FORWARD) | Not utilized | | | | |
| BACKLINE (INDEX ONE LINE BACKWARD) | Not utilized | | | | |
| BACKRETURN | | | X | --- | |
| BACK SPACE | | X(2) | | --- | |
| FORWARD SPACE | | X | | --- | |
| STEP-UP (if included) | | | X | (3) | |
| STEP-DOWN (if included) | | | X | X | |

Notes: * Except in the back space region.

(1) Except for the step-up command (see note 3) and the overpunching of a code to a delete code.

(2) See separate chart indicating the movement response as a function of the signal readback from the paper tape.

(3) The blank character space code is overpunched to convert it to a "step-up" code.

BEST AVAILABLE COPY

TABLE G READBACK CONFIGURATION: PAPER TAPE PUNCH 404 AND PRINTER 402

RESPONSE TO SIGNALS READBACK FROM PAPER TAPE UPON BACK SPACING

| SIGNALS READBACK | PUNCH MOVEMENT: NO MOVEMENT | PUNCH MOVEMENT: ONE BACK SPACE | PUNCH MOVEMENT: OTHER AS COMMANDED | PUNCH & PRINTER BACKRETURN | PRINTER MOVEMENT: ONE BACK SPACE | PRINTER MOVEMENT: CARRIAGE AS COMMANDED |
|---|---|---|---|---|---|---|
| ORDINARY CHARACTERS | | X | | | X | |
| UPPER OR LOWER CASE CHANGE | | X | | | | X |
| RIBBON COLOR CHANGE | | X | | | | X |
| NON-ESCAPING CHARACTER (E.G., DIACRITICAL MARK) | Not utilized | | | | | |
| UNDERLINE | Not a separate code position | | | | | |
| DOUBLE TYPED LETTER (E.G., "!") | Not utilized | | | | | |
| NON-PRINTED INSTRUCTION (E.G., STOP CODE) | | X | | | | X |
| EDIT SYMBOL--PRINTED | | X | | | X | |
| --NON-PRINTED | | X | | | | X |
| --ADDED PRINTED | Not utilized--Note (1) | | | | | |
| BLANK CHARACTER SPACE | | X | | | X | |
| CARRIAGE RETURN | | | | X | | |
| TAB | | | | X | | |
| PLATEN ADVANCE OR LINE STEP (INDEX ONE LINE FORWARD) | Not utilized | | | | | |
| BACKLINE (INDEX ONE LINE BACKWARD) | Not utilized | | | | | |
| BACKRETURN | Not applicable | | | | | |
| BACK SPACE | Not applicable | | | | | |
| FORWARD SPACE | Not applicable | | | | | |
| STEP-UP (if included) | | | X | | | X |
| STEP-DOWN (if included) | | | X | | | X |

Notes: (1) Except for the "step-up" command and the overpunched delete code (the latter results in one back space of the punch and printer).

TABLE H READBACK CONFIGURATION: HARDCOPY MOVEMENT CONTROL SIGNALS TO EDIT SIGNAL READER 410 BASED UPON SIGNALS READ BY PAPER TAPE READER 406

| SIGNALS READ | MOVEMENT: NO MOVEMENT | MOVEMENT: ONE SPACE | MOVEMENT: OTHER AS COMMANDED |
|---|---|---|---|
| ORDINARY CHARACTER | | X | |
| UPPER OR LOWER CASE CHANGE | X | | |
| RIBBON COLOR CHANGE | X | | |
| NON-ESCAPING CHARACTER (E.G., DIACRITICAL MARK) | Not utilized | | |
| UNDERLINE | X | | |
| DOUBLE TYPED LETTER (E.G., "!") | Not utilized | | |
| NON-PRINTED INSTRUCTION (E.G., STOP CODE) | X | | |
| EDIT SYMBOL--PRINTED | | X | |
| --NON-PRINTED | X | | |
| --ADDED PRINTED | Not utilized--Note (1) | | |
| BLANK CHARACTER SPACE | | X | |
| CARRIAGE RETURN | | | X |
| TAB | | | X |
| PLATEN ADVANCE OR LINE STEP (INDEX ONE LINE FORWARD) | Not utilized | | |
| BACKLINE (INDEX ONE LINE BACKWARD) | Not utilized | | |
| BACKRETURN | Not applicable | | |
| BACK SPACE | Not applicable | | |
| FORWARD SPACE | Not applicable | | |
| STEP-UP (if included) | | | X |
| STEP-DOWN (if included) | | | X |

Notes: (1) Except for the step-up command and the overpunched delete code (the latter results in one back space of the punch and printer).

TABLE I ONE-DIRECTIONAL CONFIGURATION:

PRINTER 402 RESPONSE TO KEYBOARD 416 OPERATIONS

| KEYBOARD OPERATIONS | MOVEMENT | | | PRINTING | OTHER |
|---|---|---|---|---|---|
| | NO MOVEMENT | ONE SPACE | OTHER AS COMMANDED | | |
| ORDINARY CHARACTER | | X | | X | |
| UPPER OR LOWER CASE CHANGE | X | | | --- | X |
| RIBBON COLOR CHANGE | X | | | --- | X |
| NON-ESCAPING CHARACTER (E.G., DIACRITICAL MARK) | X | | | X | |
| UNDERLINE | | X | | X | |
| DOUBLE TYPED LETTER (E.G., "!") | | X | | X | |
| NON-PRINTED INSTRUCTION (E.G., STOP CODE) | X | | | --- | |
| EDIT SYMBOL--PRINTED | | X | | X | |
| --NON-PRINTED | X | | | --- | |
| --ADDED PRINTED | | X | | X | |
| BLANK CHARACTER SPACE | | X | | --- | |
| CARRIAGE RETURN | | | X | --- | |
| TAB | | | X | --- | |
| PLATEN ADVANCE OR LINE STEP (INDEX ONE LINE FORWARD) | | | X | --- | |
| BACKLINE (INDEX ONE LINE BACKWARD) | | | X | --- | |
| BACKRETURN | | | X | --- | |
| BACK SPACE | | | X | --- | |
| FORWARD SPACE | | X | | --- | |
| STEP-UP (if included) | | | X | --- | |
| STEP-DOWN (if included) | | | X | - | |

TABLE J ONE-DIRECTIONAL CONFIGURATION:

PAPER TAPE PUNCH 404 RESPONSE TO KEYBOARD 416 OPERATIONS

| KEYBOARD OPERATIONS | MOVEMENT: NO MOVE-MENT | MOVEMENT: ONE SPACE | MOVEMENT: OTHER AS COM-MANDED | PUNCHING: ORDINARY HOLE POSITIONS |
|---|---|---|---|---|
| ORDINARY CHARACTER | | X | | X |
| UPPER OR LOWER CASE CHANGE | | X | | X |
| RIBBON COLOR CHANGE | | X | | X |
| NON-ESCAPING CHARACTER (E.G., DIACRITICAL MARK) | | X | | X |
| UNDERLINE | | X | | X |
| DOUBLE TYPED LETTER (E.G., "!") | | X | | X |
| NON-PRINTED INSTRUCTION (E.G., STOP CODE) | | X | | X |
| EDIT SYMBOL--PRINTED | | X | | X |
| --NON-PRINTED | | X | | X |
| --ADDED PRINTED | | X | | X |
| BLANK CHARACTER SPACE | | X | | X |
| CARRIAGE RETURN | | X | | X |
| TAB | | X | | X |
| PLATEN ADVANCE OR LINE STEP (INDEX ONE LINE FORWARD) | | X | | X |
| BACKLINE (INDEX ONE LINE BACKWARD) | | X | | X |
| BACKRETURN | | X | | X |
| BACK SPACE | | X | | X |
| FORWARD SPACE | | X | | X |
| STEP-UP (if included) | | X | | X |
| STEP-DOWN (if included) | | X | | X |

TABLE K ONE-DIRECTIONAL CONFIGURATION: HARDCOPY MOVEMENT CONTROL SIGNALS TO EDIT SIGNAL READER 410 BASED UPON SIGNALS READ BY PAPER TAPE READER 406

| SIGNALS READ | MOVEMENT: NO MOVEMENT | MOVEMENT: ONE SPACE | MOVEMENT: OTHER AS COMMANDED |
|---|---|---|---|
| ORDINARY CHARACTER | | X* | |
| UPPER OR LOWER CASE CHANGE | X | | |
| RIBBON COLOR CHANGE | X | | |
| NON-ESCAPING CHARACTER (E.G., DIACRITICAL MARK) | X | | |
| UNDERLINE | | X* | |
| DOUBLE TYPED LETTER (E.G., "!") | | X* | |
| NON-PRINTED INSTRUCTION (E.G., STOP CODE) | X | | |
| EDIT SYMBOL—PRINTED | | X* | |
| —NON-PRINTED | X | | |
| —ADDED PRINTED | | X* | |
| BLANK CHARACTER SPACE | | X | |
| CARRIAGE RETURN | | | X |
| TAB | | | X |
| PLATEN ADVANCE OR LINE STEP (INDEX ONE LINE FORWARD) | | | X |
| BACKLINE (INDEX ONE LINE BACKWARD) | X | | |
| BACKRETURN | X | | |
| BACK SPACE | X | | |
| FORWARD SPACE | X | | |
| STEP-UP (if included) | X(1) | | |
| STEP-DOWN (if included) | X(1) | | |

Notes: * Unless in the back space region; in which case no movement.

(1) Special provisions required to look for edit signal marks within an interlinear insert are not included in most configurations: thus no movement occurs.